United States Patent
Huang

(10) Patent No.: US 12,444,507 B2
(45) Date of Patent: Oct. 14, 2025

(54) BAYESIAN CAUSAL INFERENCE MODELS FOR HEALTHCARE TREATMENT USING REAL WORLD PATIENT DATA

(71) Applicant: Children's Hospital Medical Center, Cincinnati, OH (US)

(72) Inventor: Bin Huang, Cincinnati, OH (US)

(73) Assignee: Children's Hospital Medical Center, Cincinnati, OH (US)

( * ) Notice: Subject to any disclaimer, the term of this patent is extended or adjusted under 35 U.S.C. 154(b) by 453 days.

(21) Appl. No.: 17/310,176

(22) PCT Filed: Jan. 24, 2020

(86) PCT No.: PCT/US2020/014912
§ 371 (c)(1),
(2) Date: Jul. 23, 2021

(87) PCT Pub. No.: WO2020/154573
PCT Pub. Date: Jul. 30, 2020

(65) Prior Publication Data
US 2022/0093271 A1    Mar. 24, 2022

Related U.S. Application Data

(60) Provisional application No. 62/959,530, filed on Jan. 10, 2020, provisional application No. 62/952,872, (Continued)

(51) Int. Cl.
*G16H 50/70*    (2018.01)
*G06N 7/01*    (2023.01)
(Continued)

(52) U.S. Cl.
CPC ............... *G16H 50/70* (2018.01); *G06N 7/01* (2023.01); *G16H 10/60* (2018.01); *G16H 50/20* (2018.01)

(58) Field of Classification Search
None
See application file for complete search history.

(56) References Cited

U.S. PATENT DOCUMENTS

2007/0271075 A1* 11/2007 Chen ...................... G16B 25/00
703/2
2022/0115143 A1*  4/2022 Baronov ................ G16H 40/67

OTHER PUBLICATIONS

Jason Roy, Kirsten J. Lum, Michael J. Daniels, A Bayesian nonparametric approach to marginal structural models for point treatments and a continuous or survival outcome, Biostatistics, vol. 18, Issue 1, Jan. 2017, pp. 32-47, https://doi.org/10.1093/biostatistics/kxw029 (Year: 2017).*

(Continued)

*Primary Examiner* — Katherine Kolosowski-Gager
(74) *Attorney, Agent, or Firm* — KDW Firm PLLC

(57) ABSTRACT

Computer implemented methods, systems, and computer readable medium are provided for performing causal inference analyses to determine the more effective treatment among alternative treatments in the healthcare setting using real world observational data. Both binary treatment and adaptive treatment strategies are considered in the analysis. The methods comprise generating a Bayesian marginal structural model and performing a single step of Bayesian regression that incorporates matching, weighting, and estimation processes and in which the matching process is performed using a Guassian process ("GP") prior covariance function.

12 Claims, 34 Drawing Sheets

Related U.S. Application Data filed on Dec. 23, 2019, provisional application No. 62/952,935, filed on Dec. 23, 2019, provisional application No. 62/796,636, filed on Jan. 25, 2019.

(51) Int. Cl.
*G16H 10/60* (2018.01)
*G16H 50/20* (2018.01)

(56) References Cited

OTHER PUBLICATIONS

International Search Report and Written Opinion of the International Searching Authority mailed on May 11, 2020 for International Application No. PCT/US2020/014912, filed Jan. 24, 2020, 18 pages.

Jason Roy et al, A Bayesian nonparametric approach to marginal structural models for point treatments and a continuous or survival outcome, Biostatistics, vol. 18, No. 1, Jun. 26, 2016 (Jun. 26, 2016), pp. 32-47.

Saptarshi Chatterjee et al, Bayesian Methods for Optimal Treatment Allocation, Jan. 1, 2018 (Jan. 1, 2018)., vol. 4, No. 1, pp. 1-19.

Ahmed M. Alaa et al, Bayesian Nonparametric Causal Inference: Information Rates and Learning Algorithms, IEEE Journal of Selected Topics in Signal Processing, vol. 12, No. 5, Oct. 1, 2018 (Oct. 1, 2018), pp. 1031-1046.

Bin Huang et al, Original Article, GPMatch: A Bayesian Doubly Robust Approach to Causal Inference with Gaussian Process Covariance Function as a Matching Tool Matching, Mar. 14, 2019 (Mar. 14, 2019), URL:https://arxiv.org/pdf/1901.10359.pdf, pp. 1-11.

\* cited by examiner

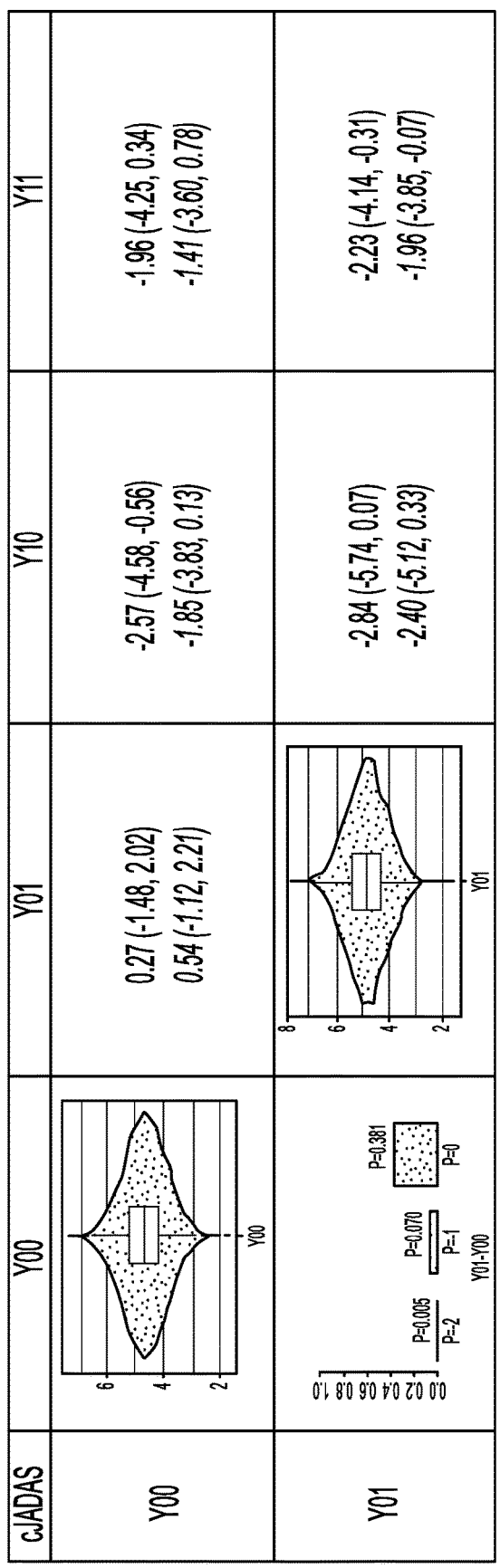
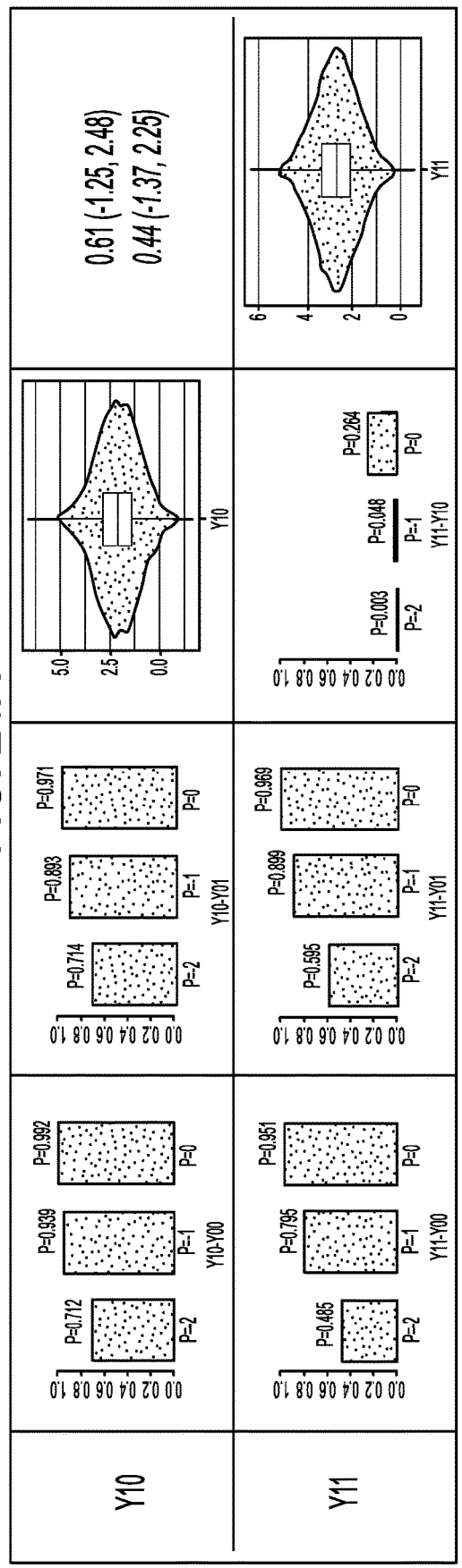
FIG. 21A
FIG. 21B

BAYESIAN CAUSAL INFERENCE MODELS FOR HEALTHCARE TREATMENT USING REAL WORLD PATIENT DATA

CROSS-REFERENCE TO RELATED APPLICATIONS

This application is a national stage entry, filed under 35 U.S.C. § 371, of International Application No. PCT/US2020/014912, filed on Jan. 24, 2020, which claims the benefit of U.S. Patent No. 62/959,530, filed on Jan. 10, 2020, U.S. Provisional Application No. 62/952,872, filed on Dec. 23, 2019, U.S. Provisional Application No. 62/952,935, filed on Dec. 23, 2019, and U.S. Provisional Application No. 62/796,636, filed on Jan. 25, 2019, the entire contents of which is hereby incorporated herein by reference in its entirety and for all purposes.

STATEMENT OF FEDERALLY SPONSORED RESEARCH

This invention was made with U.S. government support under 5UL1TR001425-03 awarded by the National Centre for Advancing Translational Sciences of the National Institutes of Health. The government has certain rights in the invention.

FIELD OF THE INVENTION

The invention relates to systems and methods for causal inference utilizing Bayesian methods with relaxed causal assumptions that combine matching and regression into a single step with applications to determining treatment effects for healthcare.

BACKGROUND OF THE INVENTION

Although the 'gold standard' for comparing the effectiveness of different treatments is the randomized controlled clinical trial ("RCT"), such trials are expensive, generally take a relatively long time to complete, and may suffer from several limitations that render the validity of the results as applied to the general patient population questionable. For example, RCT's are limited to a selected group of patients who satisfy the often strict eligibility requirements of the trial. Patients who are too ill, taking concomitant medications, or lack the means to access the trial are often excluded. This can mean that the results of the trial are not generalizable to the broader patient population, which may become evident only when unexpected treatment effects appear after the treatment is more widely adopted into clinical practice. In addition, RCT's may rely on "surrogate" endpoints that are only themselves approximations of the true clinical and patient-relevant endpoints. Further, RCT has limited capacity to examine complex interventions, such as administering combination medications at a certain time point in response to the patient's responses to a previous treatment.

Compared to RCTs, observational (non-randomized) studies can capture a broader patient population, reflect what actually happened in the real world, and perform more head-to-head comparisons with lower costs. However, the threats to internal validity are heightened in observational studies which demand a robust study design, quality data, and correct statistical analyses. The limitations of RCTs, along with the emergence of very large datasets of health data, such as those available in health registries and electronic health/medical records ("EHR" or "EMR"), have resulted in efforts to develop better methods for evaluating the effectiveness of new treatments compared to standard practice using observational patient data. The aim of comparative effectiveness studies is to estimate causal treatment effects in order to determine which treatment was more effective based on the selected outcome measure in a general patient population within a real world clinical setting, as opposed to the highly controlled setting of the RCT.

For an individual, the potential outcomes are the individual's outcome had she received a treatment or intervention (referred to herinafter simply as the "treatment") and the individual's outcome had she not received it, or if she had received instead the standard of care, control, placebo, or no treatment, referred to hereinafter simply as the "control". The causal treatment effect is the comparison between the two potential outcomes. Of course, for each individual, we can observe only one of these potential outcomes, since each individual will have received either the treatment or the control, but never both. In order to best predict the unobserved potential outcomes, one must compare treatment and control groups that are as similar as possible. In the "gold standard" randomized experiments, a known randomization mechanism is used to ensure similarity or "balance" of the covariates between the treatment and control groups. However, in nonrandomized experiments individuals are placed into the treatment and control groups for deliberate reasons rather than at random. The lack of "balance" between the two groups (treatment and control) in real world observational data is referred as confounding-by-indication.

Matching experimental units on their pre-treatment assignment characteristics helps to remove bias by ensuring balance between the experimental units of the treatment and control groups. There are many different matching techniques and a comprehensive review is provided in Stuart *Stat Sci* (2010) 25:1-21. These techniques operate to find control units that are similar to a treatment unit, as defined statistically by "distance". In general, matching methods impute the missing potential outcome with the value from the nearest match or the weighted average of the values within the nearby neighborhood defined by (a chosen value) caliper. However, matching on multiple covariates can be challenging when the dimension of the covariates is large. In order to define distance/similarity when the covariates are high dimensional, a distance metric that maps two covariate vectors into a single number has been suggested. For this reason, matching is often performed using the estimated propensity score (PS) or by the Manhalanobis distance (MD).

In addition, methods that provide estimates for causal parameters such as the average treatment effect ("ATE") typically operate under strict assumptions. These may generally be referred to as the stable unit treatment value assumption (SUTVA), the exchangeability (also referred to as "no hidden bias" or "unconfounded") assumption, and the positivity (overlap) assumption. In the context of healthcare, the SUTVA assumption suggests that there is one and only one potential outcome value for each treatment received by the patient, which is not influenced by other factors other than those observed. The exchangeability assumption may be referred to more particularly as the ignorable treatment assignment, which assumes treatment assignment (i.e., assignment to treated or control groups) is independent of the potential outcomes given the covariates. The positivity assumption in the healthcare context assumes a positive probability of receiving each treatment for all covariates. However, these assumptions may not accurately represent real world data where there are numerous unmeasured covariates and errors, including measurement errors, that impact the observed outcome.

The basic concept is that under the no unmeasured confounder setting, matching induces balance between the treated and control groups. Therefore, it serves to transform a nonrandomized study into a pseudo randomized study. However, there are several problems with the commonly used methods. First, a common feature of all generally utilized matching methods is that data points without a match are discarded, which may result in a sample that is no longer representative of the target population. Second, a user-specified caliper is typically required. The caliper is a parameter that determines whether a match is achieved. Unfortunately, the choice of caliper is often arbitrary because it is not immediately clear how to select an optimal caliper for the data. Yet, the choice of caliper is critical because different calipers can lead to very different results. Third, for methods utilizing an estimated summary score such as the propensity score (PS), matching on a misspecified summary score can lead to invalid causal inference results.

Bayesian modeling is particularly suitable for comparative effectiveness studies because it can easily incorporate existing knowledge into a prior distribution, synthesize data evidence from different sources, account for model uncertainties, and inform optimal decisions. It produces a posterior distribution that offers more information beyond the traditional point and 95% confidence interval estimates. The parameter-rich Bayesian modeling techniques also provide a powerful tool for addressing potential model misspecifications.

Bayesian approaches to causal inference have primarily taken the direct modeling approach. The direct modeling of outcomes allows one to utilize the many well-developed regression modeling techniques, including both parametric and nonparametric approaches, as well as the ability to address complex data types and structures. The Bayesian approach allows for incorporating prior knowledge and synthesizing information from different sources, and thus can be used for tackling complex problems involving encouragement trials, dynamic treatment regimes, and treatment noncompliance. More recently, Bayesian nonparametric approaches have also been used, such as Bayesian additive regression trees (BART). BART methods have been shown to produce more accurate estimates of ATE compared to propensity score matching, propensity-weighted estimators, and regression adjustment in the nonlinear setting, and also to perform as well in the linear setting. Hill, *J. Computational and Graphical Statistics* 20: 217-240 2011. Others propose use of the weighted average of the answers from a parametric and a nonparametric Bayesian model, while still others have advocated for the use of Bayesian model averaging. Gustafson P. *Int'l J. Biostatistics.* 2012 8(2): 1557-4679; Cefalu et al. *Biometrics.* 2017 73(2):410-421; Zigler C M, Dominici F. *J. Am. Statistical Assoc.* 2014 109(505):95-107.

More recently, Bayesian modeling with Gaussian Process and Dirichlet Process priors have been used to address heterogeneous treatment effect, dynamic treatment assignment, and missing data. Roy J et al. *Biostatistics.* 2017 18(1):32-47; Xu et al., *J Am Stat Assoc.* 2016; 111(515): 921-929 Roy J, et al. *Biometrics.* 1083 doi:10.1111/BIOM.12875. These parameter-rich models can mitigate concerns over potential model misspecification. However, by not accounting for treatment selection in the analyses, the parametric rich model may suffer from overfitting, which subsequently may introduce bias in estimating causal treatment effects.

A better Bayesian causal inference method is needed to appropriately account for bias due to confounding-by-indication in observational studies. Currently, the Bayesian approach in causal inference is predominately model-based, which views confounding as a missing potential outcomes problem. However, causal inference presents challenges in addition to the conventional missing data problem. In particular, since no more than one potential outcome can be observed for a given individual, the missing data are highly structured such that the correlations between the two potential outcomes are non-identifiable. Subsequently, different analyses may arrive different inferential results—this is the issue of "inferential quandary". Confounding-by-indication and time-dependent confounding are additional challenges. Ignoring these challenges can lead to biased estimates of causal effect. There have been various proposals for correcting treatment selection bias in Bayesian causal inference. Including the PS as a covariate in the outcome regression model is one option. However, joint modeling of outcome and treatment selection models leads to a "feedback" issue, in which the information from the outcomes plays an important role in the estimation of propensity scores such that it defeats the role of the PS as a balancing score, and subsequently leads to biased causal inference estimates. To overcome the feedback issue, other approaches have been suggested, including a two-stage approach (see McCandless et al. *Int'l J. Biostatistics.* 2010; 6(2): 1557-4679; Zigler et al. *Biometrics.* 2013; 69(1):263-273) and an approximate Bayesian approach incorporating inverse treatment assignment probabilities as importance sampling weights in a Monte Carlo integration. Saarela et al. *Biometrika.* 2016; 103(3):667-681. This approach offers a Bayesian version of augmented inverse probability treatment weighting (AIPTW). More recently, introducing the PS into the formulation of a prior as a way of regularizing outcome modeling has been suggested. Hahn et al. *Bayesian Anal.* (2018) 13:163-182. However, all of these methods require a two-stage approach, and their performance may suffer if the PS is not correctly specified.

A combination of matching and regression may provide a better approach than using either of them alone. Rubin, D B. *Biometrics* p. 185-203 (1973). Recent approaches have advocated matching as nonparametric preprocessing for reducing dependence on parametric modeling assumptions (see Ho, D E et al. *Political Analysis* 15:199-236 (2007)) and have examined different strategies of combining the preprocessed matching with a regression modeling of the outcome through extensive simulation studies (Gutman and Rubin *Statistical Methods in Medical Research* 26:1199-1215 (2017).

U.S. Pat. No. 10,482,385 describes Bayesian causal relationship network models for healthcare diagnosis and treatment based on patient data.

John, E R, et al. (2019) describes methods for assessing causal treatment effect estimation when using large observational datasets.

SUMMARY OF THE INVENTION

The present invention addresses the need for improved methods for estimating the comparative effectiveness of administered therapies in a healthcare setting using observational (non-randomized) data, which may also be referred to as 'real world data'. In particular, the present invention provides a Bayesian nonparametric causal inference method that utilizes a Guassian process ("GP") prior covariance function as a matching tool. The methods described here address the problems of evaluating comparative effectiveness generally associated with commonly used matching methods, as discussed above. In particular, in accordance with the methods described here, no data is discarded and instead all data is utilized in the matching process, no arbitrary user-specified caliper is required, and the method is robust to model misspecification, unlike many commonly used methods. In addition, the present methods are robust to model misspecification and account for bias due to confounding-by-indication and time-dependent confounding without a two-stage approach. This is due to the ability of the methods described here to accomplish matching and regression modeling in a single step, utilizing a relaxed set of causal assumptions described here that provide a robust approach to assessing causal treatment effects. Accordingly, the methods described here do not require correct specification of either outcome or the treatment selection model. Generally, the methods described here differ from other nonparametric models which were not specifically designed for causal inference, in particular by utilizing GP prior to achieve matching such that it addresses the confounding-by-indication issues inherent in comparative effectiveness research using observational data.

The disclosure provides a computer implemented Bayesian nonparametric causal inference method for determining the more effective treatment among two alternative treatments administered to a plurality of patients, the method comprising generating a marginal structural model and performing a single step of Bayesian regression on patient data of the plurality of patients, wherein the method incorporates matching, weighting, and estimation processes into the single regression step and wherein the matching process is performed using a Guassian process ("GP") prior covariance function. In some implementations, the treatment is selected from a binary treatment and a time-varying adaptive treatment. In some implementations, the patient data is received or extracted from an electronic medical records system. In some implementations, the plurality of patients consists of at least 200 or at least 300 patients. In some implementations, the matching process is performed in the absence of a known matching structure. In some implementations, the GP prior covariance function is a squared exponential ("SE") function. In some implementations, potential outcomes are modeled nonparametrically and missing potential outcomes are estimated by a weighted sum of observed data.

In some implementations, the method comprises generating a model by initializing a treatment effect parameter and a GP covariance matrix in which, for each individual patient (i-th) in the sample of patient data, the GP prior allocates different weights to information obtained from other individual (j-th) patients, based on confounding variables specified in GP prior. In some implementations, the method further comprises fitting the model using Bayesian Markov chain Monte Carlo (MCMC) sampling of posterior distributions. In some implementations, the method further comprises performing the matching process by determining for each patient in the plurality a similarity to every other patient in the plurality and assigning a matching weight to each patient. In some implementations, the matching process comprises calculating weighted average covariates after weighting and before weighting and determining a balance for all covariates across their distributions by treatment group. In some implementations, balance is determined by the mean absolute difference and median absolute deviance. In some implementations, if the covariates are unbalanced, the method further comprises repeating the step of fitting the model using Bayesian MCMC. In some implementations, the weighted sum of the observed data is used to estimate missing potential outcomes for each patient utilizing data from other 'matched' patients who are sufficiently similar. In some implementations, the method further comprises deriving a propensity score using the covariate balancing propensity score (CBPS) method to ensure balance on identified clinically important covariates.

In some implementations, the method further comprises an initial step of receiving or extracting patient data corresponding to the plurality of patients. In some implementations, the patient data is received or extracted from an electronic medical record system. In some implementations, the patient data received or extracted comprises a set of observed baseline covariates. In some implementations, the observed baseline covariates include categorical and quantitative covariates. In some implementations, the patient data received or extracted comprises demographic data, disease characteristics, and biological data. In some implementations, the demographic data comprises the patients' age, self-reported race, and gender. In some implementations, the disease characteristics comprise, age at diagnosis, disease duration, age at initiation of treatment, and treatment administered.

In some implementations, all patient data is utilized for estimating the causal treatment effect and no data are discarded.

In some implementations, the plurality of patients shares a common diagnosis of a disease or condition. In some implementations, the common diagnosis is juvenile idiopathic arthritis (JIA). In some implementations, the patient data received or extracted comprises biological data and the biological data comprises rheumatoid factor (RF; positive/negative), antinuclear antibodies (ANA; positive/negative), and erythrocyte sedimentation rate (ESR; normal range 0-10 mm/hour). In some implementations, the patient data received or extracted comprises disease characteristics and the disease characteristics comprise the three core measures used in the calculation of cJADAS score, patient reported global pain, duration of morning stiffness (none, <15 mins, >=15 mins) and doctor's assessment of total number of joints with limited range of motion (LROM). In some implementations, the baseline covariates include age, gender, race, JIA subtype, insurance status, age at diagnose of disease, duration of disease at the time of diagnosis, doctor's global assessment, pain visual analog scale, patient well being, morning stiffness, antinuclear antibodies, rheumatoid factor, erythrocyte sedimentation rate, active number of joints, number of joints with lost range of motion, and baseline cJADAS score.

In some implementations, the disclosure provides a computer implemented method for generating a marginal structural model to determine a treatment effect based on patient data, the method comprising receiving patient data of a plurality of patients, each patient in the plurality having been diagnosed with the same disease or condition and administered an intervention treatment or a comparator treatment for treating the disease or condition, the patient data comprising a set of observed covariates for each patient including demographic data, disease characteristics, and biological data; specifying a set of baseline covariates from the set of observed covariates; generating a marginal structural model in which the potential outcomes are modeled nonparametrically using a Guassian process ("GP") prior covariance function to generate a covariance matrix; fitting the model using Bayesian Markov chain Monte Carlo (MCMC) sampling; calculating matching weights based on the GP covariance function; and estimating the treatment effect and potential outcomes using the matching weights.

In some implementations, generating the marginal structural model comprises generating a covariance matrix using a squared exponential ("SE") function of the baseline covariates as the GP prior, the matrix comprising weighted sums of the baseline covariates for each patient in the plurality such that, for each individual patient (i-th) in the plurality, the GP prior allocates different weights to information obtained from other individual (j-th) patients in the plurality, based on the baseline covariates specified in the GP prior. In some implementations, the treatment is a binary treatment. In some implementations, the treatment is a time-varying adaptive treatment and the method further comprises determining an average treatment effect for an initial treatment and a conditional treatment assigned based on the patient's response to the initial treatment. In some implementations, the patient data is received or extracted from an electronic medical record system.

In some implementations, the disclosure also provides a non-transitory machine readable storage medium storing at least one program that when executed by at least one processor, causes the at least one processor to perform a computer implemented method described here. In some implementations, the at least one program when executed by the at least one processor performs each of the following (i) generating a marginal structural model by initializing a treatment effect parameter and generating a GP prior variance-covariance matrix; (ii) fitting the model for a continuous bounded or unbounded outcome using Bayesian Markov chain Monte Carlo (MCMC) sampling; (iii) calculating matching weights based on the GP prior variance-covariance matrix; and (iv) estimating an averaged treatment effect.

In some implementations, the disclosure also provides a system for generating a marginal structural model to determine a treatment effect based on patient data, the system comprising a data receiving module configured to receive patient data from an electronic medical records system, the data comprising demographic data, disease characteristics, and biological data for a plurality of patients consisting of at least 200 or at least 300 patients, each patient in the plurality having been diagnosed with the same disease or condition and administered an intervention treatment or a comparator treatment for treating the disease or condition; a processor-implemented module configured to generate a marginal structural model by initializing a treatment effect parameter and generating a GP prior variance-covariance matrix; fitting the model for a continuous bounded or unbounded outcome using Bayesian Markov chain Monte Carlo (MCMC) sampling; calculating matching weights based on the GP prior variance-covariance matrix; and estimating an averaged treatment effect.

BRIEF DESCRIPTION OF THE FIGURES

FIG. 21A-B. GPMatch and BART comparative effectiveness results of first and second line treatment for all patients. Negative treatment effect indicating the column potential outcome is better than the row potential outcome in reducing cJADAS value. Results of two-staged BART are reported in gray fonts. All other reported estimates are due to the GPMatch method.

DETAILED DESCRIPTION OF THE INVENTION

Figure 1:
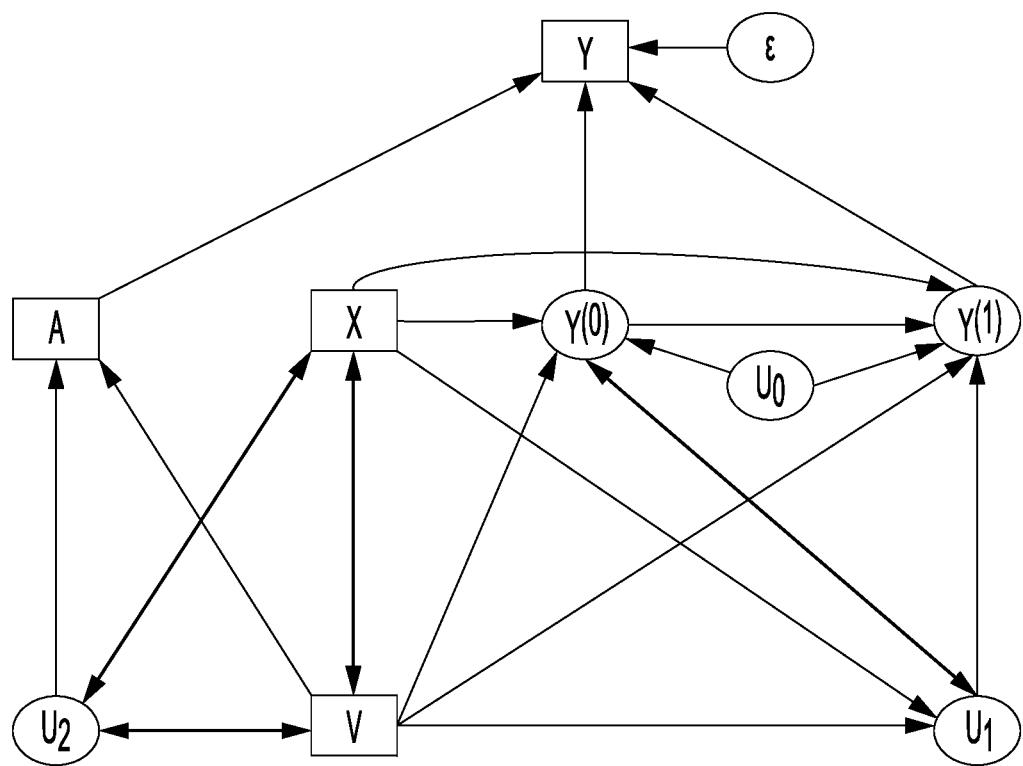
FIG. 1. Directed acyclic graphic presentation of the counterfactual world problem setup.

The disclosure provides methods for determining the comparative effectiveness of administered therapies in a healthcare setting, which may be referred to as the causal treatment effect, or more simply the "causal effect" or the "treatment effect". The methods described here utilize a Bayesian approach for causal inference based on observational (non-randomized) data, which may also be referred to as 'real world data'. In the context of the present methods, real world data may refer to one or more types of data, including, for example electronic health/medical records (referred to herein simply as "EHR"), health insurance claims data, clinical trial data, disease registries, product registries, and pharmacy dispensing data. The present disclosure also provides related methods for ensuring the quality of the data utilized in the analysis, as discussed in more detail in the section below entitled "Methods for Ensuring Quality Data".

The present disclosure further addresses the need for advanced causal inference methods that are required by the complexity of adaptive treatment strategies (ATS). Due to the adaptive assignment process, patients responding better (or worse) are likely to end up on the same arm of the ATS. This means that the treatment effects are confounded not only by the baseline covariates but also by the post-treatment time-varying intermediate outcomes and covariates. The propensity of treatment assignment differs at every decision point, based on time-varying covariates, treatment history, and disease progression. Any misspecification in these propensity scores will be propagated. In addition, the number of potential outcomes exponentially increases, leading to increased data sparsity for causal inference. Therefore, model misspecification is particularly challenging under the ATS setting. In order to ensure that comparative effectiveness research produces valid, reliable, and reproducible results for the ATS, it is critical that causal inference methods are robust to model misspecification and able to address time varying confounding. The present methods address these needs.

The methods described here, which may be referred to as "GPMatch" offer a full Bayesian causal inference approach that can effectively address the unique challenges inherent in causal inference. First, utilizing a GP prior covariance function to model covariance of observed data, GPMatch can estimate missing potential outcomes much like matching methods. Yet, it avoids the disadvantages of many matching methods. For example, in accordance with the present methods, no data are discarded, and no arbitrary caliper is required. Instead, the model allows empirical estimation of the length scale and variance parameters. The squared exponential (SE) covariance function of the GP prior offers an alternative distance metric, which closely resembles Mahalanobis distance. It matches individuals by the degree of matching proportional to the SE distance, without requiring specification of caliper. Different length scale parameters are considered for different covariates used in defining the SE covariance function. This allows the data to select the most important covariates to be matched on, and acknowledges that some variables are more important than others.

The present methods are the first to utilize the GP covariance function as a matching device and in this and other features the present methods differ from the numerous other causal methods that have been proposed, which fall into the following three categories: (1) design-based (e.g. propensity score (PS) and matching methods), (2) model-based (e.g. Bayesian nonparametric such as BART), and (3) combination of design- and model-based methods. Most of these methods rely on strong causal inference assumptions and correct model specification. For example, the most widely used causal inference method is the propensity score (PS) method. Despite the theoretical appeal of PS approaches, the validity of the study results hinges on the correct specification of the PS.

In contrast, the present methods are robust to model misspecification and provide a coherent and versatile framework useful for addressing time-varying adaptive treatment assignment and time-varying confounding, in addition to the more common single treatment setting.

Doubly robust (DR) approaches in general attempt to address model misspecification. For example, when the PS model is misspecified, a DR estimator produces a valid causal inference if the outcome modeling is correctly specified, therefore most existing DR methods utilize some combination of PS and outcome modeling. The most widely adopted is the augmented inverse probability treatment weighting (AIPTW), which augments the inverse probability treatment weighting (IPTW) by separate outcome modeling. Including the PS or a function of the PS into the outcome regression modeling as a covariate is another approach. However, comprehensive studies suggest that the performance of these widely adopted methods suffers from poor operating characteristics, in particular, the ATE estimates do not approach the truth as sample size increases. While regression after matching provides a better solution, there are many different matching approaches, and each presents additional problems, including discarding data and the need for an arbitrary caliper, as discussed above, which can severely limit generalizability of the results.

Unlike existing methods which suffer from poor operating characteristics under the most realistic setting of dual misclassification, i.e. where the true model behind the data generating processes of either the exposure or the outcome is unknown, the present methods enjoy robust properties in the sense that GPMatch does not require correct specification of either outcome or the treatment selection model.

The GPMatch estimates the treatment effect by inducing independence between two residuals: (i) the residual from treatment propensity estimate and (ii) the residual from the outcome estimate. While this is similar to the two-stage G-estimation method, it is also different in an important aspect. That is, the estimations of the parameters in the covariance function and the mean function are performed simultaneously in accordance with the methods described here, rather than in a two-step process. Therefore, the present methods can integrate the benefits of the regression model and matching method and provide a natural way for Bayesian causal inference to address the challenges unique to causal inference.

The utility of GPMatch is demonstrated analytically in the Examples of the present specification by considering a number of simulations ("settings") where the matching structure is known but which were designed to reflect the most realistic settings, i.e. those in which no knowledge of matching or functional form of outcome model is available. The robust and efficient proprieties of GPMatch are well supported by the simulation results. Further, the simulations show that GPMatch performs better than other commonly used methods such as augmented inversed probability of treatment weighting (AIPTW), linear regression modeling (LM), linear regression modeling with propensity score adjustment (LM_PS), linear regression modeling with spline fit propensity score adjustment (LM_sp(PS)), and Bayesian additive regression trees (BART).

In sum, the present methods provide several key improvements over similar prior methods. First, the methods provided here offer a principled approach to Bayesian causal inference utilizing GP prior covariance function as a matching tool, which accomplishes matching and flexible outcome modeling in a single step. Second, the present methods provide more relaxed causal assumptions than the widely adopted assumptions from the landmark paper by Rosenbaum and Rubin (1983). By admitting additional random errors in outcomes and in the treatment assignment, these new assumptions fit more naturally within the Bayesian framework. Under these weaker causal assumptions, the methods described here provide a robust approach to causal inference based on real world data.

In some implementations, the present methods are applied to comparative effectiveness studies of ATS and provide more consistent results and conclusions better supported by the data, compared to other methods. See e.g., Examples below showing the results of simulation studies for ATS and a clinical study for ATS. Accordingly, in some implementations, the methods described here may be configured to consider multi-level or clustered data structures; to accommodate complex types of treatment such as multiple level treatment and continuous or composite types of treatment, as well as time-varying treatments, for example by using a g-formula framework as described in more detail below. In some implementations of the present methods, the treatment may be a non-adaptive treatment, e.g., a single treatment administered once, or the treatment may be an adaptive treatment, e.g., two or more treatments administered at different times.

In some implementations, the present methods determine a specific causal parameter, such as the average treatment effect ("ATE") or conditional averaged treatment effect (CATE) which measures the difference in average outcomes between individuals assigned to the treatment group and those assigned to the control/comparator group in all samples or conditional on corresponding patient subgroup features.

In some implementations, the methods described here may be used to develop best practice guidance, for example by providing an assessment of different therapies administered to patients to determine the more effective therapy in a non-randomized setting.

Mahalanobis Distance (MD) refers to Euclidean distance adjusted for covariance in the data. Euclidean distance is the sum of the normalized distances for each covariate.

Propensity score (PS) estimates a logit model where the outcome variable is whether the unit was in treatment or control group. This overcomes the high-dimensionality problem by summarizing covariates with one number which is interpretable as the probability that the unit was in treatment group.

A nonparametric model refers to a statistical model in which no parametric functional form for the model is imposed. Instead, the number and nature of the parameters are flexible and based on the data, and are not fixed in advance. The GPMatch method described here differs from other nonparametric models in that it is specifically designed for causal inference, utilizing GP prior to achieve matching such that it addresses the confounding-by-indication issues inherent in comparative effectiveness research using observational data.

Guassian Process Covariance as a Matching Function

The Gaussian process (GP) prior has been widely used to describe biological, social, financial and physical phenomena, due to its ability to model highly complex dynamic systems and its many desirable mathematical properties. A "prior" as used herein refers to the prior probability distribution of an uncertain quantity, and is generally considered as the probability distribution that would express one's beliefs about this quantity before some evidence is taken into account. Bayesian modeling with GP prior, as described here, can be viewed as a marginal structural model (MSM) where the potential outcome under the no treatment condition, which may be referred to as "Y(0)", is modeled nonparametrically. As discussed above, it allows for predicting missing potential outcomes by a weighted sum of observed data, with larger weights assigned to those in closer proximity and smaller weights to those further away, much like a matching procedure.

To provide a causal inference method that is both robust to model misspecification and allows the Bayesian causal inference to account for confounding-by-indication within a full Bayesian framework, the invention provides a Bayesian nonparametric causal inference method that utilizes Gaussian process prior as the matching tool. The GP prior is formulated in such a way that, for each individual patient (i-th) in the sample, the GP prior allocates different weights to information obtained from other individual (j-th) patients, based on the confounding variables specified in GP prior. As such patients who are similar or dissimilar to the given patient are contributing more or less information, respectively, in estimating the expected outcomes for the (i-th) patient if treated under the different treatment option. By implementing matching and flexible modeling in the same step, the GPMatch method of the present invention offers protection against potential model misspecifications and produces accurate treatment effect estimates using real world patient data such as that obtainable from electronic medical records.

Stated more formally, the method utilizes Gaussian process prior as the matching tool, where the GP prior is formulated in such a way that, for each individual patient (i-th) in the sample, it allocates a weight range from 0 to 1 to the outcome observed from other (j-th) patients in the dataset, based on their similarity defined by the squared-exponential (SE) covariance matrix:

$$K(v_i, v_j) = \sigma_f^2 \exp\left(-\sum_{k=1}^{q} \frac{|v_{ki} - v_{kj}|^2}{\phi_k}\right)$$

For i, j=1, ... n. The $\phi_1, \phi_2, \ldots \phi_q$ are the length scale parameters for each of the covariates V.

Here, $v_{ki}$ and $v_{kj}$ are observed values of the k-th confounding variable for the i-th and j-th patient, correspondingly. The length scale parameters $\phi_k$ and variance $\sigma_f^2$ determine the smoothness and shape of the biologic mechanism, which are estimated based on the observed data.

As noted above, the SE covariance function is used for its ability to fit the smoothed response surface. By including confounding variables (denoted by V) into the covariance function, the GP prior specifies that patients with the same values of all confounding variables are matched completely, i.e. assigning a weight of 1. The matching utility of the GP prior can be considered as a matching process being performed for each i-th patient. The $K(v_i, v_j)$ determines how similar or dis-similar the j-th patient is compared to the i-th patient. It assigns a larger weight to patients who are similar, and less or zero weight to patients who are less similar or sufficiently different. As a consequence, GP prior accomplishes "matching" for each individual patient. Of note, while only a small set of data are used for "matching" the i-th patient, different sets are used for different patients. Collectively, no data are discarded, and all data are used for estimating the causal treatment effect.

After "matching", the methods described here estimate expected potential outcomes for a given patient by utilizing information from other "matched" patients who are sufficiently similar. The matching, weighting, and estimation processes are accomplished in a single step of Bayesian GP regression modeling. The method can easily incorporate different types of treatments. For example, continuous treatment and its potential higher order terms could be included in modeling treatment. Heterogeneous treatments can be evaluated by including treatment-by-covariate interactions. Higher order terms can be included to model a treatment effect as a nonlinear function of a continuous variable. The SE distance can be considered as an alternative metric to the MD, $$MD_{ij} = \sqrt{(v_i - v_j)S^{-1}(v_i - v_j)}$$

if $|v_{ik} - v_{jk}| < c$, for k=1, 2, ..., q; $\infty$ otherwise, where $c \in R_+$ is the caliper, S is the sample variance-covariance matrix of confounding variables v.

Of note, MD matching requires specification of a caliper. Smaller c leads to more precise matching but often results in a serious reduction in sample size after matching. Compared with MD matching, the methods described here do not require the arbitrary specification of a caliper. Instead, the length scale parameters ($\phi_k$), which governs the extent to which the data points are matched, are estimated from the data. The GPMatch method allows different length scale parameters for different confounding variables, such that it acknowledges that some confounders may play a relatively more important role in matching than other confounders. The variables with larger value of $\phi_k$ parameters are considered more important than those with smaller values.

Causal Assumptions—Non-Adaptive Treatment

Causal assumptions are necessary to ensure an unbiased estimate of the casual treatment effect. Most of the existing causal inference methods rely on three fundamental causal assumptions described by Rosenbaum and Rubin, "The central role of the propensity score in observational studies for causal effects." *Biometrika*. (1983) 70(1):41-55. These are the following.

Stable Unit Treatment Value Assumption (SUTVA): the potential outcomes of one experimental unit do not change despite how the treatment was assigned and are not related to the treatment received for the other experimental units.

Strong Ignorable Treatment Assignment Assumption (SIA): the treatment assignment (A) is independent from the potential outcomes $(Y_{(0)}, Y_{(1)})$ given the measured confounders. In other words, there is no unmeasured confounders in the study.

Positivity Assumption: this assumption ensures every unit has non zero probability of being assigned to either one of the treatment arms.

Causal assumptions are required within a PS framework, but the standard assumptions are overly strong. For example, it is expected that some outcome measures may be subject to some measurement error. Many factors may influence the treatment effect, such as pre-surgery procedures, timing of treatments, and concomitant medications. These factors are likely to subject the observed outcomes to additional noise. In addition, the unmeasured confounder assumption is overly strong for observational studies.

The present methods utilize an alternative and weaker or "relaxed" set of causal assumptions, which are described in more detail below and represented by the directed acyclic graphic (DAG) depicted with potential outcomes in FIG. 1.

The DAG in FIG. 1 considers, for ease of presentation, a one-time-point treatment assignment. The rectangular nodes of the DAG are observed or measured (these terms are used interchangeably) variables and the oval nodes are unobserved or unmeasured (these terms are used interchangeably) variables. Thus, X and V denote observed covariates, and Y is the observed outcome. The treatment assignment (A) is a binary indicator (A=0 or 1), where 0 indicates comparator/control or the naturally occurring condition and 1 indicates the intervention/treatment. Correspondingly, the potential outcomes, Y(0), Y(1), are two unmeasured variables.

The unmeasured covariates are denoted by U0, U1, and U2, representing three types of unmeasured covariates for Y(0),Y(1) and A, respectively. The potential outcome Y(0) under the controlled condition is determined jointly by X, a p-dimensional vector, and V, a q-dimensional vector, of the observed covariates plus an unmeasured covariate U0. Thus, (X, V, U0) are prognostic variables. Similarly, the potential outcome Y(1) under the intervention condition is determined jointly by the observed covariates (X, V) and the unobserved covariates (U0, U1). The observed outcome Y is a noisy version of the corresponding potential outcomes, with an error term epsilon (s). The treatment is assigned according to an unknown propensity score, which is determined by the baseline covariates V and unobserved U2. The observed baseline covariates X and V could be overlapping sets, whereas different symbols are used to distinguish their roles in biological mechanisms driving potential outcomes and the treatment assignment process, respectively. For example, X may include patient age, gender, genetic makeup, family disease history, past and current medication use as well laboratory results and other disease characteristics, which are directly related to the prognosis of the disease. The V may include the above X variable, as well as other factors influencing the treatment administered including insurance, social economic status of patient family, education and clinical centers. Most of these important X and V covariates are available in a patient registry and electronic medical records, thus are observable. Other factors, such as patient and clinician's personal preferences, cultural beliefs, and past experiences may play a role in treatment decisions. However, they are almost never recorded. These factors are collectively referred as U2. The DAG may also include additional paths among (U0, U1, X, V) to allow for correlation among them. These paths are not included FIG. 1 for clearer visual presentation.

As noted above, the methods described here make use of a more relaxed set of causal assumptions. For reference, the following provides a side-by-side comparison of the causal assumptions utilized by the present methods with the three widely adopted causal assumptions laid out by Rosenbaum and Rubin (1983) and discussed above.

CA1 Instead of the stable unit treatment value assumption (SUTVA), we utilize a stable unit treatment value expectation assumption (SUTVEA). The SUTVA assumes that the treatment applied to any unit has no effect on the outcome for any other unit. Both the SUTVA and the SUTVEA used in the present methods contain two components, but the SUTVEA differs in several important aspects. Specifically, (i) The consistency assumption of Rosenbaum and Rubin requires the observed outcome to be an exact copy of the potential outcome, i.e., SUTVA requires $Y_i = Y_i(0)(1-A_i) + Y_i(1) A_i$. In the present methods utilizing SUTVEA, we require only that the observed outcome is the same as the potential outcome subject to the "noise" discussed above: $Y \perp (X, V) | (A, Y(0), Y(1))$. In other words, using SUTVEA, we consider the observed outcome to be a noisy copy of the potential outcome where the expectation of the observed outcome is represented by:

$$E(Y_i) = Y_i(0)(1-A_i) + Y_i(1)A_i.$$

(ii) The no interference assumption of Rosenbaum and Rubin requires the potential outcomes of one experimental unit to be independent of the treatment of any other experimental unit, i.e., $Y_i(a) \perp Y_j(b)$. In the present methods utilizing SUTVEA, we allow for the treatment of one unit related to the potential outcome of the other unit, as long as the path is blocked by the observed covariate. In other words, we require $Y_i | Y_j | A, X, V$. In other words, the observed outcomes $Y_i$ and $Y_j$ for different individuals (i, j) are independent of each other, except as affected by the treatment assignment A and the observed covariates (X, V).

Importantly, and in contrast to prior methods, the SUTVEA assumption utilized by the present methods acknowledges the existence of residual random error in the outcome measure. In other words, the observed outcomes may differ from the corresponding true potential outcomes due to some measurement error. In addition, the observed outcomes may differ when the treatment actually received deviates from the intended treatment. This may occur, for example, due to such factors as the timing of the treatment, pre-surgery preparation procedures, or a concomitant medication. In addition, the SUTVEA assumption utilized by the present methods considers that the potential outcomes from different experimental units may be correlated, where the correlations are determined by the covariates. Since only one outcome can be observed out of all of the potential outcomes, the causal inference presents a highly structured missing data setup where the correlations between ($Y_i(1)$, $Y_i(0)$) are not directly identifiable. By admitting residual errors and allowing for explicit modeling of the covariance structure, the new assumptions utilized by the present methods provide a stronger statistical inference.

CA2. Similar to Rosenbaum and Rubin, we utilize the ignorable treatment assignment assumption $[Y(a)|A=1, X, V] = [Y(a)|A=0, X, V]$, for a=0, 1. This means that the marginal distribution of a potential outcome can be obtained by modeling the observed covariates only, independent from the treatment assignment. As depicted in the DAG, the presence of unmeasured confounders is admissible, as long as the back-door path from Y to A is blocked by the observed covariates. In practice, it is almost never possible to capture all of the considerations factored into a treatment decision, which may be influenced by factors such as personal preferences and past experiences. However, it is reasonable to assume that the uncounted residual error in treatment assignment, conditional on the observed covariates (e.g. patient demographics, insurance, disease characteristics, laboratory and medical diagnostic tests), is not related to the potential outcomes.

Thus, approaching causal inference as a missing potential outcome problem, we require a "missing at random" assumption for the joint distribution of the outcomes. This is equivalent to the missing at random assumption that is widely adopted in the missing data context. The assumption is necessary to ensure that the causal effect is identifiable. It does not require the unmeasured confounder assumption. Rather, it only requires that the minimum sufficient set be observed following the DAG. It allows for three types of confounders, ($U_0$, $U_1$, $U_2$). Although ($U_0$, $U_1$, $U_2$) are correlated with both (Y) and (A), one can see from the DAG that their existence does not affect the identifiability of the causal treatment effect and thus are admissible. If $U_2$ is null, then the assumption is equivalent to the strong ignorable treatment assignment assumption.

CA3. Positivity Assumption. As described in Rosenbaum and Rubin, we assume every sample unit has non-zero probability of being assigned into either one of the treatment arms, i.e., $0 < Pr(A_i | V_i) < 1$. This assumption is adopted to ensure the equipoise of the causal inference. Because one can never tell whether the lack of overlap in covariates is a manifestation of data sparsity or lack of equipoise, we assume that positivity is assured at the design stage, rather than the analytical stage.

The causal assumptions utilized by the present methods and represented in the DAG of FIG. 1 above may be represented by the following structural equations:

$$Y_i = A_i Y_i(1) + (1-A_i) Y_i(0) + \varepsilon_i$$

$$Y_i(a) = f(0)(x_i, v_i) + a(\tau(x_i) + u_{1i}) + u_{0i}$$

$$Pr(A_i) = \pi(v_i, u_{2i})$$

where $E(\varepsilon_i)=0$ and $E(uk_i)=0$, for $k=0, 1, 2$.

To ensure the causal treatment effect can be estimated without bias, the following condition must be true: $\varepsilon \perp (Y(0), Y(1))$, i.e., the measurement error in the observed outcome is independent from the potential outcomes; $(U0, U1) \perp A|X, V$, i.e., both of U0, the unmeasured covariate that is shared by both potential outcomes $Y(0)$ and $Y(1)$, and U1, the unmeasured covariates in the treatment effect, must be independent from the treatment assignment, conditional on the observed covariates; $U2 \perp \varepsilon$, i.e., the unmeasured covariates in treatment assignment must be independent from the measurement error in the outcome measure; and $U2 \perp Y|A, X, V$ i.e., U2 is independent from the observed outcome Y, conditional on the treatment assignment and the observed covariates. The notation $A \perp B$ indicates that A is independent of B. Violation of any of these conditional independence conditions can open up the back-door path from Y to A. The $f(0)(\cdot)$, $f(1)(\cdot)$ and $\pi(\cdot)$ are unknown functions that describe the potential outcome science mechanism and treatment assignment process. The treatment received by unit i is represented by tau ($\tau_i$). The sample averaged treatment effect of all individual level effects $\tau_i = \tau(x_i) + u_{1i}$, $\bar{\tau} = 1/n \sum_i \tau_i$ is the parameter of interest, which is referred as the averaged treatment effect (ATE).

Importantly, the DAG includes three types of unmeasured covariates, where U0 indicates unknown correlation between the pair of potential outcomes, U1 a potential lurking variable, and U2 a potential confounding variable. Under the conditional independence conditions, the observed covariates (X, V) is a minimum sufficient set for identifying causal treatment effect. Further, with assuming distinct model parameters, it is relatively straight forward to see that the posterior of the potential outcomes can be derived directly by $$[Y(0), Y(1) | A, X, V, Y] = \frac{[Y, Y(0), Y(1) | A, X, V]}{[Y | A, X, V]}$$

We introduce the method by considering a binary treatment and continuous outcome setting. More complex types of treatment, such as multilevel or continuous treatment, can be generalized as described below. Let the treatment assignment $A_i=1/0$, denote the i-th individual i assigned to the experimental (denoted by the numeral one, "1") or control (denoted by zero, "0") treatment, where the corresponding potential outcomes are $(Y_i(1), Y_i(0))$. Since an individual can receive only one treatment at a given time, one of the potential outcomes is unobservable, i.e., $Y_i(A_i)$ is observed, but $Y_i(1-A_i)$ is missing. Let $Y_i$ denote the observed outcomes, $X_i$, where $X_i$ represents the p-dimensional baseline covariates that are determinants of the potential outcomes, and $V_i$ represents the q-dimensional baseline standardized confounders, which are the pre-treatment covariates related to the treatment assignment. As noted above, the $X_i$ and $V_i$ baseline covariates may be overlapping and different symbols may be used to distinguish their roles in the science mechanisms, and the treatment assignment process, respectively. Let f(a) be the science mechanisms underlying the generation of potential outcomes, for a=0, 1:

$$Y_i(0) = f(0)(x_i, v_i)$$

$$Y_i(1) = f(1)(x_i, v_i) = f(0)(x_i, v_i) + \tau(x_i)$$

Here, $f^{(a)}$ could be the biological responses one has after receiving the given treatment (a), and L defines the causal treatment effect. Both may be a function of patient specific variables.

Let the treatment assignment mechanism be $A_i \sim \text{Ber}(\pi_i)$ where the true propensity score $\pi_i = Pr(A_i=1)$. Under the given treatment assignment, the observed outcome may be measured with error, and thus is a noisy version of the potential outcomes, $$Y_i = Y_i(0)(1-A_i) + Y_i(0) + \varepsilon_i \qquad (1)$$

where $E(\varepsilon_i)=0$. In other words, the observed outcome for the ith individual, under the assigned treatment $A_i$ has an expected mean of $E(Y_i|A_i, X_i, V_i) = Y_i(0)(1-A_i) + Y_i(1) A_i$. Thus, the observed data for the $i^{th}$ individual $(Y_i, A_i, X_i, V_i)$ is a realization of the joint actions between the science mechanisms and the treatment assignment.

The parameters of interest are the individual level and group level causal treatment effects. The individual level treatment effect, $\tau(x_i) = E(Y_i(1) - Y_i(0)|x_i)$ is a function of individual characteristics $(x_i)$. Here, we assume the individual level treatment effect differs by some known individual characteristics, such as age, gender, race, disease subtypes, or genotype. The population level average treatment effect, $\text{PATE} = E_x(\tau(x_i))$, is another causal parameter of interest from a policy and community perspective. However, because the sampling mechanism of the larger population is not generally available, the PATE cannot usually be estimated. Therefore, the sample average treatment effect, $\text{SATE} = 1/n \sum_i E(Y_i(1) - Y_i(0))$ is commonly used. The present methods may also be used to estimate the heterogeneous treatment effect. Here, we provide details for estimating the SATE, which for simplicity is referred to as "ATE".

The Causal Assumptions: Time-Varying Adaptive Treatment ("ATE")

For time-varying adaptive treatments, the causal assumptions CA1-CA3 are extended. For simplicity of presentation, without loss of generality, the causal assumptions are presented here for a two-stage setting.

$CA1_{ATS}$. (SUTVEA) The observed outcomes are some noisy versions of the corresponding potential outcomes $E(Y_{1i}) = Y_{1i}(0)(1-A_{0i}) + Y_{1i}(1)A_{0i}$, and $E(Y_{2i}) = (1-A_{0i})[Y_{2i}(00)(1-A_{1i}) + Y_{2i}(01)A_{1i}] + A_{0i}[Y_{2i}(10)(1-A_{1i}) + Y_{2i}(11)A_{1i}]$. The observed outcomes from different units are conditionally independent given the observed covariates $Y_{1i}(a) \perp Y_{1j}(b)|X_0, V_0$ and $Y_{2i}(a_0,a_1) \perp Y_{2j}(b_0,b_1)|X_0, V_0, X_1, Y_1$.

$CA2_{ATS}$. (Sequential MAR assumption for the outcomes) The joint distribution of the observed and potential outcomes following the k-th treatment assignment is independent from the actual k-th treatment assignment.

$$[Y_2, Y_2(A_00), Y2(A_01)|A_1=1, A_0, X_0, V_0, Y_1, X_1] = [Y_2, Y_2(A_00), Y_2(A_01)|A_1=0, A_0, X_0, V_0, Y_1, X_1]$$

$$[Y_1, Y_1(0), Y_1(1)|A_0=1, X_0, V_0, X_1] = [Y_1, Y_1(0), Y_1(1)|A0=0, X_0, V_0, X_1]$$

$$[X_1, X_1(0), X_1(1)|A_0=0, X_0, V_0] = [X_1, X_1(0), X_1(1)|A_0=1, X_0, V_0]$$

CA3$_{ATS}$. (Sequential Positivity Assumption) Every sample unit has a nonzero probability of being assigned into either one of the treatment arms at all treatment decision point, i.e. 0<Pr($A_{0i}$|$V_i$)<1, and 0<Pr($A_{1i}$|$A_{0i}$, $V_i$, $X_{1i}$, $Y_{1i}$)<1. The GPMatch Model Specifications We utilize a marginal structural model (MSM) which serves as the framework for Bayesian causal inference. The MSM specifies $$Y_i(1)=Y_i(0)+A_i\tau_i.$$

Without prior knowledge about the true functional form, we let $Y_i(0) \sim GP(\mu_f, K)$, where the mean function $\mu_f$ may be modeled by a parametric regression equation, and K defines the covariance function of the GP prior. Specifically, GPMatch is proposed as a partially linear Gaussian process regression fitting to the observed outcomes, $$Y_i = f_i(x_i, v_i) + A_i \tau(x_i) + \varepsilon_i,$$

where $$f_i(x_i, v_i) = \mu_f(x_i) + \eta(v_i),$$

$$\eta(v_i) \sim GP(0, K),$$

$$\varepsilon_i \sim N(0, \sigma_0),$$

$$\varepsilon_i \perp \eta_i$$

Here, we may let $\mu_f = ((1, X_i')\beta)_{n \times 1}$, where $\beta$ is a (1+p) dimension parameter vector of regression coefficients for the mean function. This is to allow for implementing any existing knowledge about the prognostic determinants to the outcome. Also, let $\tau = ((1, X_i')\alpha)_{n \times 1}$ to allow for potential heterogeneous treatment effect, where $\alpha$ is a (1+p) dimension parameter vector of regression coefficients for the treatment effect.

Let $Y_n = (Y_i)_{n \times 1}$, the model (2) can be re-expressed in a multivariate representation $$Yn|A, X, V, \gamma \sim MVN(Z'\gamma, \Sigma),$$

where $Z' = (1, X_i', A_i, A_i \times X_i')_{n \times (2+2p)}$, $\gamma = (\beta, \alpha)$, $\Sigma = (\sigma_{ij})_{n \times n}$ with $\sigma_{ij} = K(v_i, v_j) + \sigma_0^2 \delta_{ij}$. The $\delta_{ij}$ is the Kronecker function, $\delta_{ij} = 1$ if i=j, and 0 otherwise.

Gaussian process can be considered as distribution over function. The covariance function K, where $k_{ij} = Cov(\eta_i, \eta_j)$, plays a critical role in GP regression. It can be used to reflect the prior belief about the functional form, determining its shape and degree of smoothness. Where the data comes from an experimental design in which the matching structure is known, GP covariance can be formulated to reflect the matching structure. However, often the exact matching structure is not known and in these situations a natural choice for the GP prior covariance function K is the squared-exponential (SE) function, where $$K(v_i, v_j) = \sigma_f^2 \exp\left(-\sum_{k=1}^{q} \frac{|v_{ki} - v_{kj}|^2}{\varphi_k}\right)$$

for i, j=1, ... n. The ($\varphi_1, \varphi_2, \ldots \varphi_f$) are the length scale parameters for each of the covariates V.

There are several considerations in choosing the SE covariance function. The GP regression with SE covariance can be considered as a Bayesian linear regression model with infinite basis functions, which is able to fit a smoothed response surface. Because of the GP's ability to choose the length-scale and covariance parameters using the training data, unlike other flexible models such as splines or the supporting vector machine (SVM), GP regression does not require cross-validation. Moreover, the SE covariance function provides a distance metric that is similar to Mahalanobis distance, and therefore it can also function as a matching tool in accordance with the methods described here.

The model specification is completed by specification of the rest of priors.

$$\gamma \sim MVN(0, \omega \sigma_{lm}^2 (ZZ')^{-1})$$

$$\sigma_0^2 \sim IG(a_0, b_0)$$

$$\sigma_f^2 \sim IG(a_f, b_f)$$

$$\phi_k \sim IG(a_\varphi, b_\varphi)$$

Where $\omega = 10^6$, $a_\varphi = 1$, $a_0 = a_f = 2$, $b_0 = b_f = \sigma_{lm}^2/2$, $\sigma_{lm}^2$ is the estimated variance from a simple linear regression model of Y on A and X for computation efficiency.

The GPMatch algorithm can be summarized as follows. For "single stage" GPMatch, the process can be broken into four steps:

Step 1: Initialization

Initialize Treatment effect parameter r and the GP covariance matrix $\Sigma$

The GP covariance function is defined by $k_{ij} = Cov(Y_i, Y_j) \propto \exp(-d_{ij}^2)$, where $$d_{ij}^2 = \sum_k \frac{(X_{ki} - X_{kj})^2}{l_k}$$

is a function of the baseline covariates $X_i$. For each patient there is a matching neighborhood set $\mathcal{M}$, which is determine by $l_k$ the length scale parameter.

Step 2: Fitting GPMatch

The posterior of the parameters can be obtained by implementing a Gibbs sampling algorithm. This is done by first sampling the covariate function parameters from its posterior distribution [$\Sigma$|Data, $\alpha$, $\beta$] and then sampling the regression coefficient parameter associated with the mean function from its conditional posterior distribution [$\alpha$, $\beta$|Data, $\Sigma$], which is a multivariate normal distribution. In one implementation, a Gibbs sampling algorithm refers to a Markov chain Monte Carlo (MCMC) algorithm.

Step 3: Check Balance

Calculate the matching weight $w_{ij}$ based on the n x n GP covariance function, where $w_{ij} = k_i(x_j)'\Sigma^{-1}$, with the $k_i(x_j) = (k_{ij})_n$. $w_{ij}$ assigns weight 1 if $d_{ij} = 0$, i.e. the i-th and j-th patient share exactly the same feature; $w_{ij}$ assigns weight 0 if $d_{ij}$ is sufficiently large.

Calculate weighted average covariates after weighting $\tilde{X}_j = \Sigma_j w_{ij} X_j$ and before weighting $\overline{X}_j = \Sigma_j w_{ij} X_j$. Check Balance on all covariates on their distributions by treatment groups as assessed by the Mean absolute difference and the median absolute deviance. If not balanced, go back to Step 2.

Step 4: Estimating the Causal Treatment Effect and the Potential Outcomes

The individual level treatment effect is estimated by $\hat{\tau}(x_i)=(1, X_i)'\hat{\alpha}$ and the averaged treatment effect is estimated by $$\hat{ATE} = \sum_{i=1}^{n} \frac{\hat{\tau}(xi)}{n}.$$

Estimate $Y_i^{(0)} = \Sigma_{j \in \mathcal{M}i} w_{ij}(Y_j - A_j \hat{\tau}_{\tilde{X}})$, using data falling within the matching neighborhood set $\mathcal{M}$ Estimate $Y_i^{(1)} = Y_i^{(0)} + \hat{\tau}_{\tilde{X}}$ For checking balance, we compare the two treatment groups on a central tendency and a dispersion measure for each of the k-th baseline pre-treatment covariates, $k=1, \ldots, q$. Both central tendency and dispersion can be expressed as a general function $g_k(a)$, for $a=0,1$:

$$g_k(a) = \frac{1}{n_a} \sum_{\substack{i=1 \\ A_i=a}}^{n} g(X_{ki} - \tilde{X}_{ki}),$$

where, $\tilde{X}_i = \Sigma_{j=1}^{n} \hat{w}_{ij} X_j$, a weighted sum of observed baseline covariates.

The weights are estimated from fitting GPMatch model. For central tendency measure, $g_k(\bullet)$ is the identical function; for the dispersion measure, $g_k(\bullet)$ is the absolute value function.

To assess the extent to which GPMatch is able to achieve better balance, we compare the balance measure against the unadjusted simple linear regression model $Y \sim A$, in which case $w_{ij}=1$ and $\tilde{X}_{ki}=\overline{X}_k$. Thus under the identical function, we have a group mean difference $$g_k(1) - g_k(0) = \overline{X}_{k1} - \overline{X}_{k0}.$$

Under the absolute value function, we have a group difference on the mean absolute deviation (MAD)

$$g_k(1) - g_k(0) = \sum_{i \in (A_i=1)} |X_{ki} - \overline{X}_k| - \sum_{i \in (A_i=0)} |X_{ki} - \overline{X}_k|.$$

In the JIA case studies discussed infra, the method was focused on estimating the following average causal treatment effects:

1) The average treatment effect at stage 1 (ATE@ stage1): $\hat{E}(Y_1^{(1)} - Y_1^{(0)}|X_0)$; This is the treatment of the initial DMARD assignment. For Stage 1, GPMatch applies the single stage steps to the stage-1 data (baseline covariates, baseline treatment assignment (A0) and end of stage 1 outcomes. In addition, GPMatch saves the MCMC sequences of the posterior distribution of stage 1 model including the model parameters and the potential outcomes at the end of stage 1.

2) The average treatment effect at stage 2 conditional on the past treatment assignment and the patient's progression at the 6-month (CATE@Stage2): $\hat{E}(Y_2^{(a_0,1)} - Y_2^{(a_0,0)}|X_0, X_1(a_0)=x_1, Y_1(a_0)=y_1)$. This is the treatment effect of the $2^{nd}$ stage DMARD assignment given the past treatment and disease progression. For stage 2, GPMatch applies the single stage steps to the observed stage 2 data (pre-stage 2 treatment assignment covariates, including the end of stage 1 outcome measures of disease progression; stage 1 and stage 2 treatment assignments, A0 and A1; and end of stage 2 outcomes. In addition, GPMatch saves the MCMC sequences of the posterior distribution of the stage 2 model including the model parameters and the potential outcomes at the end of stage 1.

3) The marginal average treatment effect at the 12-month (the study endpoint) (MATE@Stage2): $E(Y^{(a_0,a_1)} - Y^{(a_0',a_1')}|X_0)$. This is the overall treatment effect over the 12 months, following different treatment sequences. Of note, this treatment effect is averaged over the intermediate responses to the initial treatment response. This is similar to a G-computation step and is performed for all patients. Here, the method generates potential outcomes at the end of stage 1 based on the stage 1 model; estimates the stage-1 treatment effect; generates potential outcomes at the end of stage 2 based on the stage 2 model; estimates the nested stage 2 treatment effect given the stage 1 responses and treatment assignment; integrates out the intermediate responses, estimates the marginal posterior; and estimates the marginal treatment effect.

Design of the GP Covariance Function as a Matching Tool

To demonstrate the utility of the GP covariance function as a matching tool, let us first consider design a covariance function for the known matching data structure. In other words, we assume for any given sample unit, we know who are the matching units. For simplicity, we consider fitting the data with a simple nonparametric version of the GPMatch, $$Y_n \sim MVN(\mu 1_n + \tau A_0, \Sigma). \qquad (5)$$

where $\Sigma = K + \sigma_0^2 I_n$.

With known matching structure, the GP covariance function may present the matching structure by letting $K=(k_{ij})$ n×n, where $k_{ij}=1$ indicates that the pair is completely matched, and $k_{ij}=0$ if unmatched. A common setting of the matched data can be divided into several blocks of subsample within which the matched data points are grouped together. Subsequently, we may rewrite the covariance function of the nonparametric GP model (5) as a block diagonal matrix where the $l^{th}$ block matrix takes the form $$\Sigma_l = \sigma^2[(1-\rho)I_{n_l} + \rho J_{n_l}]$$

where $\sigma^2 = 1 + \sigma_0^2$, $\rho = 1/\sigma^2$ and $J_{n_l}$ denotes the matrix of ones. The parameter estimates of the regression parameters can be derived by $$\begin{pmatrix} \hat{\mu} \\ \hat{\tau} \end{pmatrix} = \left[ \begin{pmatrix} 1_n' \\ A_n' \end{pmatrix} \Sigma^{-1} (1_n \ A_n) \right]^{-1} \begin{pmatrix} 1_n' \\ A_n' \end{pmatrix} \Sigma^{-1} Y_n.$$

It follows that the estimated average treatment effect is, $$\hat{\tau} = \frac{1_n' \Sigma^{-1} 1_n A_n' \Sigma^{-1} Y_n - A_n' \Sigma^{-1} 1_n 1_n' \Sigma^{-1} Y_n}{1_n' \Sigma^{-1} 1_n A_n' \Sigma^{-1} A_n - A_n' \Sigma^{-1} 1_n 1_n' \Sigma^{-1} A_n}.$$

Applying the Woodbury, Sherman & Morrison formula, we see $I^{-1}$ is a block diagonal matrix of $$\Sigma_l^{-1} = \frac{1}{\sigma^2(1-\rho)(1-\rho+n_l)} \left[(1+(n-1)\rho)I_{n_l} - \rho J_{n_l}\right].$$

Let $\bar{Y}_{l(a)}$ denote the sample mean of outcome and $n_{l(a)}$ number of observations for the control (a=0) and treatment group (a=1) within the $l^{th}$ subclass, l=1, 2, ..., L. The treatment effect can be expressed as a weighted sum of two terms $$\hat{\tau}=\lambda\hat{\tau}_1(1-\lambda)\hat{\tau}_0,$$

where $$\lambda = \frac{\rho D1}{\rho D1 + (1-\rho)D2}, \hat{\tau}_1 = \frac{C1}{D1} \text{ and } \hat{\tau}_0 = \frac{C2}{D2},$$

$$C1 = \Sigma_{q_l} n_l \times \Sigma q_l n_{l(1)} n_{l(0)} (\bar{Y}_{l(1)} - \bar{Y}_{l(0)}),$$

$$C2 = \Sigma q_k n_{l(0)} \times \Sigma_{q_l} n_{j(1)} \bar{Y}_{l(1)} - \Sigma q_l n_{l(1)} \times \Sigma q_j n_{l(0)} \bar{Y}_{l(0)},$$

$$D1 = \Sigma q_l n_l \times \Sigma q_l n_{l(1)} n_{l(0)},$$

$$D2 = \Sigma q_l n_{l(1)} \times \Sigma q_l n_{l(0)},$$

$q_l = (1-\rho+\rho n_l)^{-1}$, $n_l = n_{l(0)} + n_{l(1)}$ and the summations are over l=1, ..., L.

To assist with understanding this estimator, two special matching cases are exemplified below. The first is a matched twin experiment, where for each treated unit there is an untreated twin.
Here, we have a 2n×2n block diagonal matrix $$\Sigma_{2n} = I_n \otimes J_2 + \sigma_0 I_{2n}.$$

Thus, $$\sigma = 1 + \sigma_0^2, \rho = \frac{1}{1 + \sigma_0^2}, n_k = 2, n_{k(0)} = n_{k(1)} = 1.$$

Substitute them into the treatment effect formula derived above, and we have the same 1:1 matching estimator of treatment effect $\hat{\tau} = \bar{Y}_1 - \bar{Y}_0$.

The second example is a stratified randomized experiment, where the true propensity of treatment assignment is known. Suppose the strata are equal sized, $\Sigma$ is a block diagonal matrix of $I_L \otimes J_n + \sigma_0 I_n$, where L is total number of strata, the total sample size is N=Ln. It is straight forward to derive $$\sigma = 1 + \sigma_0^2, \rho = \frac{t}{1-\sigma_0^2}, n_l = n,$$

for l=1, ..., L. Then the treatment effect is a weighted sum of $$\hat{\tau}_1 = \frac{\sum n_{l(0)} n_{l(1)} (\tilde{Y}_{l(1)} - \tilde{Y}_{l(0)})}{\sum n_{l(0)} n_{l(1)}}.$$

Where the weight $$\lambda = \frac{N \sum n_{l(0)} n_{l(1)}}{n_1 n_0 \sigma_0^2 + N \sum n_{l(0)} n_{l(1)}}$$

is a function of sample sizes and $\sigma_0^2$. We can see when $\sigma_0^2 \to 0$, then $\lambda \to 1$, $\tau \to \hat{\tau}_1$. That is when the outcomes are measured without error, the treatment effect is a weighted average of $\bar{Y}_{l(1)} - \bar{Y}_{l(0)}$, i.e. the group mean difference for each strata. As $\sigma_0^2$ increase, $\lambda$ decrease, then the estimate of $\tau$ puts more weights on $\hat{\tau}_0$. In other words, GP estimate of treatment is a shrinkage estimator, where it shrinks the strata level treatment effect more towards the overall sample mean difference when outcome variance is larger.

More generally, instead of 0/1 match, the sample units may be matched in various degrees. By letting the covariance function takes a squared-exponential form, it offers a way to specify a distance matching, which closely resembles Mahalanobis distance matching. For a pair of "matched" individuals, i.e. sample units with the same set of confounding variables $v_i = v_j$, the model specifies $\text{Corr}(Y_i^{(0)}, Y_j^{(0)}) = 1$. In other words, the "matched" individuals are expected to be exchangeable. As the data points move further apart in the covariate space of $\Omega_v$, their correlation becomes smaller. When the distant is far apart sufficiently, the model specifies $\text{Corr}(Y_i^{(0)}, Y_j^{(0)}) \approx 0$ or "unmatched". Distinct length scale parameters are used to allow for some confounder playing more important roles than others in matching. By manipulating the values of $v_i$ and the corresponding length scale parameter, one could formulate the SE covariance matrix to reflect the known 0/1 or various degree of matching structure. However, the matching structure is usually unknown, and was left to be estimated in the GPMatch model informed by the observed data.

Estimating Averaged Causal Treatment Effect

Considering the one-stage setting, GPMatch fits the outcome Y by a marginal structural model (MSM):

$$Y_i = f(v) + A_i \tau(x) + \varepsilon_i, \quad (1)$$

for i=1, ..., n, where $f(\cdot) \sim GP(0, \cdot)$, and $\varepsilon_i \text{iid} \sim N(0, \sigma_0^2)$. Without loss of generality, we assume covariates X are a subset of V. We may let $\tau(x) = x_i^T \beta$, which allows for estimation of the conditional average causal treatment effect (CATE) given X. Letting $Y = (Y_1, ..., Y_n)$, we may rewrite (1) by a multivariate representation of $$Y | X, V, \beta \sim MVN(m, \Sigma), \quad (2)$$

where $m = (A_1 \times X_i^T \beta)_{n \times 1}$, $\Sigma = (\sigma_{ij})_{n \times n}$, $\sigma_{ij} = K(v_i, v_j) + \sigma_0 \delta_{ij}$, $$K(v_i, v_j) = \sigma_f^2 \exp\left(-\sum_{k=1}^{q} \frac{|v_{ki} - v_{kj}|^2}{\phi_k}\right), \quad (3)$$

for i,j=1, ..., n. The $(\emptyset_1, \emptyset_2, ..., \emptyset_q)$ are the length scale parameters for each of the covariates v. The $\delta_{ij}$ is the Kronecker function, $\delta_{ij} = 1$ if i=j, and 0 otherwise. The covariance function $K(v, v') = \text{Cov}(v, v')$ models the covariance structure between any two inputs $(v, v')$, $v \neq v'$. The two data points are increasingly correlated as they move closer in proximity within the covariate space.

To estimate average causal treatment effect:
1) The average treatment effect at stage 1 (ATE@stage1): $\hat{E}(Y_1^{(1)} - Y_1^{(0)} | X_0)$;
2) The average treatment effect at stage 2 is conditional on the past treatment assignment and the patient's responses (CATE@Stage2): $\hat{E}(Y_2^{(a_0,1)} - Y_2^{(a_0,0)} | X_0, X_1 (a_0) = x_1, Y_1(a_0) = y_1)$;
3) The marginal average treatment effect at the endpoint is marginalized over the intermediate responses (MATE@Stage2): $E(Y^{(a_0,a_1)} - Y^{(a_0',a_1')} | X_0)$.

Box 1 presents the GPMatch algorithm for estimating the average causal treatment effect and the potential outcomes $Y_i(a)$, that is, for a single time point treatment assignment.

---
Box 1. GPMatch Algorithm for one-time-point treatment assignment
---

1. Initialize $\tau$ and the covariance matrix $\Sigma$, where the GP covariance function is defined by the square exponential function of baseline covariates $X_i$
2. (matching step) Calculate matching weight $w_{ij}$ based on the GP covariance function, estimate $\hat{Y}_i^{(0)} = \sum_{j \in \mathcal{M}_i} w_{ij}(Y_j - A_j \hat{\tau})$, and $\tilde{A}_i = \sum_{j \in \mathcal{M}_i} w_{ij} A_j$, where $\mathcal{M}_i$ indicates matching set for the i-th unit. The weight $w_{ij} = k(v_j)' \Sigma^{-1}$, with $k(v_j) = (k(v_j, v_i))_{n \times 1}$ are the matching weights, which vary from individual to individual and is determined based on the matching distance metrics as defined previously.
3. Estimate treatment effect by solving the estimating equation $\Sigma_{i=1}^n (Y_i - \hat{Y}_i^{(0)} - A_i \tau)(A_i - \tilde{A}_i)$. If including mean function modeling, $\beta$ coefficient from the mean function are also estimated in this step the same time with $\tau$.
4. Update parameter estimates, including the length-scale parameters, for covariance matrix $\hat{\Sigma}$.
5. Repeat steps 2-4 via Gibbs Sampling.
6. Generate posterior MCMC for all model parameters, estimate the posterior of $[\hat{Y}_i(0), \hat{Y}_i(1)|X_i]$ for each patient.
7. Estimate the ATE@Stage1 for all patients.

---

For evaluating causal treatment effects of time-varying adaptive treatments (ATE), the GPMatch approach can be easily extended following the Bayesian's g-computation formula approach. Under the causal assumptions above, the g-computation formula factorizes the joint likelihood of all outcomes into a product of multiple conditional likelihoods of outcome models at each of the follow-up time points, given the past history of treatment and covariates, up to final study endpoint, for k=1, 2, . . . , K. The estimates of the Bayesian nonparametric model are used to predict the missing potential outcomes at each decision point, in a sequential generative model. Thus, the potential outcomes for any given treatment history are predicted, and the average treatment effect is estimated by the contrast between an intervention vs. the comparator ATS at the final study endpoint. Finally, the optimal ATS can be identified by maximizing the potential outcomes. Box 2 outlines the method used for a two time point treatment assignment.

Methods for Ensuring Quality Data

Comparative effectiveness studies are dependent on high quality data. Electronic health record (EHR) data represents a repository of real world data representative of the general population, which makes EHR data a suitable data source for generating real world evidence to guide treatment decisions. The methods described here utilize data quality assessment criteria that can be summarized as (i) completeness, (ii) correctness, and (iii) currency, to ensure high quality data. The methods for data quality assessment described here were performed through a combination of computer algorithms developed to address the unique problems associated with EHR data, and were supplemented, as needed, by manual chart review and text mining.

Careful validation and quality assessment steps are required to ensure the quality of data extracted from an EHR. In one implementation, a research study dataset taken from the same population as the EHR source data may be ---
Box 2. GPMatch Algorithm for two-time-point treatment assignment
---

1. Stage-1 Modeling
   1.1. Fit the GPMatch model for all the observed intermediate outcomes $X_{i1}$ immediate prior to the second treatment decision point. Here $X_{i1}$ includes the outcome of interest (e.g. cJADAS scoer at the 6 month) and other disease progression measurements (e.g. AJC, LOM, ESR, ect measures at the 6 month) to assess how well patients responded to the first treatment assignment. The GPMatch matches patients on their baseline variables, i.e. prior to the first treatment assignment.
   1.2. Generate posterior MCMC for all model parameters, estimate posterior of $[\hat{X}_{i,1}(0), \hat{X}_{i,1}(1)|X_{i,0}]$ for each patient following the one-time-point algorithm. Save the predicted $\hat{X}_{i,1}(0), \hat{X}_{i,1}(1)$ for the later g-computation step.
   1.3. Estimate the ATE@stage1 for intermediate outcome and for all intermediate treatment response covariate measures.
2. Stage-2 Modeling
   2.1. Fit GPMatch model for the final outcome $Y_i$. In the JIA CER study, $Y_i$ is the cJADAS score at the 12th month. The GPMatch matches patients on their baseline treatment (A0), baseline covariates (Xi0) and the treat responses (Xi1) measured at the end of first stage. This is because the second stage treatment assignment (A1) is determined adaptively in response to the patients' first stage assignment, patients' initial disease status and responses to the initial treatment assignment. The GPMatch estimates the treatment effect from the second stage.
   2.2. Generate posterior MCMC for all model parameters from the second stage, and estimate the posterior of $[\hat{Y}_i(00), \hat{Y}_i(01), \hat{Y}_i(10), \hat{Y}_i(11)|\hat{X}_{i,1}(0), \tilde{X}_{i,1}(1), X_{i,0}]$
   2.3 Estimate the conditional ATE, CATE@stage2 for treatment outcome at the end of second stage, conditional on the treatment history and patient responses at the end of stage1.
3. G-computation
   3.1. Integrate out the intermediate responses, estimate the posterior $[\hat{Y}_i(00), \hat{Y}_i(01), \hat{Y}_i(10), \hat{Y}_i(11)|X_{i,0}]$
   3.2. Estimate the marginal ATE, MATE@stage2 for all patients utilized as a validation dataset. For example, in accordance with a JIA case study described in the examples, the validation data were prospectively collected from a completed National Institues of Health (NIH) funded study which evaluated health-related quality of life for newly diagnosed JIA patients from the same pediatric rheumatology clinic as the EHR data. This served as appropriate validation data because its data fields were largely overlapping with our those of the EHRs used in the example below and were prospectively collected by a clinical research assistant via manual chart review and corroborated by in-person interviews. Therefore, it offered research-quality data extracted from the same EHR system.

Figure 2:
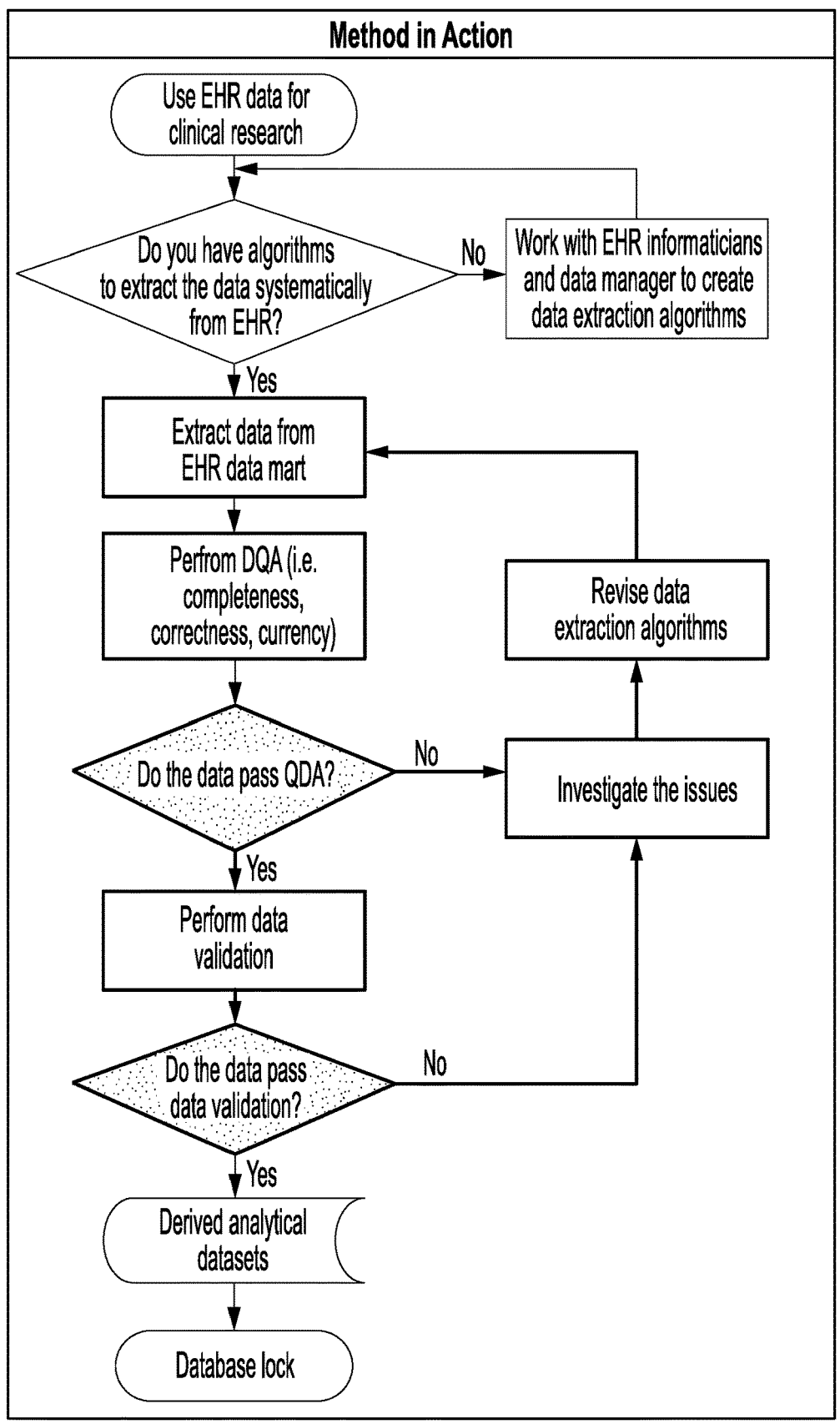
FIG. 2. Graphical depiction of an exemplary method for ensuring quality of electronic medical record (EMR or EHR) data.

In accordance with the methods described here, building a validated data extraction algorithm requires iterative steps of developing the initial algorithm, validating that algorithm by comparing against a validation dataset, and refining the algorithm, followed by additional validation. FIG. 2 depicts a graphical representation of the process. In some implementations, the initial algorithm is developed based on prior knowledge and a manual discovery of the EHR contents. For example, frequently, the same information is documented in different places due to the complexity and volume of data in EHR systems. In some implementations, all data fields are extracted to identify inconsistencies and the need for reconciliation. In some implementations, such an iterative process is performed for each of the key data fields, until the data pass the data quality assessment standards, summarized as (i) completeness, (ii) correctness, and (iii) currency.

Assessing completeness of data means determining if there are sufficient data for each patient and for each variable at each time point. Missing data is the most common challenge to ensuring high quality data. In retrospective data collection, it is impossible to collect data that were not recorded. However, sometimes missing data are not truly missing, and instead are located at some other place due to the dynamic feature of EHR systems. For example, a physician's global assessment may have been recorded in different locations at different times, due to changes made to the EHR system. It is therefore important to understand the history and structure of the EHR system being used as source data. Once such problems are identified, one may implement an extraction algorithm(s) to pull the corresponding values from the EHR system.

Another cause of missing for the particular dataset of JIA patients used in the clinical cases studies described herein is incomplete scoring. For example, in JIA, the active joint count is scored based on the joint assessment. While the EHR system used in the examples has an automatic calculation of the score, a large portion of the joint counts were nevertheless uncalculated. To uncover this type of missing data, we implemented a computation algorithm that recalculated the active joint count using the raw data recorded for each joint.

In some implementations, where missing data is stored in an unstructured format, other methods may be used to identify and extract the data. These include manual chart review and text mining. For example, in the context of the clinical case studies described in the examples, a manual chart review was undertaken in a subset of patients whose date of diagnosis was missing, since this was the key variable to determine patient's eligibility criteria.

Correctness encompasses the plausibility and concordance of the data across patients and variables. For plausibility, one should check if a data value exceeds a known range. For data with extreme values, it is a good idea to double-check even though the value may be plausible. In our case, this query identified an issue with height and weight, whereby different units were used.

A logistic query is another way to check for data correctness. For example, in our study, a reasonable temporal order of dates should be: date of birth<date of symptom onset<date of diagnosis<start date of first DMARD prescription. Violation of this temporal order could indicate incorrect data and the need for careful investigation into the underlying cause.

Finally, analysis of correlation coefficients can help to identify correctness issues. For example, in the context of the clinical case studies described in the examples, the physician's global assessment was recorded in three different places at different time periods. By correlating physician's global assessment with other disease activity indicator variables, we found that one of the fields was reverse-coded due to historical changes in the EHR system. This allowed us to recode the field and ensure correctness of the data.

Currency refers to the timeliness of recorded measures that are representative of patient disease status at a desired time frame. Because new medications may become available and clinical guidelines may change in time since a given study is designed, one should ensure that the data reflect current clinical practices. In the context of the clinical case studies described in the examples, the time of all clinical encounters was recorded. Thus, it was important to ensure that all time-dependent variables followed a temporal order and that data fields for corresponding visits could be aligned. For example, lab results were recorded into EHR as lab encounters, which usually were given a slightly later timing than the clinical encounter, even though the sample could have been collected at the corresponding clinical visit. In our study, we applied a 1-month time window to align the lab encounter with the clinical encounter, to ensure currency.

Comparing data values obtained by extraction algorithms with the corresponding data values in the validation dataset allowed us to evaluate the performance of the extraction algorithm. Such comparisons can be performed for patient level measures, such as JIA subtypes and diagnosis date. It could also be performed on patient encounter level variables, such as active joint counts, limited range of motion, patient well-being, and physician's global assessment.

Exemplary Implementations of a Software Package Comprising GPMatch

In a specific implementation, the disclosure provides a software package comprising GPMatch and one or more additional components. In accordance with a specific implementation, a GPMatch component is provided which functions to fit a linear model using GPMatch. Thus, GPMatch is used to fit a linear model within a Bayesian framework. As discussed above, a Guassian process (GP) prior covariance function is utilized as a matching tool to accomplish matching and flexible outcome modeling in a single step. The observations with missing covariates or outcomes are excluded from the model fit.

Outcomes Y follows a multivariate normal distribution as follows $$Y|tr,X1,X2,\gamma \sim MVN(Z\gamma,\Sigma),$$

where $Z=(X1 \text{ tr } tr*\text{hte})$, $\Sigma=(\sigma_{ij})$, with $\sigma_{ij}=K(X2_i, X2_j)+\sigma_0^2\delta_{ij}$. The $\delta_{ij}$ is the Kronecker function, $\delta_{ij}=1$ if i=j, and 0 otherwise. The GP prior covariance function K is the squared-exponential (SE) function, where $$K(X2_i, X2_j) = \sigma_f^2 \exp\left(-\sum_{k=1}^{q} \frac{|X2_{ki} - X2_{kj}|^2}{\phi_k}\right)$$

for i, j=1, ..., n, and k=1, ..., q. The $\varphi_k$, are the length scale parameters for each of the covariates X2 and q is the number of covariates in X2, The model specification is completed by specification of the rest of priors.

$$\gamma \sim MVN(0, \omega \sigma_{lm}^2 (ZZ')^{-1})$$

$$\sigma_0^2 \sim IG(a_0, b_0)$$

$$\sigma_f^2 \sim IG(a_f, b_f)$$

$$\varphi_k \sim IG(a_\varphi, b_\varphi)$$

We set $\omega=10^6$, $a_\varphi=b_\varphi=1$, $a_0=a_f=2$, $b_0=b_f=\sigma_{lm}^2/2$, $\sigma_{lm}^2$ is the estimated variance from a simple linear regression model of Y on A and X for computation efficiency.

Figure 3:
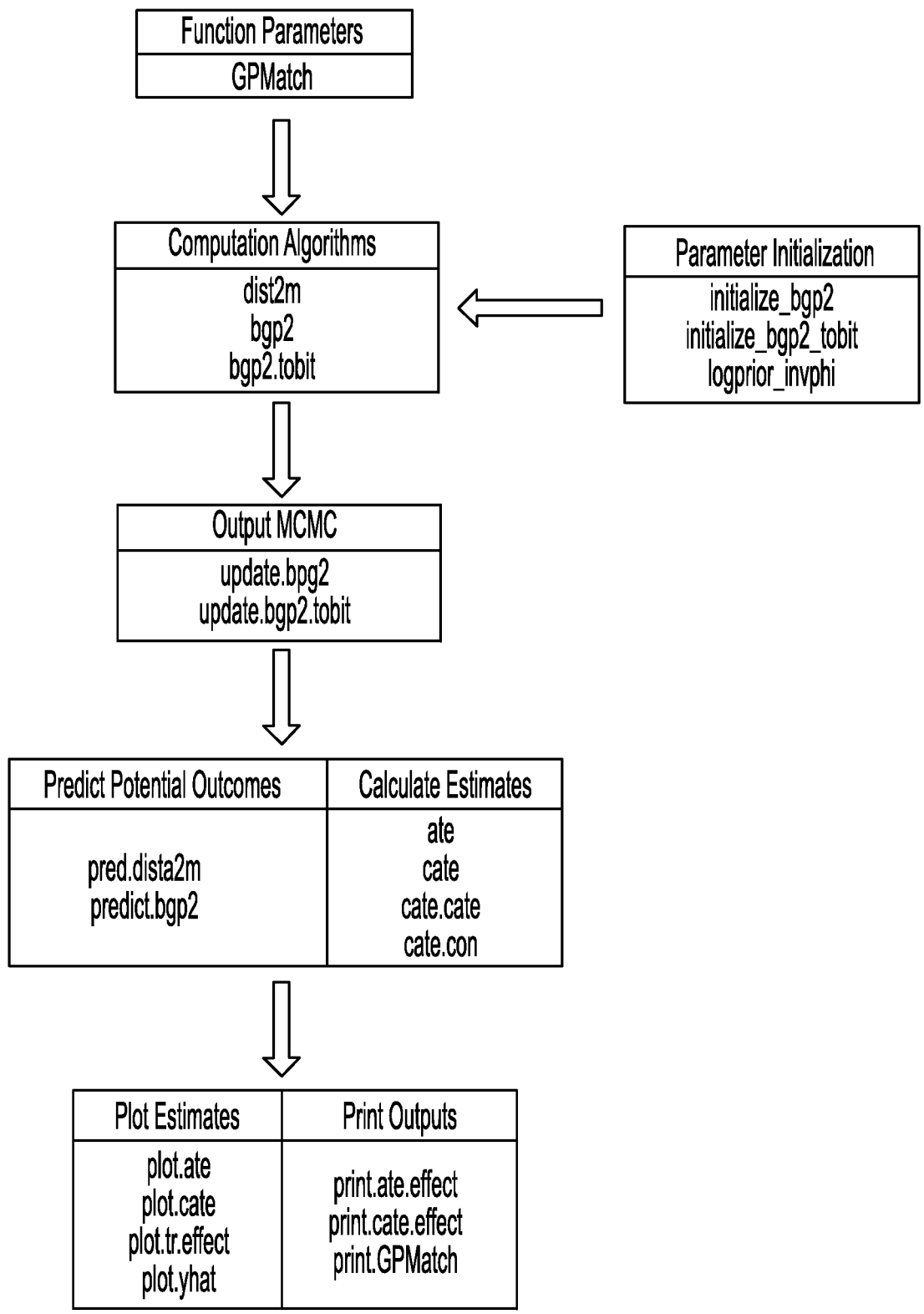
FIG. 3. Exemplary software package including GPMatch.
Figure 4:
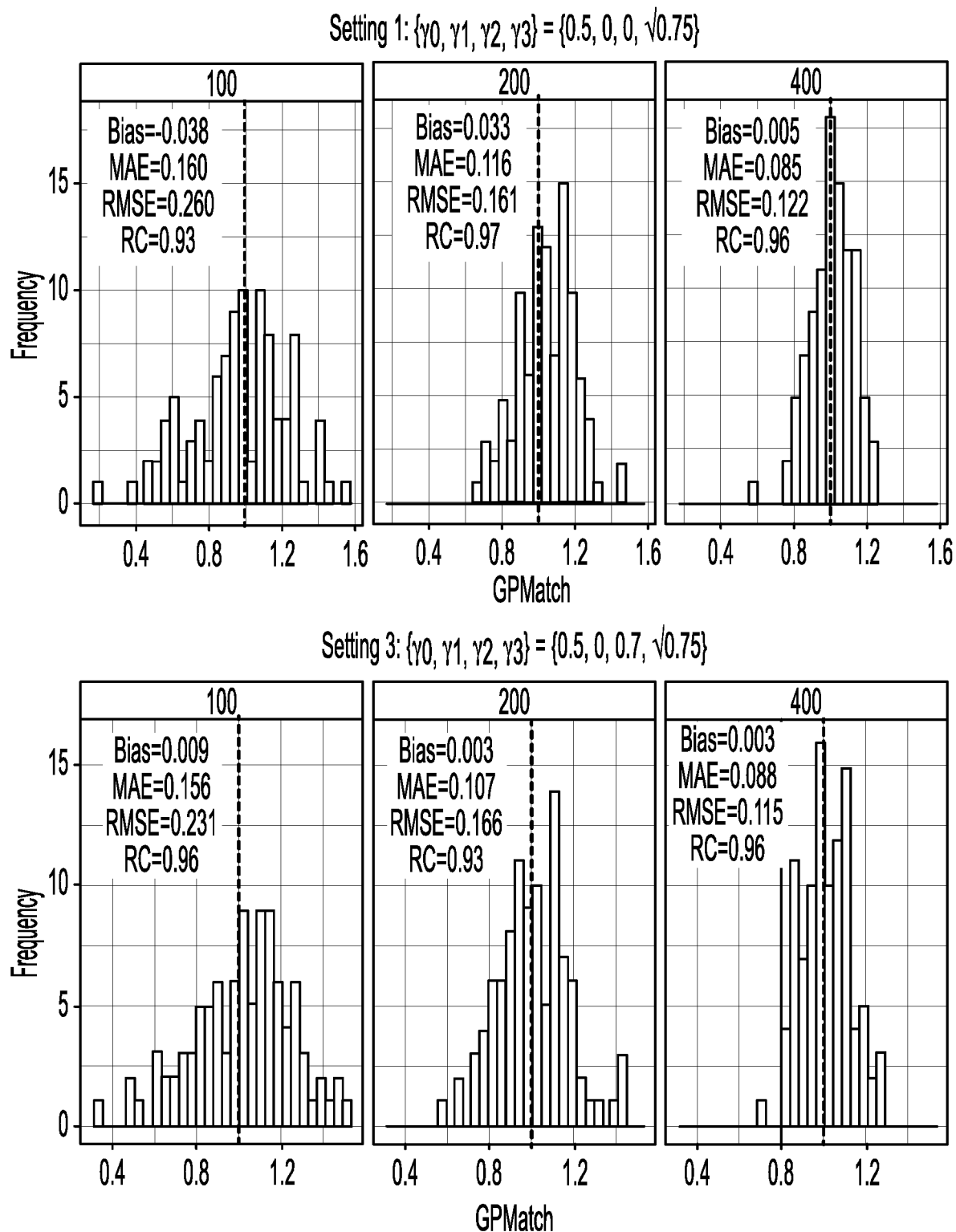
FIG. 4. Distribution of the GPMatch estimate of ATE by different sample sizes under the single covariate simulation study setting. Vertical line shows true effect. RSME, root mean square error; MAE, median absolute error; Bias=Estimate-True; Rc, Rate of coverage by the 95% interval estimate. Only treatment effect is included in the mean function; covariance function includes X.
Figure 4:
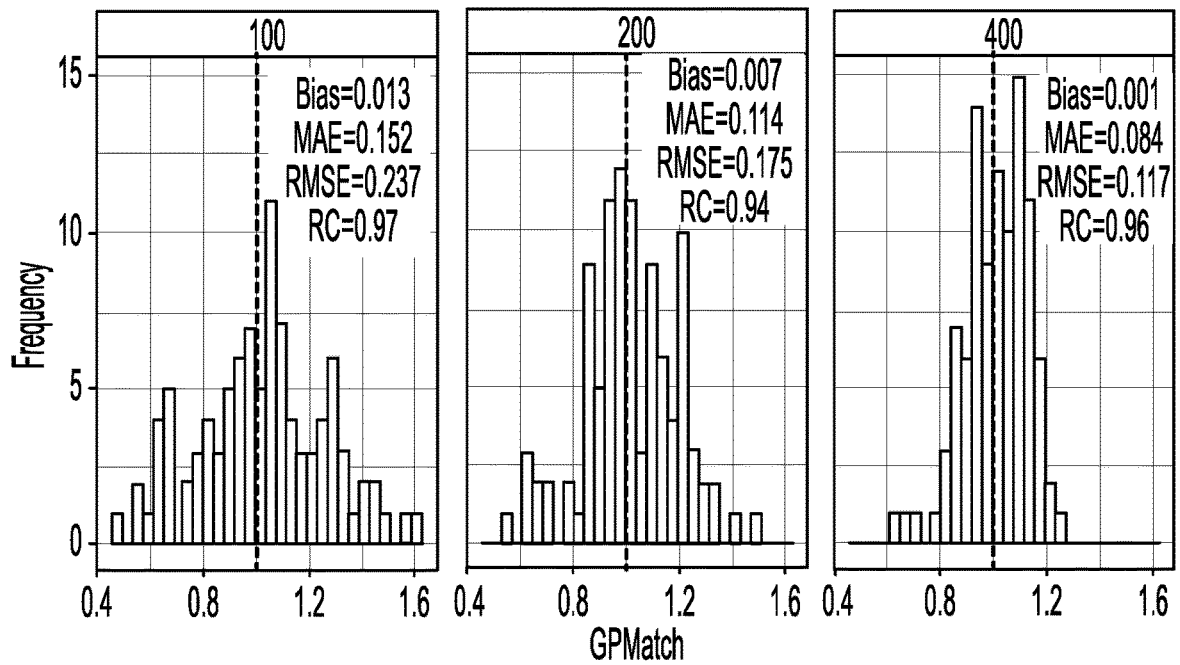
Figure 4:
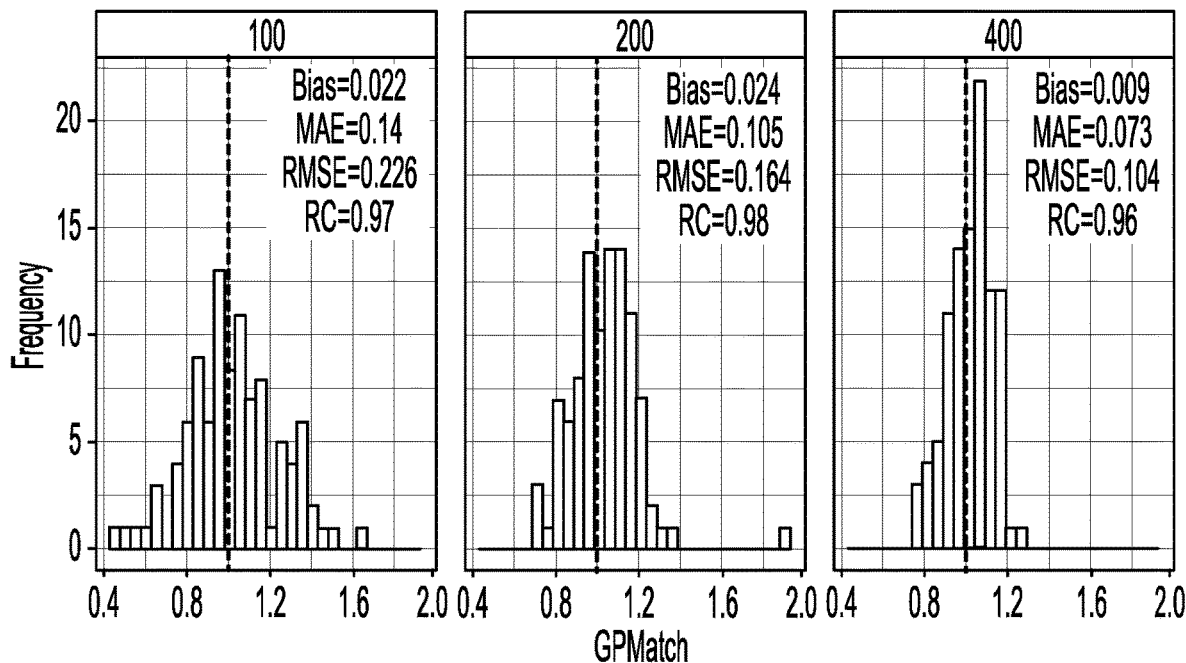

The GPMatch function may be included in a software package comprising additional components selected from computation algorithms, parameter initialization functions, output MCMC functions, predict potential outcomes and calculate estimates functions, and plot and printing functions. Computation algorithms may include one or more of dist2m, bgp2, and bgp2.tobit. Parameter initialization functions may include one or more of initialize_bgp2, initializebgp2_tobit, and logprior_invphi. Output MCMC functions may include update.bgp2 and update.bgp2.tobit. Predict potential outcomes functions may include pred.dista2m and predict.bgp2. Calculate estimates functions may include ate, cate, cate.cate, and cate.con. Plot estimates and print output functions may include one or more of plot.ate, plot.cate, plot.tr.effect, plot.yhat, print.ate.effect, print.cate.effect, and print.GPMatch. In some implementations, functions related to the heterogenous treatment effect ("HTE") may also be included. A specific implementation of a software package incorporating these elements is shown in FIG. 3. Further description of the various functions is provided below.

ate Get sample ATE: the algorithm estimates the sample averaged treatment effects ("ATE") of user-specified treatment groups. The sample potential outcomes for a data are provided based on the user-specified treatment values. If the treatment variable is a factor, the sample potential outcomes for each value of the levels of the treatment variable are given. The pairwise comparisons of treatment effects for all treatment groups are calculated. The sample potential outcomes and averaged treatment effects are estimated for the observations with non-missing variables in the model.

bgp2 Fit a model using GPMatch for a continuous outcome. bgp2 is used to fit a linear model for a continuous outcome by using GPMatch in the Bayesian paradigm bgp2.tobit Fit a model using GPMatch for a bounded continuous outcome. bgp2.tobit is used to fit a linear model for a bounded continuous outcome by using GPMatch in the Bayesian paradigm.

cate Get conditional average treatment effect. Estimates the conditional average treatment effects of user-specified treatment groups. The contrast of potential outcomes for the reference group and the treatment group is estimated at a list of x values if x is not a factor. If x is a factor, the conditional average treatment effect is estimated at each value of levels of x. The CATE is estimated based on the sample data. The observations with missing variables in the model are excluded. For the unspecified variables in the model, the original data is used to estimate the conditional average treatment effect.

cate_cat Get conditional average treatment effect for categorical variables. Estimates the conditional average treatment effects of user-specified treatment groups for categorical variables.

cate_con Get conditional average treatment effect for continuous variables. Estimates the conditional average treatment effects of user-specified treatment groups for continuous variables. The contrast of potential outcomes for the reference group and the treatment group is estimated at a list of var values.

dist2m Matrix for the variable in the covariance function. This generates a matrix which is used to calculate the variance-covariance matrix $\Sigma$ of the outcome y in GPMatch; gives a matrix with the element of $(x_i-x_j)^2$.

hte Get sample heterogeneous treatment effect. Estimates the sample heterogenous treatment effects of user-specified treatment groups. The contrast of potential outcomes for the reference group and the treatment group is estimated at a list of x values if x is not a factor. If x is a factor, the heterogeneous treatment effect is estimated at each value of levels of x. The HTE is estimated based on the sample data. The observations with missing variables in the model are excluded. For the unspecified variables in the model, the original data is used to estimate theheterogeneous treatment effect.

hte_cat Get heterogeneous treatment effect for categorical variables. Estimates the sample heterogeneous treatment effects of user-specified treatment groups for categorical variables.

hte_con Get heterogeneous treatment effect for continuous variables. Estimates the sample heterogeneous treatment effects of user-specified treatment groups for continuous variables. The contrast of potential outcomes for the reference group and the treatment group is estimated at a list of var values.

initialize_bgp2 Initialize data for fitting a GPMatch model. Prepares the data and gives the priors and initial values for the parameters in the model.

initialize_bgp2_tobit Initialize bounded data for fitting a GPMatch model. Prepares the data and gives the priors and initial values for the parameters in the model.

logprior_invphi Priors for Psi_Kappa. Used to give the priors for the invers of Psi Kappa which follow a gamma distribution with shape 1 and rate lambda.

plot.ate Averaged treatment effect plot. Gives an interactive figure of a histogram of the estimated averaged treatment effect. An exemplary histogram is shown in FIG. 4.

plot.cate Conditional averaged treatment effect plot. For a continuous variable, the estimated CATE and its 95% confidence interval by the values of the continuous variable are plotted. For a categorical variable, violin plots overlaid with box plots by the categorical variable are shown. An exemplary violin plot overlaid with box plots is shown in FIG. 21.

plot.hte Averaged treatment effect plot. For a continuous variable, the estimated HTE and its 95% confidence interval by the values of the continuous variable are plotted. For a categorical variable, violin plots overlaid with box plots by the categorical variable are shown.

plot.tr.effect Treatment effect or potential outcomes plot. Gives an interactive figure of a histogram of the estimated average treatment effect or potential outcomes. The figure is interactive. By hovering the pointers, users are provided with the corresponding posterior estimates of the treatment effectiveness and potential outcomes.

plot.yhat Potential outcomes plot. Gives an interactive figure of a histogram of the estimated potential outcomes.

pred.dist2m Matrix for prediction. Generates a matrix which is used to calculate the variance-covariance matrix Sigma of the prediction y to predict.gp2.

predict.gp2 Make a prediction on data using a GPMatch object. Makes a prediction on new data from a fitted GPMatch model.

print.ate.effect Summarize information about the estimated averaged treatment effects. Provides a summary of the "ate.effect" object.

print.cate.effect Summarize information about the estimated conditional average treatment effect. Provides a summary of a "cate.effect" object.

print.GPMatch Summarize information about a GPMatch object. Provides a summary of a "GPMatch" object. Gives the formula of the mean and covariance function used to build this GPMatch object. Prints the mean, median, standard error, 95% lower and upper bound of all coefficients.

print.hte.effect Summarize information about the estimated heterogeneous treatment effect. Provides a summary of a "hte.effect" object.

update.bgp2 Markov chain Monte Carlo (MCMC) for sampling from posterior distributions. Gives the MCMC from the posterior distributions using the Metropolis-Hastings method.

update.bgp2.tobit Markov chain Monte Carlo (MCMC) for sampling from posterior distributions. Gives the MCMC from the posterior distributions of bounded data using the Metropolis-Hastings method.

Further details regarding the usage, arguments, and values of the one or more additional components that may be included in the software package are provided below, along with an example where helpful.

ate

Usage

```
ate(fit, data, tr, tr.values = NULL, tr2.values = NULL)
```

Arguments

| fit | An object of class "GPMatch". |
|---|---|
| data | An optional data frame which contains the variables in the model. If data is not given, the data used to build this GPMatch object is taken. |
| tr | Names of treatment variables. At most two treatment variables are allowed. |
| tr.values | A vector of user-specified values of the first treatment variable listed in tr if the treatment variable is not a factor. If it is a factor, no value needs to be provided here. |
| tr2.values | A vector of user-specified values of the second treatment variable (if available) listed in tr if the treatment variable is not a factor. If it is a factor, no value needs to be provided here. |

Value

Returns an object of class "ate.effect" which contains a list of the following components:

| diff.est | A summary of the pairwise comparisons of treatment effects. |
|---|---|
| po.est | A summary of the sample potential outcomes for each treatment group. |
| A.level | The values of the first treatment variable. |
| A2.level | The values of the second treatment variable if available. |
| full.est | The set of posterior samples of the sample potential outcomes for each treatment group. |
| tr | The names of treatment variables. | bgp2

Example

```
##one treatment variable
##generate a data
set.seed(100)
n<-200
X<-rnorm(n)
P<-1/( 1 + exp(-(-0.2+3*X)))
eU<-runif(n)
A<-(P>=eU)
Y<-X+5*A+rnorm(n)
datause<-data.frame(cbind(A,X,Y))
datause$A<-as.factor(datause$A)
##fit a model
fit<-GPMatch("Y",tr="A",x1="X",x2="X",data=datause,burn.num=500,
mcmc.num=500)
##estimate sample averaged treatment effect
est<-ate(fit,tr="A")
est
##two treatment variables
##generate a data
set.seed(200)
n<-200
X<-rnorm(n)
Z<-rnorm(n)
P<-1/( 1 + exp(-(-0.2+3*X)))
eU<-runif(n)
A<-(P>=eU)
Y<-X+5*A+3*Z+rnorm(n)
datause2<-data. frame(cbind(A,Z, X,Y))
datause2$A<-as.factor(datause2$A)
##Fit a model
fit2<-GPMatch("Y",tr=c("A","Z"),x1="X",x2="X",data=datause2,burn
num=500, mcmc.num=500)
##estimate sample averaged treatment effect
est2<-ate(fit2,tr=c("A","2"),tr2.values=c(-0.5, 0, 0.5))
est2
``` bgp2
Usage bgp2(formulaM0, formulaV0, data, burnin = 2000, mcmc = 2000, thin = 1, seed = NA, verbose = F)

Arguments

| | |
|---|---|
| formulatiM0 | an object of class formula: a symbolic description of the mean function. The details of model specification are given in GPMatch. |
| formulaV0 | an object of class formula: a symbolic description of the variance function. |
| data | A data frame which contains the variables in the model. |
| burnin | numeric; the number of MCMC 'burn-in' samples, i.e. number of MCMC to be discarded. |
| mcmc | numeric; the number of MCMC samples after 'burn-in'. |
| thin | thinning of MCMC samples. |
| seed | Optional; sets the seed in R. |
| verbose | logical; if TRUE, prints information about progress of the algorithm to the screen. |

Value

| | |
|---|---|
| model | A list of the model frame used. |
| dat | A list of the data used. |
| bmtl | The information of MCMC sample. |
| initial | The initial values of the parameters in the model. |
| mcpar | The set of posterior samples of the parameters in the model. |
| last | The last draw from the posterior distributions. |
| nparm | The number of the parameters in the model. |
| mPostProb | The posterior distributions. |
| prior | The priors of the parameters in the model. | bgp2.tobit
Usage bgp2.tobit(formulaM0, formulaV0, LS = rep(F, dim(data)[1]), lower = −Inf, upper = Inf, data, burnin = 2000, mcmc = 2000, thin = 1, seed = NA, verbose = F)

Arguments

| | |
|---|---|
| fit | An object of class "GPMatch". |
| formulaM0 | an object of class formula: a symbolic description of the mean function. The details of model specification are given in GPMatch. |
| formulaV0 | an object of class formula: a symbolic description of the variance function. |
| LS | a vector specifying if the lower bound or the upper bound is achieved. |
| lower | Lower bound. |
| upper | Upper bound. |
| data | a data frame which contains the variables in the model. |
| burnin | numeric; the number of MCMC 'burn-in' samples, i.e. number of MCMC to be discarded. |
| mcmc | numeric; the number of MCMC samples after 'burn-in'. |
| thin | thinning of MCMC samples. |
| seed | Optional; sets the seed in R. |
| verbose | logical; if TRUE, prints information about progress of the algorithm to the screen. |

Value

| | |
|---|---|
| model | A list of the model frame used. |
| dat | A list of the data used. |
| bmtl | The information of MCMC sample. |
| initial | The initial values of the parameters in the model. |
| mcpar | The set of posterior samples of the parameters in the model. |
| last | The last draw from the posterior distributions. |
| nparm | The number of the parameters in the model. |
| mPostProb | The posterior distributions. |
| prior | The priors of the parameters in the model. | cate
Usage cate(fit, x, data, tr, control.tr, treat.tr, cut points = NULL, n = 20)

Arguments

| | |
|---|---|
| fit | An object of class "GPMatch". |
| x | The name of variable which may have the heterogeneous treatment effect. |
| data | An optional data frame which contains the variables in the model. If data is not given, the data used to build this GPMatch object is taken. |
| tr | Name of treatment variable. |
| control.tr | The value of the treatment variable as the reference group. |
| treat.tr | The value of the treatment variable compared to the reference group. |
| cutpoints | User-specified values of x which are used to estimate the conditional average treatment effect if x is not a factor. |
| n | The number of equally spaced points at which the conditional average treatment effect is to be estimated if x is not a factor. If cutpoints is not given, n is used to generate the conditional average treatment effect. The default value of n is 20 |

Value

Return an object of class "cate.effect" which contains a list of the following components:

| out | A data frame containing the posterior samples of the estimated conditional average treatment effect. |
|---|---|
| A.level | The values of the treatment variable. |
| dep | The name of the response variable in "GPMatch" object. |

Example

```
##one treatment variable
##generate a data
set.seed(100)
n<-200
X<-rnorm(n)
P<-1/( 1 + exp(-(-0.2+3*X)))
eU<-runif(n)
A<-(P>=eU)
Y<-X+5*A+3*A*X+rnorm(n)
datause<-data.frame(cbind(A,X,Y))
datause$A<-as. factor(datause$A)
##fit a model
fit<-
GPMatch("Y",tr="A",x1="X",x2="X",hte="X",data=datause,burn.num
=500, mcmc.num=500)
##estimate conditional average treatment effect
cate.est<-cate(fit,x="X",tr="A",control.tr=0,treat.tr=1)
cate.est
cate.est2<-
cate(fit,x="X",tr="A",control.tr=0,treat.tr=1,cutpoints = c(-
2,-1,-0.5,0,0.5,1,1.5,2))
cate.est2
##two treatment variables
##generate a data
set.seed(200)
n<-200
X<-rnorm(n)
Z<-rnorm(n)
P<-1/( 1 + exp(-(-0.2+3*X)))
eU<-runif(n)
A<-(P>=eU)
Y<-X+5*A+3*Z+2*A*Z+rnorm(n)
datause2<-data.frame(cbind(A,Z,X,Y))
datauseaA<-as.factor(datause2$A)
##fit a model
fit2<-
GPMatch("Y",tr=c("A","Z"),x1="X",x2="X",hte="Z",data=datause2,
burn.num=500, mcmc.num=500)
##estimate conditional average treatment effect
cate.fit2<-cate(fit2,x="Z",tr="A",control.tr=0,treat.tr=1)
cate.fit2
``` cate_cat

Usage

| cate_cat(fit, data, tr, var, control, treat) |
|---|

Arguments

| fit | An object of class "GPMatch". |
|---|---|
| data | An data frame which contains the variables in the model. |
| tr | Name of treatment variable. |
| var | The name of variable which may have the heterogeneous treatment effect. |
| control | The value of the treatment variable as the reference group, |
| treat | The value of the treatment variable compared to the reference group. |

Value

| out | A data frame containing the posterior samples of the estimated conditional average treatment effect |
|---|---|
| A. level | The values of the treatment variable. |
| Dep | The name of the response variable in "GPMatch" object. | cate_con

Usage

| cate_con(fit, data, tr, var, control, treat, cutpoints, n) |
|---|

Arguments

| fit | An object of class "GPMatch". |
|---|---|
| data | An data frame which contains the variables in the model. |
| tr | Name of treatment variable. |
| var | The name of variable which may have the heterogeneous treatment effect. |
| control | The value of the treatment variable as the reference group, |
| treat | The value of the treatment variable compared to the reference group. |
| cutpoints | User-specified values of var which are used to estimate the conditional average treatment effect. |
| n | The number of equally spaced points at which the conditional average treatment effect is to be estimated. |

Value

| out | A data frame containing the posterior samples of the estimated conditional average treatment effect |
|---|---|
| A. level | The values of the treatment variable. |
| Dep | The name of the response variable in "GPMatch" object. | dist2m

Usage

| dist2m(x) |
|---|

Arguments

| x | a numeric vector. |
|---|---|

Value

| A | matrix |
|---|---|

Example dist2m(c(1,2,3))

GPMatch

Usage

| GPMatch(y, tr, x1 = NULL, x2 = NULL, hte = NULL, hte2 = NULL, data, censor = FALSE, lower.bound = -Inf, upper.bound = Inf, burn.num = 1000, mcmc.num = 1000, thin=1, verbose=T, seed = 5000) |
|---|

Arguments

| | |
|---|---|
| y | The name of response variable. |
| tr | Names of treatment variables. At most two treatment variables are allowed. |
| x1 | An optional vector specifying variables in the mean function. |
| x2 | A vector specifying variables in the covariance function. |
| hte | An optional vector specifying variables which may have heterogeneous treatment effect with the first treatment variable listed in tr. |
| hte2 | An optional vector specifying variables which may have heterogeneous treatment effect with the second treatment variable (if available) listed in tr. |
| data | A data frame which contains the variables in the model. |
| censor | logical; if TRUE, outcomes are bounded, If FALSE, outcomes are not bounded. |
| lower. bound | Lower bound if censor is TRUE. |
| upper. bound | Upper bound if censor is TRUE. |
| burn. num | numeric; the number of MCMC 'burn n' samples, i.e. number of MCMC to be discarded. |
| mcmc. num | numeric; the number of MCMC samples after 'burn-in'. |
| thin | thinning of MCMC samples. |
| verbose | logical; if TRUE, prints information about progress of the algorithm to the screen. |
| seed | Optional; sets the seed in R. |

Value

Return of an object of class "GPMatch" which contains a list of the following components

| | |
|---|---|
| model | A list of the model frame used. |
| dat | A list of the data used. |
| bmtl | The information of MCMC sample. |
| initial | The initial values of the parameters in the model. |
| mcpar | The set of posterior samples of the parameters in the model. |
| last | The last draw from the posterior distributions. |
| nparm | The number of the parameters in the model. |
| mPostProb | The posterior distributions. |
| prior | The priors of the parameters in the model. |

Example

```
###########one treatment variable
##generate a data
set. seed(100)
n<-200
X<-rnorm(n)
P<-1/( 1 + exp(-(-0.2+3*X)))
eU<-runif(n)
A<-(P>=eU)
Y<-X+5*A+rnorm(n)
datause<-data. frame(cbind(A,X,Y))
datause$A<-as.factor(datause$A)
##fit a model
fit<-
GPMatch("Y",tr="A",x1="X",x2="X",data=datause,burn.num=500,
mcmc.num=500)
fit
#########two treatment variables
##generate a data
set. seed(200)
n<-200
X<-rnorm(n)
Z<-rnorm(n)
P<-1/( 1 + exp(-(-0.2+3*X)))
eU<-runif(n)
A<-(P>=eU)
Y<-X+5*A+3*Z+rnorm(n)
datause2<-data.frame(cbind(A,Z,X,Y))
datause2$A<-as. factor(datause2$A)
##fit a model
fit2<-
GPMatch("Y",tr=c("A","2"),x1="X",x2="X",data=datause2,burn.num
=500, mcmc.num=500)
```

-continued

```
fit2
##########with hte treatment effect
##generate a data
set.seed(200)
n<-200
X<-rnorm(n)
Z<-rnorm(n)
P<-1/( 1 + exp(-(-0.2 *X)))
eU<-runif(n)
A<-(P>=eU)
Y<-X+5*A+3*Z+2*A*Z+rnorm(n)
datause2<-data. frame(cbind(A, Z,X,Y))
datause2$A<-as. factor(datause2$A)
##fit a model
fit3<-
GPMatch("Y",tr=c("A","2"),x1="X",x2="X",hte="Z",data=datause2,
burn.num.500, mcmc.num=500)
fit3
###########censored outcomes
##generate a data
set.seed(100)
n<-200
X<-rnorm(n)
P<-1/( 1 + exp(-(-0.2+3*X)))
eU<-runif(n)
A<-(P>=eU)
Y<-2+X+5*A+rnorm(n)
Y<-ifelse(Y<0,0,Y)
datause<-data.frame(cbind(A,X,Y))
datause$A<-as.factor(datause$A)
##fit a model
fit4<-
GPMatch("Y",tr="A",x1="X",x2="X",data=datause,censor=TRUE,lower,bound=0,burn.num=500, mcmc.num=500)
fit4
``` hte

Usage

```
hte(fit, x, data, tr, control.tr, treat.tr, cut points =
    NULL, n = 20)
```

Arguments

| | |
|---|---|
| fit | An object of class "GPMatch". |
| x | The name of variable which may have the heterogeneous treatment effect. |
| data | An optional data frame which contains the variables in the model. If data is not given, the data used to build this GPMatch object is taken. |
| tr | Name of treatment variable. |
| control. tr | The value of the treatment variable as the reference group. |
| treat.tr | The value of the treatment variable compared to the reference group. |
| cutpoints | User-specified values of x which are used to estimate the heterogeneous treatment effect if x is not a factor. |
| n | The number of equally spaced points at which the heterogeneous treatment effect is to be estimated if x is not a factor. If cutpoints is not given, n is used to generate the heterogeneous treatment effect. The default value of n is 20 |

Value

Return an object of class "hte.effect" which contains a list of the following components:

| | |
|---|---|
| out | A data frame containing the posterior samples of the estimated heterogeneous treatment effect. |
| A.level | The values of the treatment variable. |
| dep | The name of the response variable in "GPMatch" object. |

Example

```
##one treatment variable
##generate a data
set.seed(100)
n<-200
X<-rnorm(n)
P<-1/( 1 + exp(-(-0.2+3*X)))
eU<-runif(n)
A<-(P>=eU)
Y<-X+5*A+3*A*X+rnorm(n)
datause<-data.frame(cbind(A,X,Y))
datause$A<-as. factor(datause$A)
##fit a model
fit<-
GPMatch("Y",tr="A",x1="X",x2="X",hte="X",data=datause,burn.num
=500, mcmc.num=500)
#ftestimate sample heterogeneous treatment effect
hte.est<-hte(fit,x="X",tr="A",control.tr=0,treat.tr=1)
hte.est
hte.est2<-hte(fit,x="X",tr="A",control.tr=0 reat 1,cutpoints =
c(-2,-1,-0.5,0,0.5,1,1.5,2))
hte.est2
#fttwo treatment variables
#ftenerate a data
set.seed(200)
n<-200
X<-rnorm(n)
Z<-rnorm(n)
P<-1/( 1 + exp(-(-0.2+3*X)))
eU<-runif(n)
A<-(P>=eU)
Y<-X+5*A+3*A*Z+2*A*Z+rnorm(n)
datause2<-data.frame(cbind(A,Z,X,Y))
datauseaA<-as.factor(datause2$A)
Wit a model
fit2<-
GPMatch("Y",tr=c("A","Z"),x1="X",x2="X",hte="Z",data=datause2,
burn.num=500, mcmc.num=500)
Uffestimate sample heterogeneous treatment effect
hte.fit2<-hte(fit2,x="Z",tr="A",control.tr=0,treat.tr=1)
hte.fit2
``` hte_cat

Usage hte__cat(fit, data, tr, var, control, treat)

Arguments

| | |
|---|---|
| fit | An object of class "GPMatch". |
| data | An data frame which contains the variables in the model. |
| tr | Name of treatment variable. |
| var | The name of variable which may have the heterogeneous treatment effect. |
| control | The value of the treatment variable as the reference group, |
| treat | The value of the treatment variable compared to the reference group. |

Value

| | |
|---|---|
| out | A data frame containing the posterior samples of the estimated heterogeneous treatment effect |
| A. level | The values of the treatment variable. |
| Dep | The name of the response variable in "GPMatch" object. | hte_con

Usage hte__con(fit, data, tr, var, control, treat, cutpoints, n)

Arguments

| | |
|---|---|
| fit | An object of class "GPMatch". |
| data | An data frame which contains the variables in the model. |
| tr | Name of treatment variable. |
| var | The name of variable which may have the heterogeneous treatment effect. |
| control | The value of the treatment variable as the reference group, |
| treat | The value of the treatment variable compared to the reference group. |
| cutpoints | User-specified values of var which are used to estimate the heterogeneous treatment effect. |
| n | The number of equally spaced points at which the heterogeneous treatment effect is to be estimated. |

Value

| | |
|---|---|
| out | A data frame containing the posterior samples of the estimated heterogeneous treatment effect |
| A. level | The values of the treatment variable. |
| Dep | The name of the response variable in "GPMatch" object. | initialize_bgp2

Usage

> initialize_bgp2(formulaM00, formulaV0, data)

Arguments

| | |
|---|---|
| formulatiM0 | an object of class formula: a symbolic description of the mean function. The details of model specification are given in GPMatch. |
| formulaV0 | an object of class formula: a symbolic description of the variance function. |
| data | A data frame which contains the variables in the model. |

Value

| | |
|---|---|
| model | A list of the model frame used. |
| dat | A list of the data used. |
| bmtl | The information of MCMC sample. |
| initial | The initial values of the parameters in the model. |
| mcpar | The set of posterior samples of the parameters in the model. |
| last | The last draw from the posterior distributions. |
| nparm | The number of the parameters in the model. |
| mPostProb | The posterior distributions. |
| prior | The priors of the parameters in the model. | initialize_bgp2_tobit

Usage

> initialize_bgp2_tobit(formulaM0, formulaV0, LS = rep(F, dim(data)E1]), data)

Arguments

| | |
|---|---|
| formulatiM0 | an object of class formula: a symbolic description of the mean function. The details of model specification are given in GPMatch. |
| formulaV0 | an object of class formula: a symbolic description of the variance function. |
| LS | a vector specifying if the lower bound or the upper bound is achieved. |
| data | A data frame which contains the variables in the model. |

Value

| | |
|---|---|
| model | A list of the model frame used. |
| dat | A list of the data used. |
| bmtl | The information of MCMC sample. |
| initial | The initial values of the parameters in the model. |
| mcpar | The set of posterior samples of the parameters in the model. |
| last | The last draw from the posterior distributions. |
| nparm | The number of the parameters in the model. |
| mPostProb | The posterior distributions. |
| prior | The priors of the parameters in the model. | logprior_invphi

Usage

> logprior_invphi(x, lambda = 1)

Arguments

| | |
|---|---|
| x | numeric |
| lambda | numeric; the rate of the gamma distribution |

Value log(f)

Example

GPMatch plot.ate

Usage

> plot. ate(x)

Arguments

| | |
|---|---|
| x | An object of class "ate.effect" |

Value

None plot.hte

Usage

> plot.hte(x)

Arguments

| | |
|---|---|
| x | An object of class "ate.effect" |

Value

None

Example

```
##generate a data
set.seed(200)
n<-200
X<-rnorm(n)
Z<-rnorm(n)
P<-1/( 1 + exp(-(-0.2+3*X)))
eU<-runif(n)
A<-(P>=eU)
Y<-X+5*A+3*Z+2*A*Z+rnorm(n)
datause2<-data.frame(cbind(A,Z,X,Y))
datause2$A<-as. factor(datause2$A)
Wit a model
fit<- GPMatch("Y",tr.c("AP
,"Z"),x1="X",x2="X",hte="Z",data=datause2,burn.num=500,
nKmc.num=500)
##estimate sample heterogeneous treatment effect
hte.fit<-hte(fit,x="Z",tr="A",control.tr=0,treat.tr=1)
plot. hte(hte. fit)
hte.fit2<-hte(fit,x="A",tr="Z",control. r=0,treat.tr=2)
plot. hte(hte. fit2)
``` plot.cate
Usage

> plot.cate(x)

Arguments

| x | An object of class "cate.effect" |

Value
    None

Example

```
##generate a data
set.seed(200)
n<-200
X<-rnorm(n)
Z<-rnorm(n)
P<-1/( 1 + exp(-(-0.2+3*X)))
eU<-runif(n)
A<-(P>=eU)
Y<-X+5*A+3*Z+2*A*Z+rnorm(n)
datause2<-data.frame(cbind(A,Z,X,Y))
datause2$A<-as.factor(datause2$A)
##fit a model
fit<-
GPMatch("Y",tr=c("A","Z"),x1="X",x2="X",hte="Z",data=datause2,
burn.num=500, nKmc.num=500)
##estimate conditional average treatment effect
cate.fit<-cate(fit,x="Z",tr="A",control.tr=0,treat.tr=1)
plot.cate(cate.fit)
cate.fit2<-cate(fit,x="A",tr="Z",control.tr=0,treat.tr=2)
plot.cate(cate.fit2)
``` plot.tr.effect
Usage

> plot.tr.effect(x, type = "ATE")

Arguments

| x | An object of class "ate.effect" |
| type | The default value is "ATE". If "ATE", the histogram of the estimated average treatment effect is provided. If "Potential", the histogram of the estimated potential outcomes is given. |

Value
    None
Example

```
##generate a data
set.seed(100)
n<-200
X<-rnorm(n)
P<-1/( 1 + exp(-(-0.2+3 )))
eU<-runif(n)
A<-(P>=eU)
Y<-X+5*A+rnorm(n)
datause<-data.frame(cbind(A,X,Y))
datause$A<-as. factor(datause$A)
##fit a model
fit<-
GPMatch("Y",tr="A",x1="X",x2="X",data=datause,burn.num=500
mcmc.num=500)
##estimate sample average treatment effect
est<-ate(fit,tr="A")
```

```
plot.tr.effect(est,type="ATE")
plot.tr.effect(est,type="Potential")
``` plot.yhat
Usage

> plot.yhat(x)

Arguments

| x | An object of class "ate.effect" |

Value
    None
pred.dist2m
Usage

> pred.dist2m(X1, X2)

Arguments

| X1 | a numeric vector. |
| X2 | a numeric vector. |

Value

| A | matrix |

Example
    pred.dist2m(c(1,2,3),b(2,3,4))
predict.gp2
Usage

> predict.gp2(object, newdata = NULL)

Arguments

| fit | An object of class "GPMatch". |
| object | An object of class "GPMatch". |
| newdata | An optional data frame which contains the variables in the model. If "Null", the data used to generate the "GPMatch" object is used. |

Value
    The full set of posterior samples of size mcmc.num for each observation.
Example

```
##generate a data
set.seed(100)
n<-200
X<-rnorm(n)
P<-1/( 1 + exp(-(-0.2+3*X)))
eU<-runif(n)
A<-(P>=eU)
Y<-X+5*A+rnorm(n)
datause<-data.frame(cbind(A,X,Y))
```

```
datause$A<-as.factor(datause$A)
##fit a model
fit<-
GPMatch("Y",tr="A",x1="X",x2="X",data=datause,burn.num=500,
mcmc.num=500)
y_hat<-predict.gp2(fit)
``` print.ate.effect  
Usage

```
print.ate.effect(x,...)
```

Arguments

| | |
|---|---|
| x | An object of class "ate.effect". |
| ... | Parameters that are ignored |

Value  
None  
Example

```
##one treatment variable
##generate a data
set.seed(100)
n<-200
X<-rnorm(n)
P<-1/( 1 + exp(-(-0.2+3*X)))
eU<-runif(n)
A<-(P>=eU)
Y<-X+5*A+rnorm(n)
datause<-data.frame(cbind(A,X,Y))
datause$A<-as.factor(datause$A)
##fit a model
fit<-
GPMatch("Y",tr="A",x1="X",x2="X",data=datause,burn.num=500,
mcmc.num=500)
##estimate sample averaged treatment effect
est<-ate(fit,tr="A")
print.ate.effect(est)
est
``` print.cate.effect  
Usage

```
print.cate.effect(x, ...)
```

Arguments

| | |
|---|---|
| x | An object of class "ate.effect". |
| ... | Parameters that are ignored |

Value  
None  
Example

```
##one treatment variable
##generate a data
set.seed(100)
n<-200
X<-rnorm(n)
P<-1/( 1 + exp(-(-0.2+3*X)))
eU<-runif(n)
A<-(P>=eU)
Y<-X+5*A+3*A*X+rnorm(n)
datause<-data.frame(cbind(A,X,Y))
datause$A<-as.factor(datause$A)
##fit a model
fit<-
GPMatch("Y",tr="A",x1="X",x2="X",hte="X",data=datause,burn.num
=500, mcmc.num=500)
##estimate sample average treatment effect
cate.est<-cate(fit,x="X",tr="A",control.tr=0,treat.tr=1)
print.cate.effect(cate.est)
``` print.GPMatch  
Usage

```
print.GPMatch(x, ...)
```

Arguments

| | |
|---|---|
| x | An object of class "ate.effect". |
| ... | Parameters that are ignored |

Value  
None  
Example

```
##generate a data
set.seed(100)
n<-200
X<-rnorm(n)
P<-1/(1+exp(-(-0.2+3*X) ) )
eU<-runif(n)
A<-(P>=eU)
Y<-X+5*A+rnorm(n)
datause<-data. frame(cbind(A,X, Y))
Mit a model
fit< -
GPMatch("Y",tr="A",x1="X",x2="X",data=datause,burn.num=500,
mcmc.num=500)
##print out details
print.GPMatch(fit)
fit
``` print.hte.effect  
Usage

```
print.hte.effect(x, ...)
```

Arguments

| | |
|---|---|
| x | An object of class "ate.effect". |
| ... | Parameters that are ignored |

Value  
None  
Example

```
##one treatment variable
##generate a data
set.seed(100)
n<-200
X<-rnorm(n)
P<-1/( 1 + exp(-(-0.2 + 3*X) ) )
eU<-runif(n)
```

-continued

```
A<-(P>=eU)
Y<-X+5*A+3*A*X+rnorm(n)
datause<-data.frame(cbind(A,X,Y))
datause$A<-as.factor(datause$A)
##fit a model
fit< -
GPMatch("Y",tr="A",x1="X",x2="X",hte="X",data=datause,burn.num
=500, mcmc.num=500)
##estimate sample average treatment effect
hte.est<-hte(fit,x ="X",tr="A",control.tr=0,treat.tr=1)
print. hte.effect(hte.est)
hte.est
``` update.bgp2
Usage update.bgp2(object, mcmc, burnin = 0, thin = 1, verbose = F)

Arguments

| | |
|---|---|
| fit | An object of class "GPMatch". |
| object | An object of class "GPMatch". |
| mcmc | numeric; the number of MCMC samples after "burn-in". |
| burnin | numeric; the number of MCMC "burn-in" samples, i.e. number of MCMC to be discarded. |
| thin | thinning of MCMC samples. |
| verbose | logical; if TRUE, prints information about progress of the algorithm to the screen. |

Value

| | |
|---|---|
| model | A list of the model frame used. |
| dat | A list of the data used. |
| bmtl | The information of MCMC sample. |
| initial | The initial values of the parameters in the model. |
| mcpar | The set of posterior samples of the parameters in the model. |
| last | The last draw from the posterior distributions. |
| nparm | The number of the parameters in the model. |
| mPostProb | The posterior distributions. |
| prior | The priors of the parameters in the model. | update.bgp2.tobit
Usage update.bgp2.tobit(object, mcmc, burnin = 0, thin = 1, verbose = F, lower = -Inf, upper = Inf)

Arguments

| | |
|---|---|
| object | An object of class "GPMatch". |
| mcmc | numeric; the number of MCMC samples after "burn-in". |
| burnin | numeric; the number of MCMC "burn-in" samples, i.e. number of MCMC to be discarded. |
| thin | thinning of MCMC samples. |
| verbose | logical; if TRUE, prints information about progress of the algorithm to the screen. |
| lower | Lower bound |
| upper | Upper bound |

Value

| | |
|---|---|
| model | A list of the model frame used. |
| dat | A list of the data used. |
| bmtl | The information of MCMC sample. |
| initial | The initial values of the parameters in the model. |
| mcpar | The set of posterior samples of the parameters in the model. |
| last | The last draw from the posterior distributions. |
| nparm | The number of the parameters in the model. |
| mPostProb | The posterior distributions. |
| prior | The priors of the parameters in the model. |

EXAMPLES

Simulation Studies

To empirically evaluate the performance of GPMatch in a real world setting where neither matching structure nor functional form of the outcome model are known, we conducted three sets of simulation studies. The first set evaluated frequentist performance of GPMatch. The second set compared the performance of GPMatch against MDmatch, and the last set utilized the widely used Kang and Schafer design, comparing the performance of GPMatch against some commonly used methods.

In all simulation studies, the GPMatch approach used a squared exponential covariate function, including only treatment indicator in the mean and all observed covariates into the covariance function, unless otherwise noted.

The performance of GPMatch was compared with the following widely used causal inference methods: sub-classification by propensity score quantile (QNT-PS); augmented inverse treatment probability weighting (AIPTW); regression adjustment—namely linear model with PS adjustment (LM-PS) and linear model with spline fit PS adjustment (LM-sp(PS)); and Bayesian additive regression tree (BART). Cubic B-splines with knots based on quantiles of PS were used for LM-sp(PS). We also considered direct linear regression model (LM) as a comparison. The ATE estimates were obtained by averaging over 5000 posterior MCMC draws, after 5,000 burn in. For each scenario, three sample sizes were considered, N=100, 200, and 400. The standard error and the 95% symmetric interval estimate of ATE for each replicate were calculated from the 5,000 MCMC chain. For comparing the performance of the different methods, all results were summarized over N=100 replicates by the root mean square error (RMSE), the median absolute error (MAE), coverage rate (Rc), average standard error estimate, and the standard error of ATE.

1. Well Calibrated Frequentist Performances

To calibrate the frequentist performance, we considered a single observed covariate x~N(0, 1) and the unobserved covariates $\{U_0, U_1, U_2, \varepsilon\}$~iid N(0, 1). The potential outcome was generated by y (a)=$e^x$+$(1+\gamma_1 U_1)$xa+$\gamma_0 U_0$ for a=0, 1, where the true treatment effect was $1+\gamma_1 U_1$ for the i-th individual unit. The $(U_0, U_1)$ are unobserved covariates. The treatment was selected for each individual following logit (P(A=1|X))=$-0.2+(1.8X)^{1/3}+\gamma_2 U_2^2$. The observed outcome was generated by y|x, a~y(a)+$\gamma_2 \varepsilon$. Four parameter settings were considered for the combinations of $\{\gamma_0, \gamma_1, \gamma_2, \gamma_3\}$: $\{0.5, 0, 0, \sqrt{0.75}\}$, $\{1, 0.15, 0, 0\}$, $\{0.5, 0, 0.7, \sqrt{0.75}\}$, and $\{1, 0.15, 0.7, 0\}$. In the $1^{st}$ and $3^{rd}$ settings, let $\tau_i$=1. In the $2^{nd}$ and $4^{th}$ settings, the treatment effect $\tau_i$~$(1, \gamma_1^2)$, varying among individual units. Except for the first setting, the simulation settings included unmeasured confounders $U_1$ and/or $U_2$.

These settings involved four different random errors in 1) potential outcome; 2) treatment effect; 3) treatment probability; and 4) observed outcome. Setting 1 included random error in both potential outcomes Y(0) and the observed outcome; Setting 2 included random error in potential outcomes Y(0) and the treatment effect. Settings 3 and 4 add to settings 1 and 2 another random effect in the treatment propensity.

The simulation results shown in FIG. 3 demonstrate that the GPMatch method performed well with respect to frequentist properties. In FIG. 3, the simulation results are summarized by the histogram of the posterior mean over the 100 replicates across three sample sizes.

In addition, the method performed better than the AIPTW, QNT_PS and G-estimation methods, and performs equally well as LM_sp(PS) and BART. Under all settings, GPMatch presented well calibrated frequentist properties with nominal coverage rate, and only slightly larger RMSE. The averaged bias, RMSE and MAE quickly improve as sample size increases, and perform as well as the Gold standard with the sample size of 400.

Table 1 below shows the results of ATE estimates under the single covariate simulation study settings, including comparison of the GPMatch method to the Gold standard. The Gold standard was obtained by fitting the true outcome generating model.

TABLE 1

Results of ATE estimates under the single covariate simulation study settings

| Method | Sample Size | RMSE | MAE | Bias | Rc | $SE_{avg}$ | $SE_{amp}$ |
|---|---|---|---|---|---|---|---|
| Setting 1: $\{\gamma_0, \gamma_1, \gamma_2, \gamma_3\} = \{0.5, 0, 0, \sqrt{0.75}\}$ | | | | | | | |
| Gold | 100 | 0.243 | 0.165 | −0.066 | 0.93 | 0.216 | 0.235 |
| | 200 | 0.149 | 0.109 | 0.027 | 0.94 | 0.150 | 0.147 |
| | 400 | 0.123 | 0.087 | −0.007 | 0.93 | 0.107 | 0.123 |
| GPmatch | 100 | 0.260 | 0.160 | −0.038 | 0.93 | 0.242 | 0.258 |
| | 200 | 0.161 | 0.116 | 0.033 | 0.97 | 0.167 | 0.159 |
| | 400 | 0.122 | 0.085 | −0.005 | 0.96 | 0.118 | 0.123 |
| Setting 2: $\{\gamma_0, \gamma_1, \gamma_2, \gamma_3\} = \{1, 0.15, 0, 0\}$ | | | | | | | |
| Gold | 100 | 0.220 | 0.134 | −0.011 | 0.92 | 0.213 | 0.221 |
| | 200 | 0.159 | 0.098 | 0.001 | 0.94 | 0.151 | 0.159 |
| | 400 | 0.107 | 0.077 | −0.003 | 0.95 | 0.107 | 0.108 |
| GPmatch | 100 | 0.237 | 0.152 | 0.013 | 0.97 | 0.244 | 0.238 |
| | 200 | 0.175 | 0.114 | 0.007 | 0.94 | 0.169 | 0.175 |
| | 400 | 0.117 | 0.084 | 0.001 | 0.96 | 0.117 | 0.118 |
| Setting 3: $\{\gamma_0, \gamma_1, \gamma_2, \gamma_3\} = \{0.5, 0, 0.7, \sqrt{0.75}\}$ | | | | | | | |
| Gold | 100 | 0.228 | 0.137 | −0.016 | 0.92 | 0.214 | 0.228 |
| | 200 | 0.154 | 0.099 | 0.005 | 0.94 | 0.151 | 0.155 |
| | 400 | 0.113 | 0.078 | 0.001 | 0.94 | 0.107 | 0.114 |
| GPmatch | 100 | 0.231 | 0.156 | 0.009 | 0.96 | 0.237 | 0.232 |
| | 200 | 0.166 | 0.107 | −0.003 | 0.93 | 0.164 | 0.167 |
| | 400 | 0.115 | 0.088 | 0.003 | 0.96 | 0.114 | 0.115 |
| Setting 4: $\{\gamma_0, \gamma_1, \gamma_2, \gamma_3\} = \{1, 0.15, 0.7, 0\}$ | | | | | | | |
| Gold | 100 | 0.209 | 0.148 | 0.015 | 0.96 | 0.215 | 0.209 |
| | 200 | 0.136 | 0.098 | 0.008 | 0.97 | 0.152 | 0.136 |
| | 400 | 0.095 | 0.076 | −0.002 | 0.98 | 0.107 | 0.095 |
| GPmatch | 100 | 0.226 | 0.140 | 0.022 | 0.97 | 0.238 | 0.226 |
| | 200 | 0.164 | 0.105 | 0.024 | 0.98 | 0.169 | 0.163 |
| | 400 | 0.104 | 0.073 | 0.009 | 0.96 | 0.114 | 0.104 |

2. Compared to Manhalanobis Distance Matching

To compare the performances between the MD matching and GPMatch, we considered a simulation study with two independent covariates $x_1$, $x_2$ from the uniform distribution U(−2, 2), treatment was assigned by letting $A_i \sim \text{Ber}(\pi_i)$, Where $$\text{logit } \pi_i = -x_1 - x_2.$$

The potential outcomes were generated by $$y_i(a) = 3 + 5a + x_{1i}^3,$$

$$Y_i | X_i, A_i \sim N(y_i(A_i), 1).$$

The true treatment effect was 5. Three different sample sizes were considered N=100, 200 and 400. For each setting, 100 replicates were performed and the results were summarized.

Figure 5:
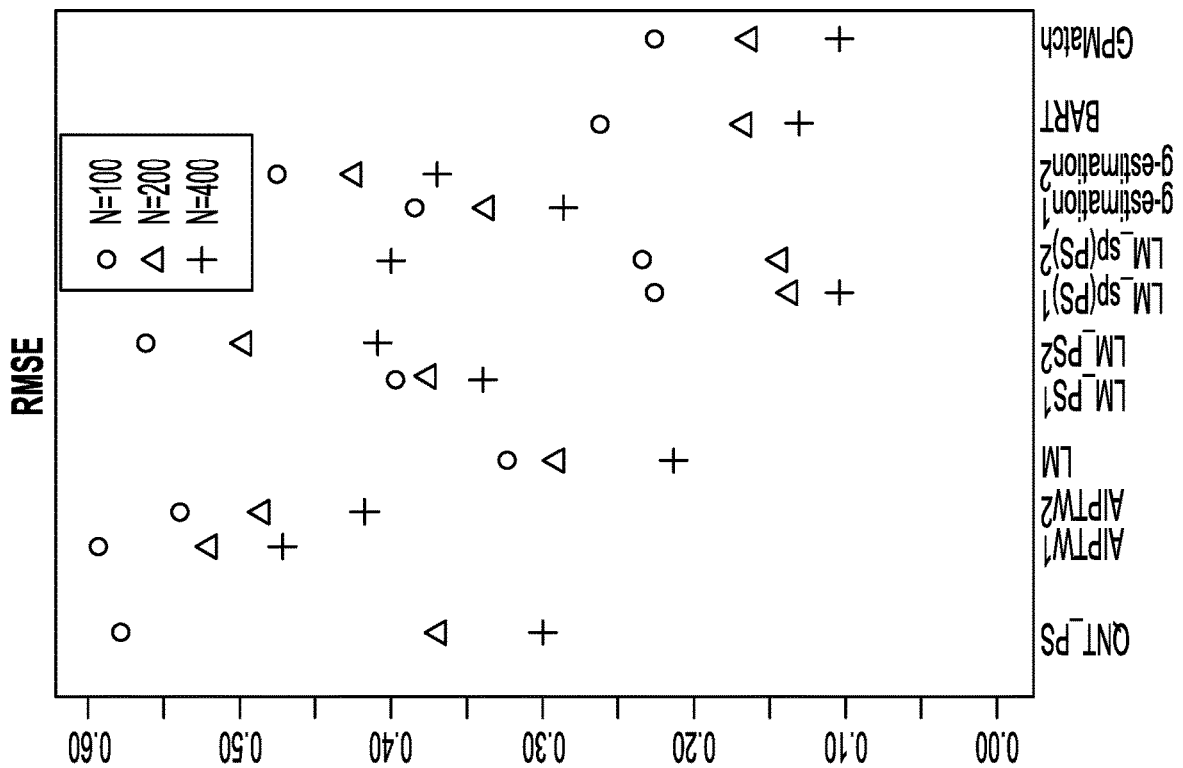
FIG. 5. Comparison of root mean square error (RMSE) and median absolute error (MAE) of the ATE estimates by different methods across different sample sizes. (1) propensity score estimated using logistic regression on logit A~X; (2) propensity score estimated using logistic regression on logit A~$X^{1/3}$; QNT_PS: propensity score sub-classification by quintiles; AIPTW: augmented inversed probability of treatment weighting; LM: linear regression modeling; LM_PS: linear regression modeling with propensity score adjustment; LM_sp(PS): linear regression modeling with spline fit propensity score adjustment. G-estimation: linear regression model; BART: Bayesian additive regression tree; GPMatch: Bayesian structural model with Gaussian process prior described by the present invention.
Figure 5:
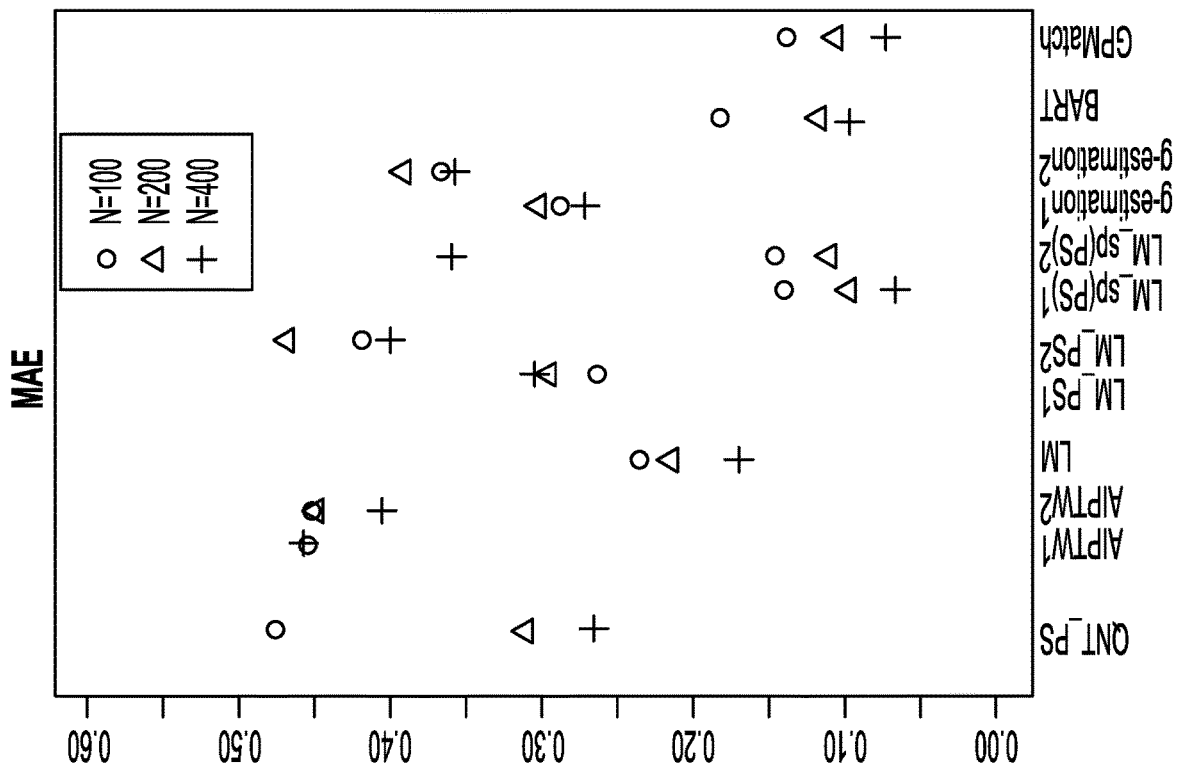

We estimated ATE by applying Mahalanobis distance matching and GPMatch. The MD matching considered caliper varied from 0.125 to 1 with step size 0.025, including both $X_1$ and $X_2$ in the matching using the function Match in R package Matching by Sekhon (2007). FIG. 5 presents the bias of the ATE estimate results comparing GPMatch. Shown are the averaged ATE (short dashed line) and the 5th and 95th percentiles (long dashed lines), along with the MD match (circles are the point estimate and vertical lines are the 95% interval estimates corresponding to different choices of caliper). Also presented in the figure are the bias, median absolute error (MAE), root mean square error (RMSE), and rate of coverage rate (Rc) summarized over 100 replicates of GPMatch. To be directly comparable to the matching approach, the GPMatch estimated the ATE by including treatment effect only in modeling the mean function, both $X_1$ and $X_2$ were considered in the covariance function modeling. The posterior results were generated with 5,000 MCMC sample after 5,000 burn-in. The bias from the matching method increases with caliper; the width of interval estimate varies by sample size and caliper. It reduces with increased caliper for the sample size of 100, but increases with increased caliper for sample size of 400. In contrast, GPMatch produced a much more accurate and efficient estimate of ATE for all sample sizes, with unbiased ATE estimate and nominal coverage rate. The 5% and 95%-tiles of ATE estimates are always smaller than those from the matching methods for all settings considered. The results clearly demonstrate better accuracy and efficiency using GPMatch.

3. Performance Under Dual Misspecification

Following the well-known simulation design suggested by Kang and Schafer (2007), covariates z1, z2, z3, z4 were independently generated from the standard normal distribution N(0, 1).

Treatment was assigned by $A_i \sim \text{Ber}(\pi_i)$, where $$\text{logit} \pi_i = -z_{i1} + 0.5 z_{i2} - 0.25 z_{i3} - 0.1 z_{i4}.$$

The potential outcomes were generated for a=0, 1 by $$y_i(a) = 210 + 5a + 27.4 z_{i1} + 13.7 z_{i2} + 13.7 z_{i3} + 13.7 z_{i4},$$

$$Y_i | A_i, X_i \sim N(y(A_i), 1).$$

The true treatment effect was 5.

To assess the performances of the methods under the dual miss-specifications, the transformed covariates $$x_1 = \exp(z_1/2),\ x_2 = z2/(1+\exp(z_1)) + 10,$$

$$x_3 = \left(\frac{z_1 z_3}{25} + 0.6\right)^3,\ \text{and}\ x4 = (z2+z4+20)^2$$

were used in the model instead of $z_i$.

We compared the GPMatch versus many widely adopted causal inference methods. Here, we considered two different modeling strategies. In GPMatch1, the mean function included only treatment effect. In GPMatch2, the mean function also included all four covariates X1–X4. Both included X1–X4 with four distinct length scale parameters.

Figure 6:
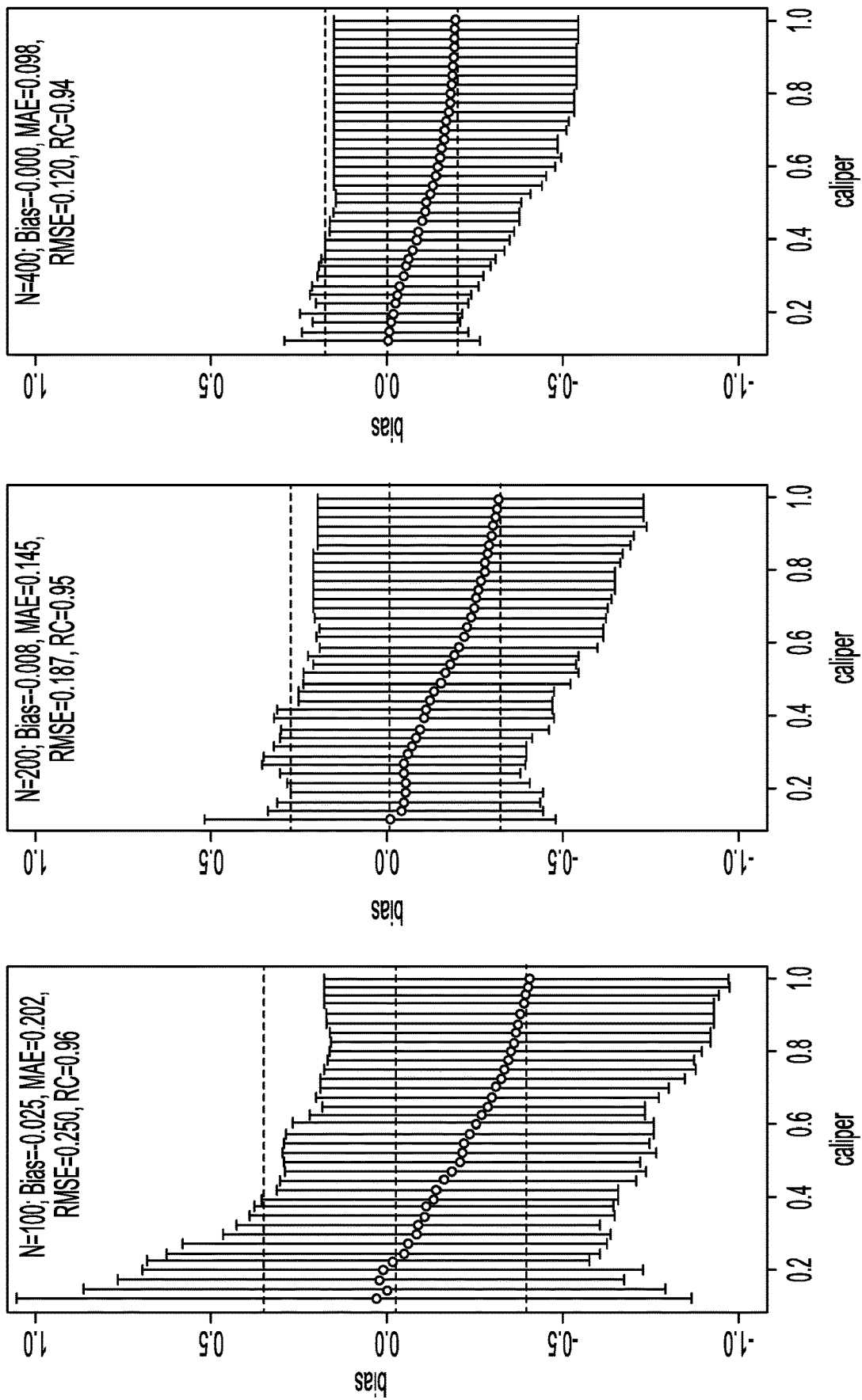
FIG. 6. Simulation study results of comparing GPMatch with Mahalanobis distance matching method. Circles are the averaged biases of estimates of ATE using Mahalanobis matching with corresponding calidpers. The vertical lines indicate the ranges between the $5^{th}$ and $95^{th}$ percentiles of the biases. The horizontal lines are the averaged ATE (short dashed line) and the $5^{th}$ and $95^{th}$ percentile (long dashed line) of the biases of the estimates from GP Match FIG. 7. RMSE and MAE of ATE estimates using different methods under the Kang and Shafer simulation setting. (a) propensity score estimated using logistic regression on X1-X4; (b) propensity score estimated using CBPS on X1-X4. Other abbreviations as in FIG. 5 above; GPMatch1 includes only treatment effect, while GPMatch2 includes both treatment effect and X1-X4 in the mean function; both including X1-X4 in the covariance function.

The PS was estimated using two approaches including the logistic regression model on X1-X4 and the covariate balancing propensity score method ("CBPS") (Imai K, Ratkovic M. Covariate balancing propensity score. *J. Royal Statist. Soc.*: Series B (Statistical Methodology). 2014; 76(1):243-63) applied to X1-X4. The results corresponding to both versions of PS were presented. Summaries over all replicates were presented in Table 2, and the RMSE and the MAE were plotted in FIG. 6. The results indicate that GPMatch clearly outperformed the other methods.

RMSE and averaged bias. The lower than nominal coverage rate is mainly driven by the remaining bias, which quickly reduces as sample size increases.

4. Simulation Studies for Adaptive Treatment Strategy ("2-Stage")

Once we had ensured the performances of the GPMatch method in the one-stage setting, we extended the GPMatch and BART for estimating the average treatment effect for an adaptive treatment strategy ("ATS"), also referred to as a "two-staged" treatment strategy. Five different simulation

TABLE 2

Results of ATE Estimates using different methods under the Kang and Shafer Dual Misspecification

| Method | Sample Size | RMSE | MAE | Bias | Rc | $SE_{avg}$ | $SE_{amp}$ |
|---|---|---|---|---|---|---|---|
| Gold | 100 | 0.224 | 0.150 | 0.011 | 0.95 | 0.225 | 0.225 |
| | 200 | 0.171 | 0.125 | −0.015 | 0.94 | 0.163 | 0.171 |
| | 400 | 0.102 | 0.063 | −0.015 | 0.96 | 0.112 | 0.102 |
| GPmatch1 | 100 | 2.400 | 1.606 | −1.254 | 0.92 | 2.158 | 2.057 |
| | 200 | 1.663 | 1.309 | −1.051 | 0.86 | 1.213 | 1.295 |
| | 400 | 0.897 | 0.587 | −0.564 | 0.86 | 0.673 | 0.701 |
| GPmatch2 | 100 | 1.977 | 1.358 | −0.940 | 0.91 | 1.672 | 1.748 |
| | 200 | 1.375 | 1.083 | −0.809 | 0.82 | 0.980 | 1.117 |
| | 400 | 0.761 | 0.484 | −0.432 | 0.87 | 0.567 | 0.629 |
| QNT_PS[a] | 100 | 7.574 | 6.483 | −6.234 | 0.970 | 7.641 | 4.324 |
| | 200 | 7.408 | 6.559 | −6.615 | 0.860 | 5.199 | 3.353 |
| | 400 | 7.142 | 6.907 | −6.797 | 0.500 | 3.576 | 2.203 |
| QNT_PS[b] | 100 | 8.589 | 7.360 | −7.177 | 0.970 | 7.541 | 4.744 |
| | 200 | 8.713 | 8.121 | −7.964 | 0.720 | 5.214 | 3.550 |
| | 400 | 8.909 | 7.980 | −8.399 | 0.300 | 3.607 | 2.987 |
| LM | 100 | 6.442 | 5.183 | −5.556 | 0.65 | 3.571 | 3.277 |
| | 200 | 6.906 | 6.226 | −6.375 | 0.28 | 2.547 | 2.668 |
| | 400 | 7.005 | 6.649 | −6.702 | 0.04 | 1.796 | 2.048 |
| AIPTW[a] | 100 | 5.927 | 4.402 | −4.330 | 0.72 | 3.736 | 4.067 |
| | 200 | 19.226 | 5.262 | −7.270 | 0.59 | 4.874 | 17.888 |
| | 400 | 29.405 | 5.603 | −9.676 | 0.36 | 6.115 | 27.908 |
| AIPTW[b] | 100 | 5.410 | 4.243 | −3.659 | 0.77 | 3.780 | 4.005 |
| | 200 | 5.780 | 5.075 | −4.950 | 0.52 | 2712 | 2.999 |
| | 400 | 6.204 | 5.482 | −5.652 | 0.24 | 2105 | 2.569 |
| LM_PS[a] | 100 | 5.103 | 3.832 | −4.091 | 0.74 | 3.420 | 3.066 |
| | 200 | 5.392 | 4.648 | −4.793 | 0.53 | 2.452 | 2.483 |
| | 400 | 5.091 | 5.128 | −4.787 | 0.19 | 1.706 | 1.741 |
| LM_PS[b] | 100 | 5.451 | 4.156 | −4.528 | 0.72 | 3.427 | 3.051 |
| | 200 | 5.891 | 4.981 | −5.278 | 0.46 | 2.466 | 2.631 |
| | 400 | 5.585 | 5.452 | −5.272 | 0.13 | 1.726 | 1.852 |
| LM_sp(PS)[a] | 100 | 4.809 | 3.161 | −3.598 | 0.79 | 3.165 | 3.207 |
| | 200 | 4.982 | 4.152 | −4.266 | 0.52 | 2.250 | 2.587 |
| | 400 | 4.470 | 4.038 | −4.127 | 0.23 | 1.559 | 1.727 |
| LM_sp(PS)[b] | 100 | 4.984 | 3.619 | −3.806 | 0.77 | 3.095 | 3.233 |
| | 200 | 5.237 | 4.374 | −4.507 | 0.51 | 2.248 | 2.681 |
| | 400 | 4.856 | 4.484 | −4.494 | 0.18 | 1.585 | 1.851 |
| BART | 100 | 3.148 | 2.504 | −2.491 | 0.79 | 2.163 | 1.935 |
| | 200 | 2.176 | 1.870 | −1.726 | 0.74 | 1.308 | 1.332 |
| | 400 | 1.283 | 0.942 | −0.997 | 0.71 | 0.757 | 0.812 |

As a comparison, the Gold standard, which as discussed above uses the true outcome generating model of Y~Z1-Z4, was also presented. Both GPMatch1 and GPMatch2 clearly outperforms all the other causal inference methods in terms of bias, RMSE, MAE, Rc, and the $SE_{(AVG)}$ is closely matched to $SE_{(EMP)}$. The ATE and the corresponding SE estimates improve quickly as sample size increases for GPMatch. In contrast, the QNT_PS, AIPT, LM_PS and LM_sp(PS) methods show little improvement over increased sample size, so is the simple LM. Improvements in the performance of GPMatch over existing methods are clearly evident, with more than 5 times accuracy in RMSE and MAE compared to all the other methods except for BART. Even compared to the BART results, the improvement in MAE is nearly twice for GPMatch2, and about 1.5 times for the GPMatch1. Similar results are evident in studies were performed, and are detailed below. Since the primary goal of the study is to evaluate the performance of 2-stage BART and GPMatch for estimating the averaged treatment effort for ATS, four simulation designs were considered in a sequential, multiple assignment, randomized trial (SMART), in which the treatment is assigned at random at the first stage; and the second stage treatment is assigned based on or "adapted to" the patient's responses to the previous treatment. The design also considered the heterogeneous treatment effect setting. Specifically, the five sets of simulation studies were:
1. A SMART trial with nonlinear outcome and treatment model;
2. A SMART trial with including an unmeasured binary confounder (U0) at the baseline, and linear outcome and treatment models;

3. A SMART trial modified based on Kang and Schafer's dual misspecification setting;
4. A SMART trial with the 1st stage disease outcome modifies the 2nd stage treatment effects, in a linear model setting; and
5. Observational study subgroup treatment effect at both stages, in a nonlinear setting.

In all settings, we consider the observed outcomes to be measured without error. That is, at the end of the first treatment stage, the observed outcomes (L1) is determined by $$L1 = A0 L1(1) + (1-A0) L1(0)$$

Then, at the end of second stage, the observed outcome (Y) is determined by $$Y = A0 A1 Y(1,1) + (1-A0) A1 Y(0,1) + A0 (1-A1) Y(1,0) + (1-A0)(1-A1) Y(0,0).$$

Without loss of generality, the simulation study considered binary treatment decisions. The treatment assignment at the initial decision point (A0) was determined by the baseline covariates (X). The treatment at the end of first stage (A1) was assigned based on the observed patient's responses L1, to the previous treatment assignment (A0) and the baseline covariates (X), i.e. [A1|A0, X, L1]. The potential outcomes at the end of the first stage were determined by the baseline covariates (X). The potential outcomes at the end of the second stage were determined by the baseline covariates and the potential outcomes at end of the first stage, i.e. [Y(00), Y(01), Y(10), Y(11)|X, L1(0), L1(1)]. Under the ATS, there are two types of confounders—X denotes the baseline confounder, which may include age, gender, race, insurance status, baseline disease severity and health related quality of life; the L1 is a time-varying confounder, which may include disease severity and health at the end of first stage. Of note, L1 may include the intermediate outcome measure, e.g. disease severity.

There are six existing methods currently used for the evaluation of causal treatment effects of ATS, these were reviewed by Newsome, Keogh and Daniel (2018) and are listed below. The review authors reported persistent weaker performances of IPW methods compared to the HA-MSM methods. For this reason, IPW methods were not considered in the present study. The remaining four methods were compared against both 2-stage BART and the 2-stage GPMatch.

1. IPW: Inverse probability weighting of marginal structural model, where the weight is the inverse of joint probability of treatment assignment [A0, A1|X];
2. IPW (truncated): same as the IPW, with the PS truncated at 0.1 and 0.99;
3. HA-MSM: history-adjusted marginal structural models (MSM) [Y(a0, a1)|X], where the weight is the inverse of joint time-varying PS [A0, A1|X, L1]=[A0|X]☐[A1|A0, X, L1].
4. HA-MSM (truncated): same as the HA-MSM, with the stabilized weight truncated at the 1st and 99th percentile;
5. G-computation: G-computatoin approaches impute the missing potential outcome similarly as the missing imputation chained equation (MICE), imputing [Y(a0, a1)|X, L1(a0)] and [L1|X] using the observed outcomes and covariates.
6. G-estimation: g-estimation includes the PS estimates at each decision point into the structural nested model [Y(a0, a1)|X, L1(a0)], and solves the corresponding estimating equation.

For the 2-stage ATS (A0, A1), there are 4 causal treatment effects of ATS, $\{T1, \psi 1, \psi 2, \psi 3\}$ which are defined by the six potential outcomes (L1(0), L1(1), Y(00), Y(01), Y(10), Y(11)):

$$L1(a0) = L1(0) + T1 a0;$$

$$Y(a0 a1) = Y(00) + \psi 1 a0 (1-a1) + \psi 2 a1 (1-a0) + \psi 3 a0 a1.$$

Thus, the T1 is the first line treatment effect at the end of the first stage:

$$T1 = L1(1) - L1(0);$$

The $\{\psi 1, \psi 2, \psi 3\}$ is the second line treatment effect of ATS (a0, a1) at the end of second stage. Thus the all pairwise comparisons of the four second stage potential outcomes can be written as:

$$Y(10) - Y(00) = \psi 1; \quad Y(01) - Y(00) = \psi 2; \quad Y(11) - Y(00) = \psi 3;$$

$$Y(10) - Y(01) = \psi 2 - \psi 1; \quad Y(11) - Y(01) = \psi 3 - \psi 1; \quad Y(11) - Y(10) = \psi 3 - \psi 2.$$

The simulation results are summarized for each of the seven causal contrasts of ATS at both stages. All simulation results are summarized over 200 replicates. The root mean square error (RMSE) and median absolute error (MAE) are summarized over all replicates and plotted for all method of comparisons. For GPMath and BART, histogram of the posterior estimates are plotted.

Setting 1: A SMART Trial Nonlinear Model

Figure 7:
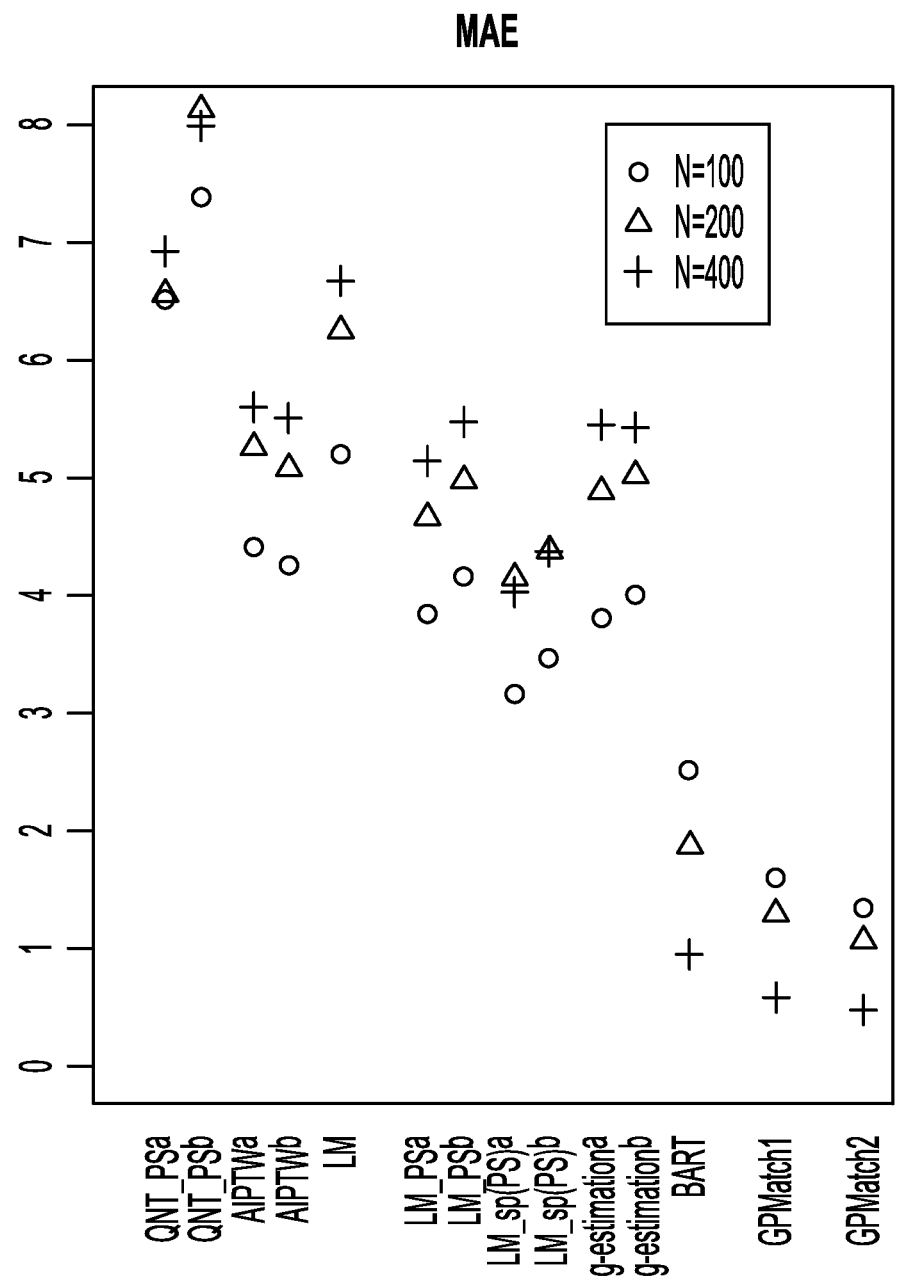
Figure 7:
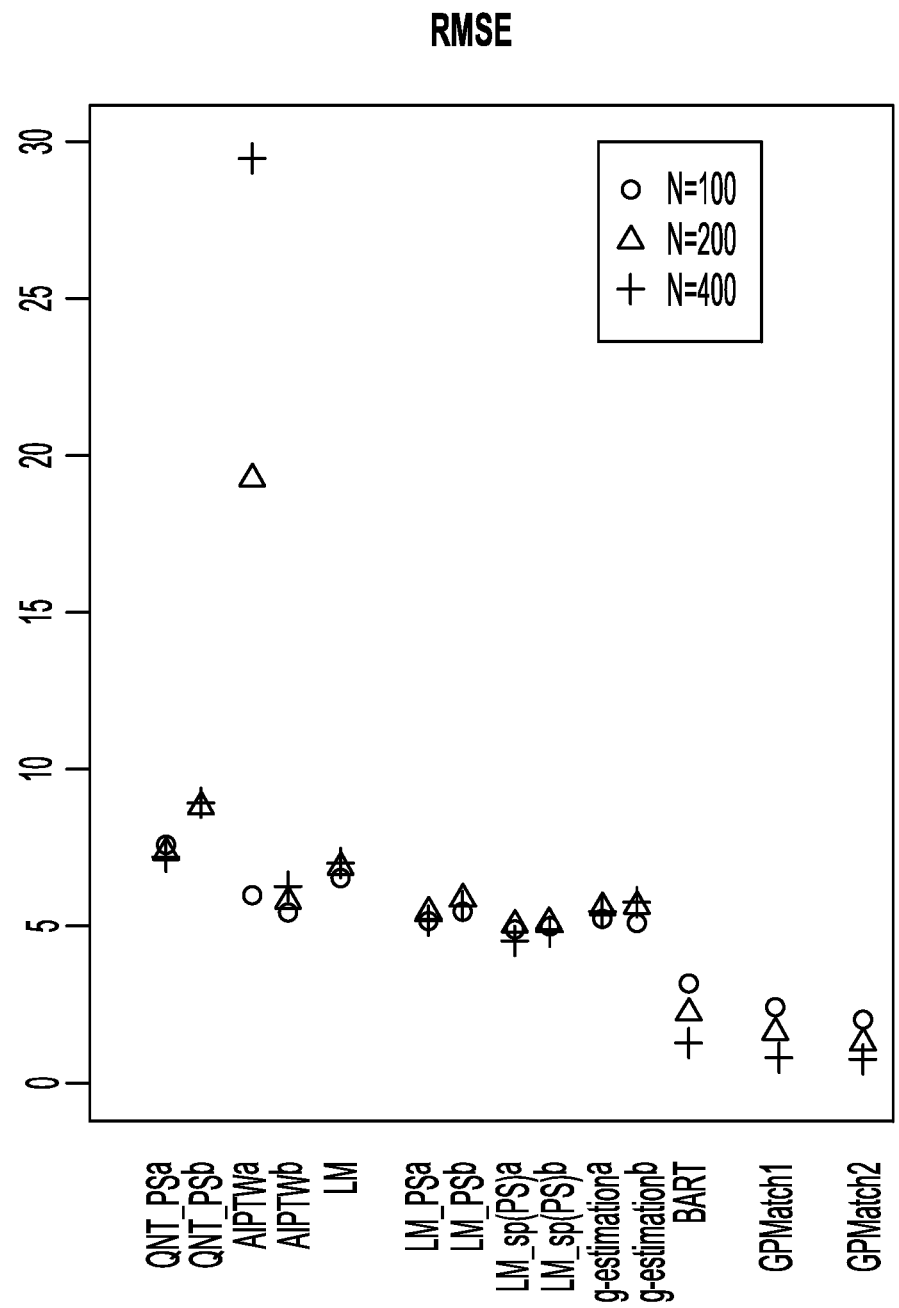

FIG. 7 shows RMSE and MAE of ATE estimates of the different methods (HA-MSM, HA-MSM (truncated), G-computation, G-estimation, BART, GPMatch, and the "gold standard") under a SMART trial nonlinear model setting. This simulation resembles a SMART trial setting, where the initial treatment is assigned at random. The stage 1 treatment has no effect on the disease progress at the end of first stage treatment. Both models of treatment assignment at the second stage and the potential outcomes are nonlinear functions of the end of the first stage responses $L_1$, $$X \sim \text{Bernoulli}(0.4), A_0 \sim \text{Bernoulli}(0.5), L_1(a_0) \sim N(0,1), L_1 = L_1(a_0)$$

$$A_1 | L_1, A_0, X \sim \text{Bernoulli}(\text{expit}(0.2 - 0.2 A_0 + L_1^{1/3}))$$

$$Y(a_0, a_1) \sim N(-2 + 2.5 a_0 + 3.5 a_1 + 0.5 a_0 a_1 - 3 \exp(-L_1(a_0)), sd=1).$$

Setting 2: A SMART Trial Linear Model, Unmeasured Covariate

Figure 8A:
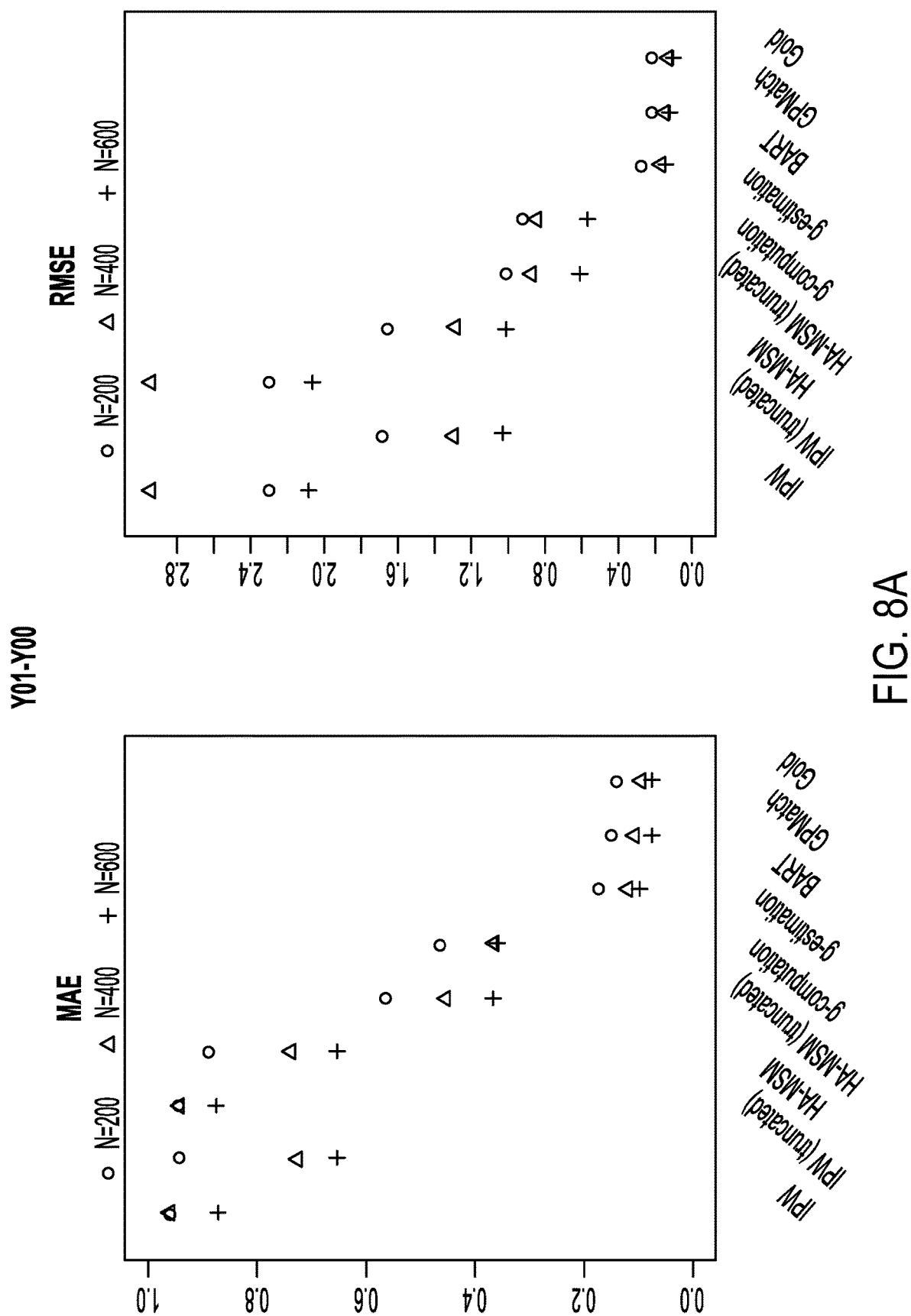
FIG. 8A-B. MAE (left panel) and RMSE (right panel) of ATE estimates using different methods under a SMART trial nonlinear model setting for potential outcomes Y01-Y00 (A) and Y11-Y10 (B).
Figure 8B:
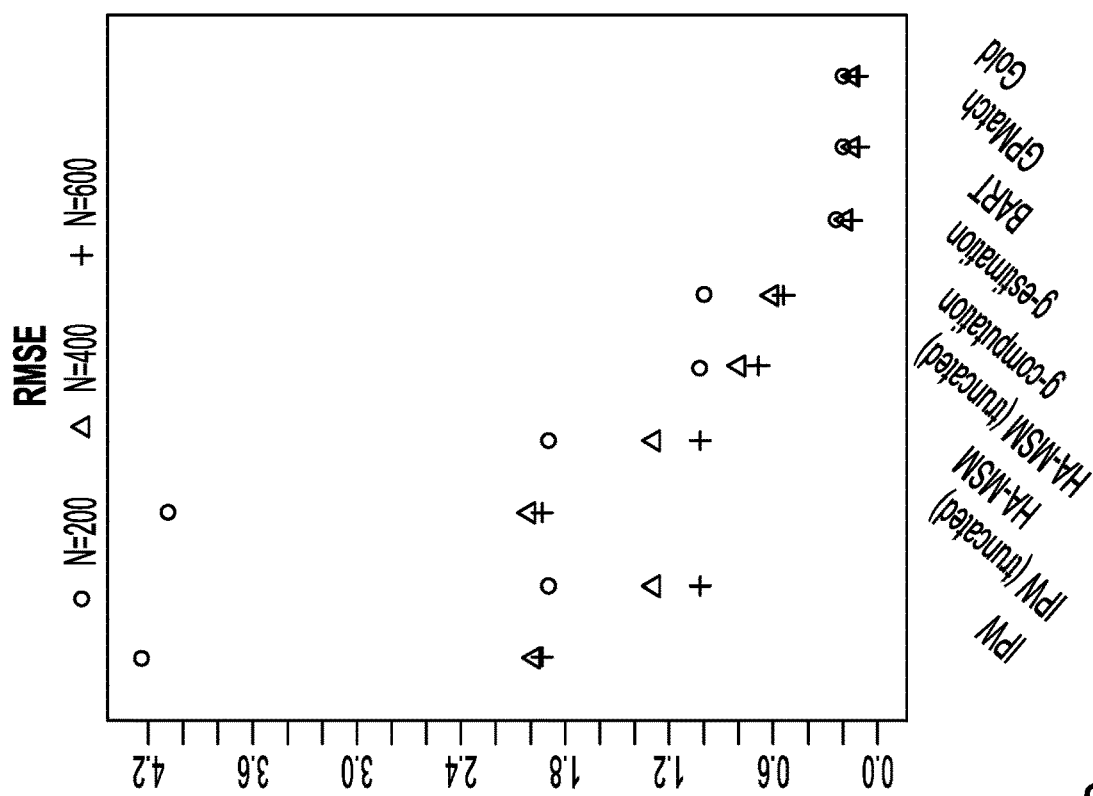
Figure 8B:
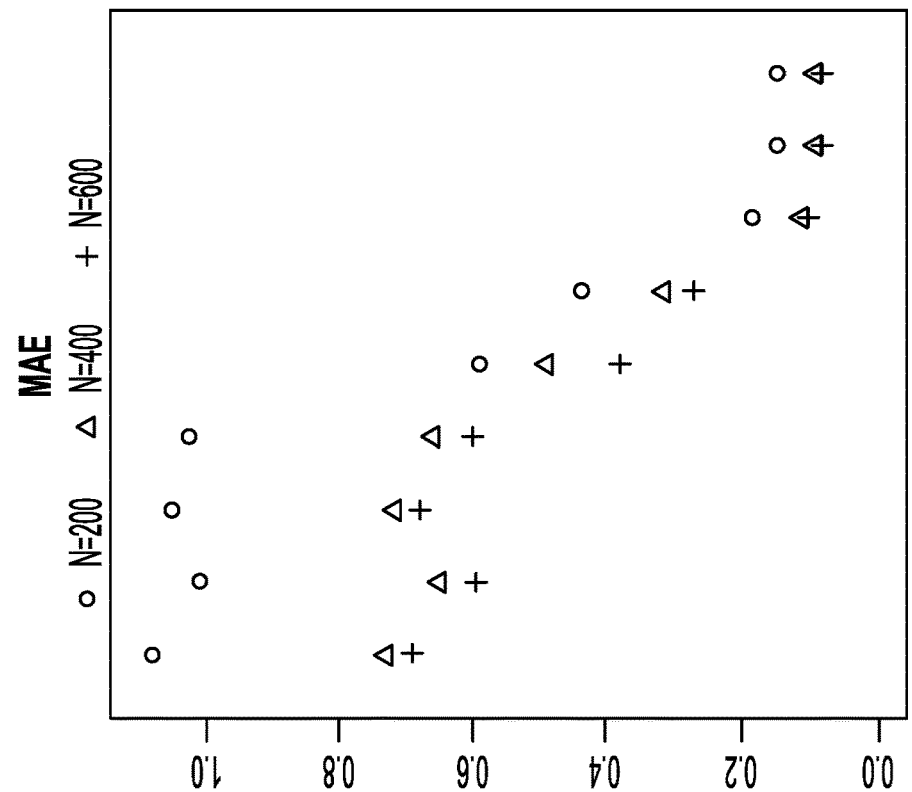

FIG. 8 shows RMSE and MAE of ATE estimates using different methods under a SMART trial linear model, unmeasured covariate setting. Following a setting used in Daniel et al. (2013)14, this simulation considered an unmeasured confounder $U_0$. Specifically, the data are simulated according to the following setup:

$$U_0 \sim \text{Bernoulli}(0.4),$$

$$A_0 \sim \text{Bernoulli}(0.5),$$

$$L_1(a_0) \sim \text{Bernoulli}(\text{expit}(0.25 + 0.3 a_0 - 0.2 U_0 - 0.05 a_0 U_0))$$

$$L_1 = A_0 L_1(1) + (1 - A_0) L_1(0)$$

$$A_1 \sim \text{Bernoulli}(\text{expit}(0.4 + 0.5 A_0 - 0.3 L_1 - 0.4 A_0 L_1(a_0)))$$

$$Y(a_0, a_1) \sim N(0.25 - 0.5 a_0 - 0.75 a_1 + 0.2 a_0 a_1 - U_0, 0.2)$$

Setting 3: A SMART Trial Kang and Schafer Dual Misspecification

Figure 9A:
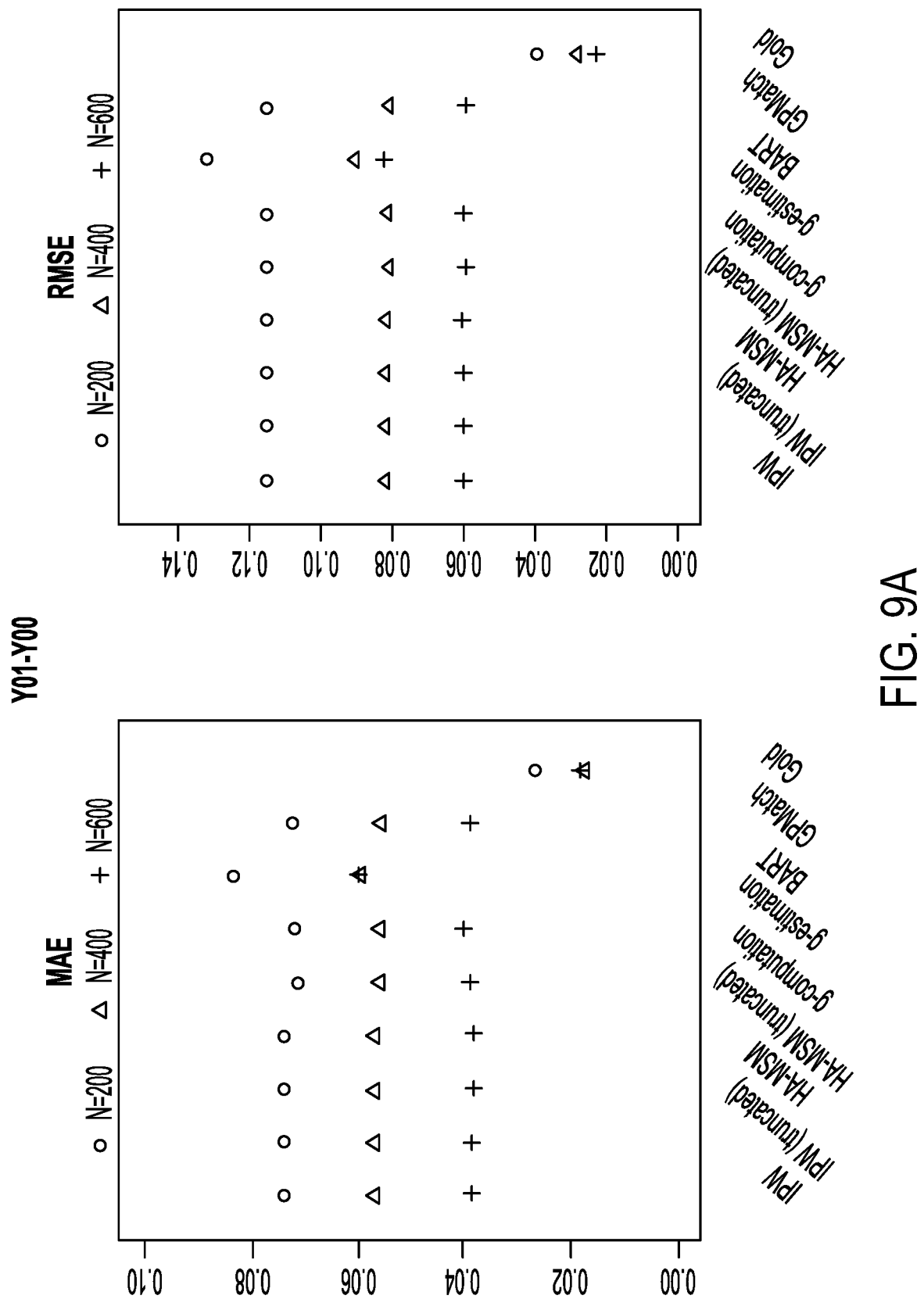
FIG. 9A-B. MAE (left panel) and RMSE (right panel) of ATE estimates using different methods under a SMART trial linear model, unmeasured covariate setting for potential outcomes Y01-Y00 (A) and Y11-Y10 (B).
Figure 9B:
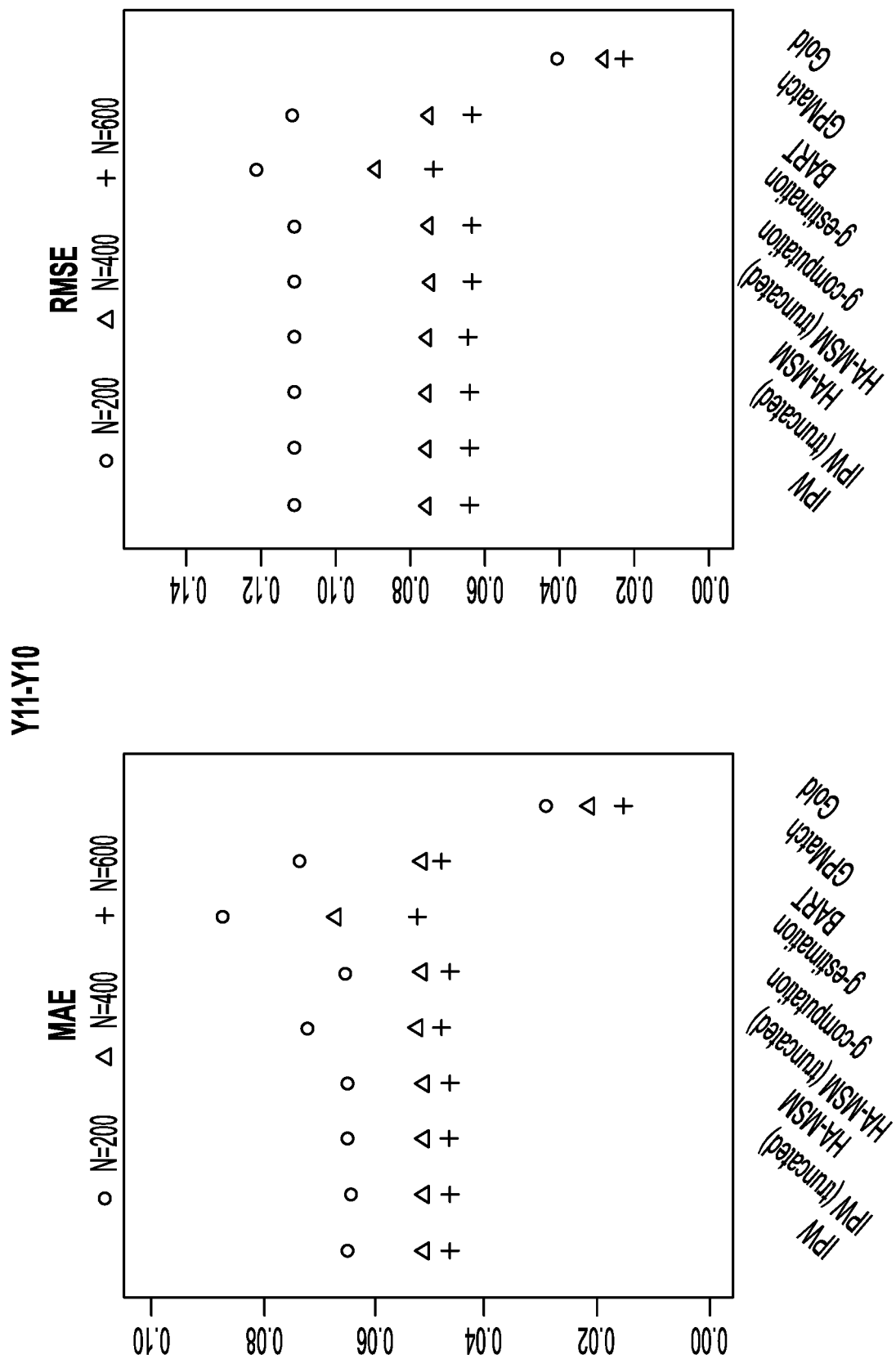
Figure 10A:
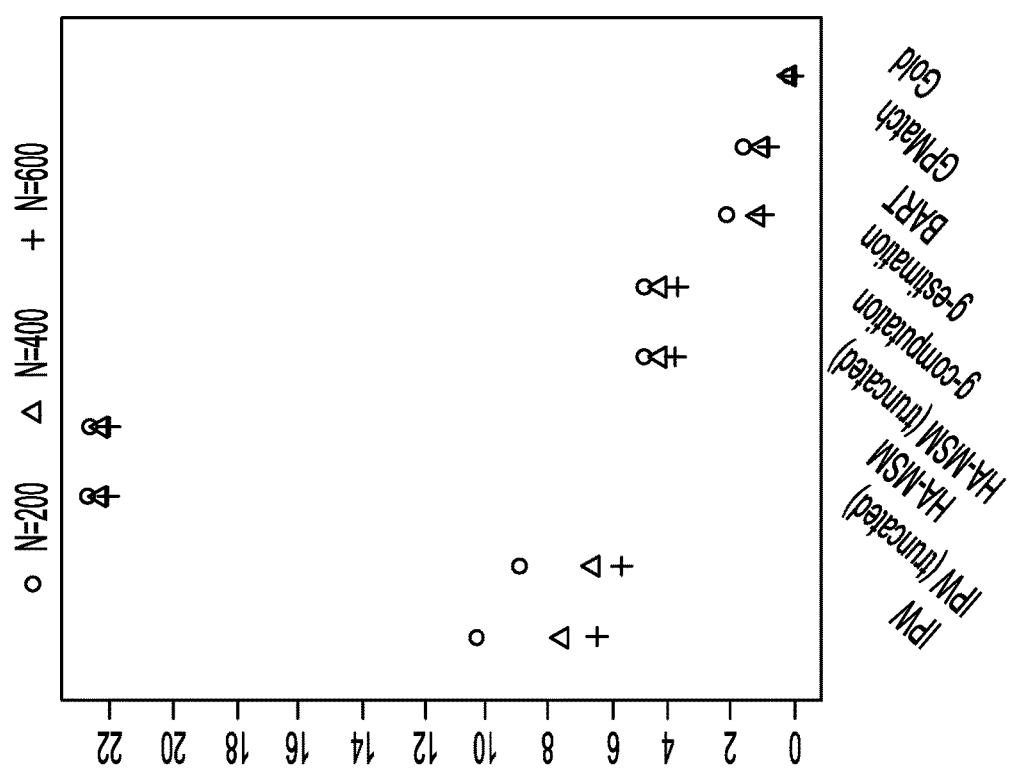
FIG. 10A-B. MAE (left panel) and RMSE (right panel) of ATE estimates using different methods under a SMART trial Kang and Shafer dual misspecification setting for potential outcomes Y01-Y00 (A) and Y11-Y10 (B).
Figure 10A:
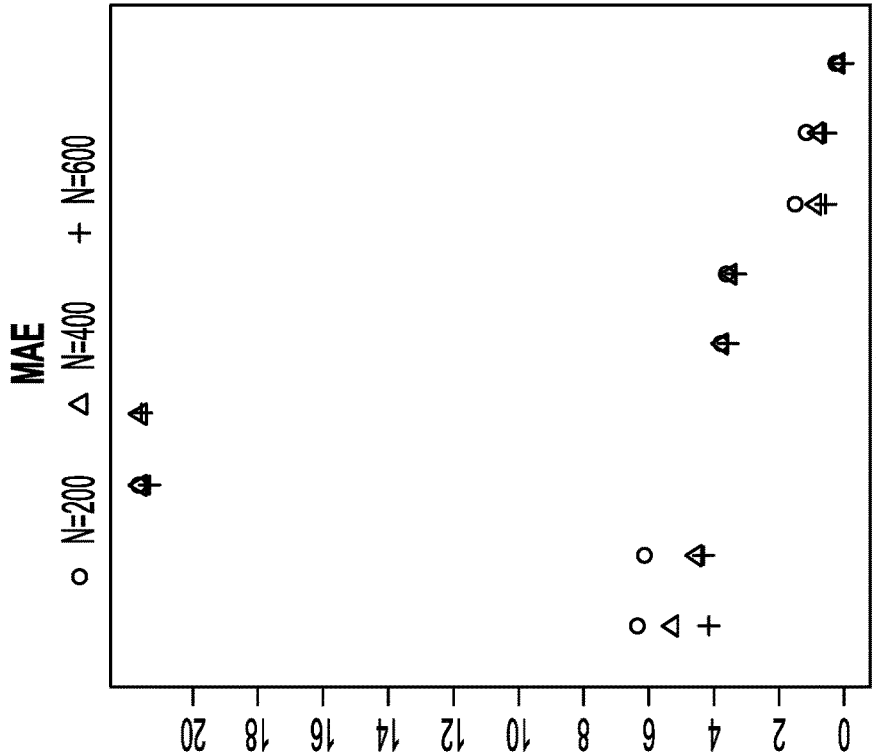
Figure 10B:
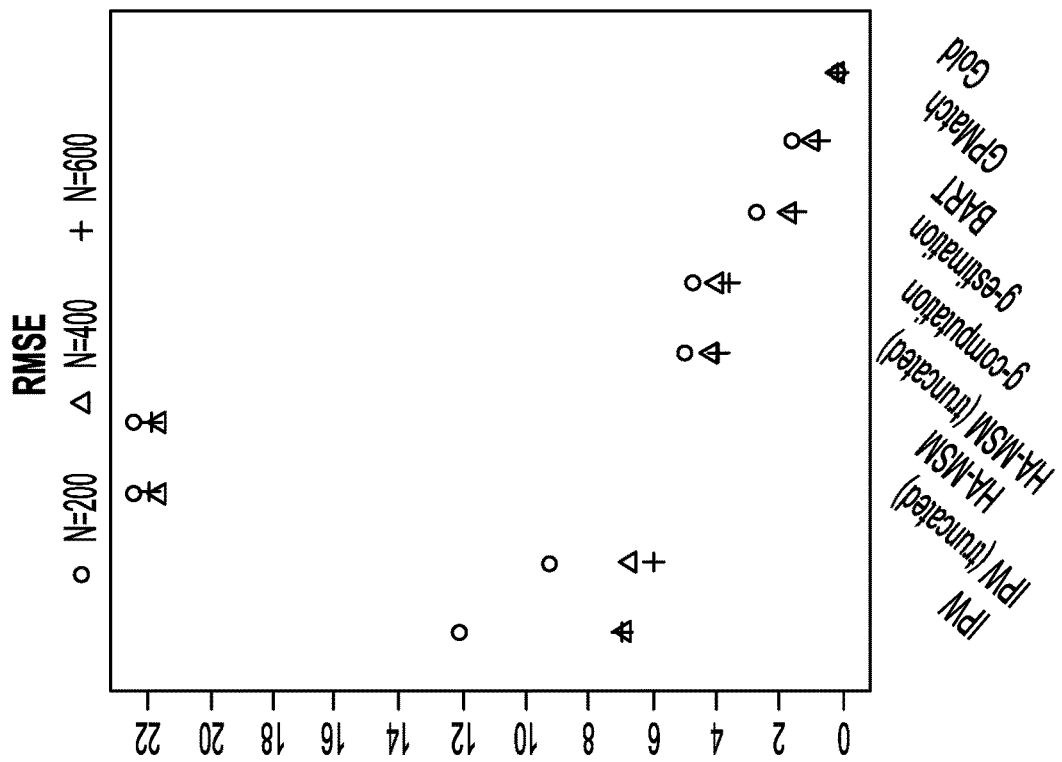
Figure 10B:
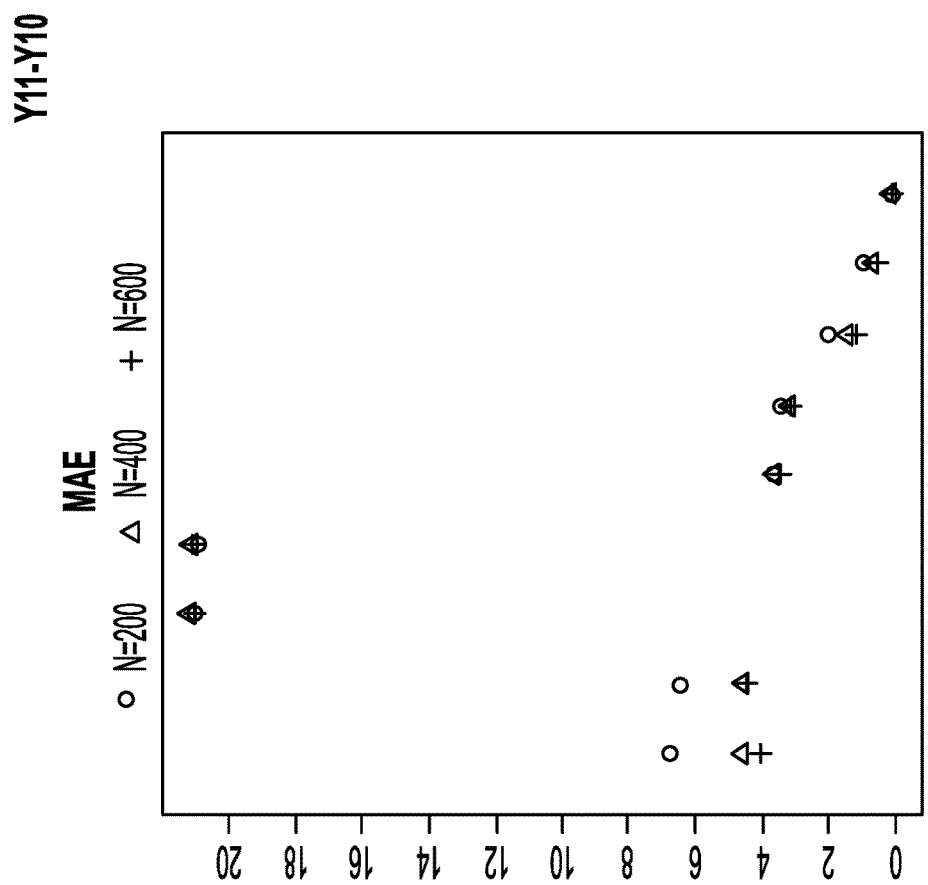

FIG. 9 shows RMSE and MAE of ATE estimates using different methods under a SMART trial Kang and Shafer dual misspecification setting. We extended the well-known Kang and Schafer (2007)11 simulation to a two-stage setting. Like the SMART trial, the first treatment is assigned at random, and the outcome is a linear function of the baseline covariates Z1-Z4.

$$Z1, Z2, Z3, Z4 \sim N(0,1), A0 \sim Bernoulli(0.5)$$

$$L_1(a_0) \sim N(-1.5 + 27.4Z_1 + 13.7Z_2 + 0^*Z_3 + 0^*Z_4 - 3a_0, 1)$$

$$L_1 = A_0 L_1(1) + (1 - A_0) L_1(0)$$

$$A_1 \sim Bernoulli(expit(0.25 A_0 + (0.1)^* L_1^{1/3} + 0.75^*(Z_1 - 0.5Z_2 + 0.25Z_3 + 0.1Z_4)))$$

$$Y(a_0, a_1) \sim N(210 + L_1(a_0) + 13.7Z_3 + 13.7Z_4 - 5a_0 - 3a_1 - 2a_0 a_1, 1)$$

As in Kang and Schafer, only transformed covariates are observed $x_1 = \exp(z_1/2)$, $x_2 = z_2/(1 + \exp(z_1)) + 10$, $x_3 = ((z_1 z_3)/25 + 0.6)^3$, and $x_4 = (z_2 + z_4 + 20)^2$ Setting 4: Heterogeneous Treatment Effect SMART Trial FIG. 10 shows RMSE and MAE of ATE estimates using different methods under a heterogeneous treatment effect SMART trial setting. It is expected that the outcome at the first stage may modify the effect of the next stage treatment effect. Here, we consider a simple additive interaction effect: s $$X \sim Bernoulli(0.4), A0 \sim Bernoulli(0.5), L_1(a_0) \sim N(0,1)$$

$$A_1 | L_1, A_0, X \sim Bernoulli(expit(0.2 \sim 0.2 A_0 + L_1^{1/3})).$$

$$Y(a_0, a_1) | X \sim N(-2 + 2.5 a_0 + 3.5 a_1 + 0.5 a_0 a_1 - 3 \exp(-L_1(a_0)) + a_1 L_1(a_0), sd=1)$$

Setting 5: Observational Study Adaptive Treatment Subgroup Treatment Effect

Figure 11A:
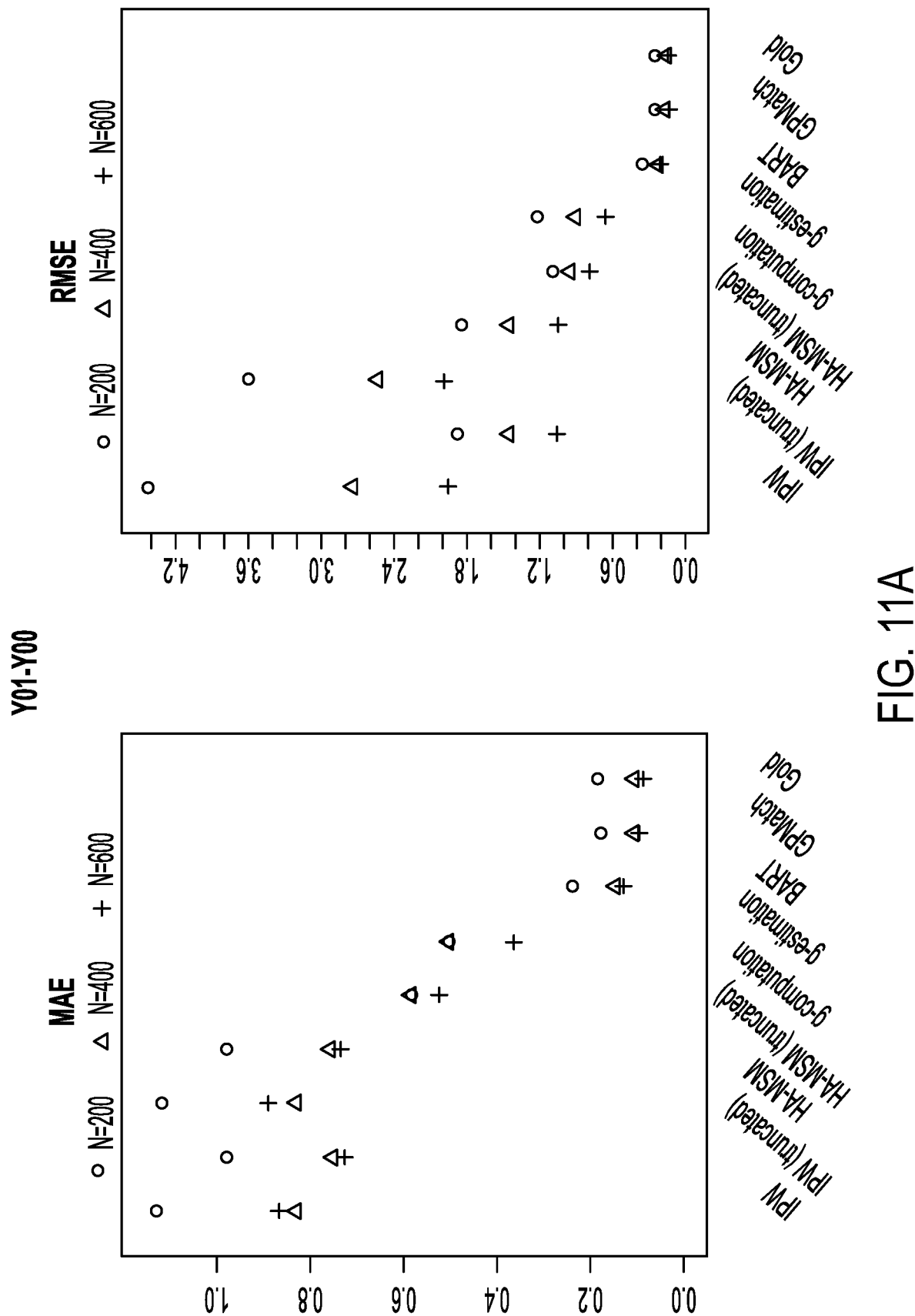
FIG. 11A-B. MAE (left panel) and RMSE (right panel) of ATE estimates using different methods under a heterogeneous treatment effect SMART trial setting for potential outcomes Y01-Y00 (A) and Y11-Y10 (B).
Figure 11B:
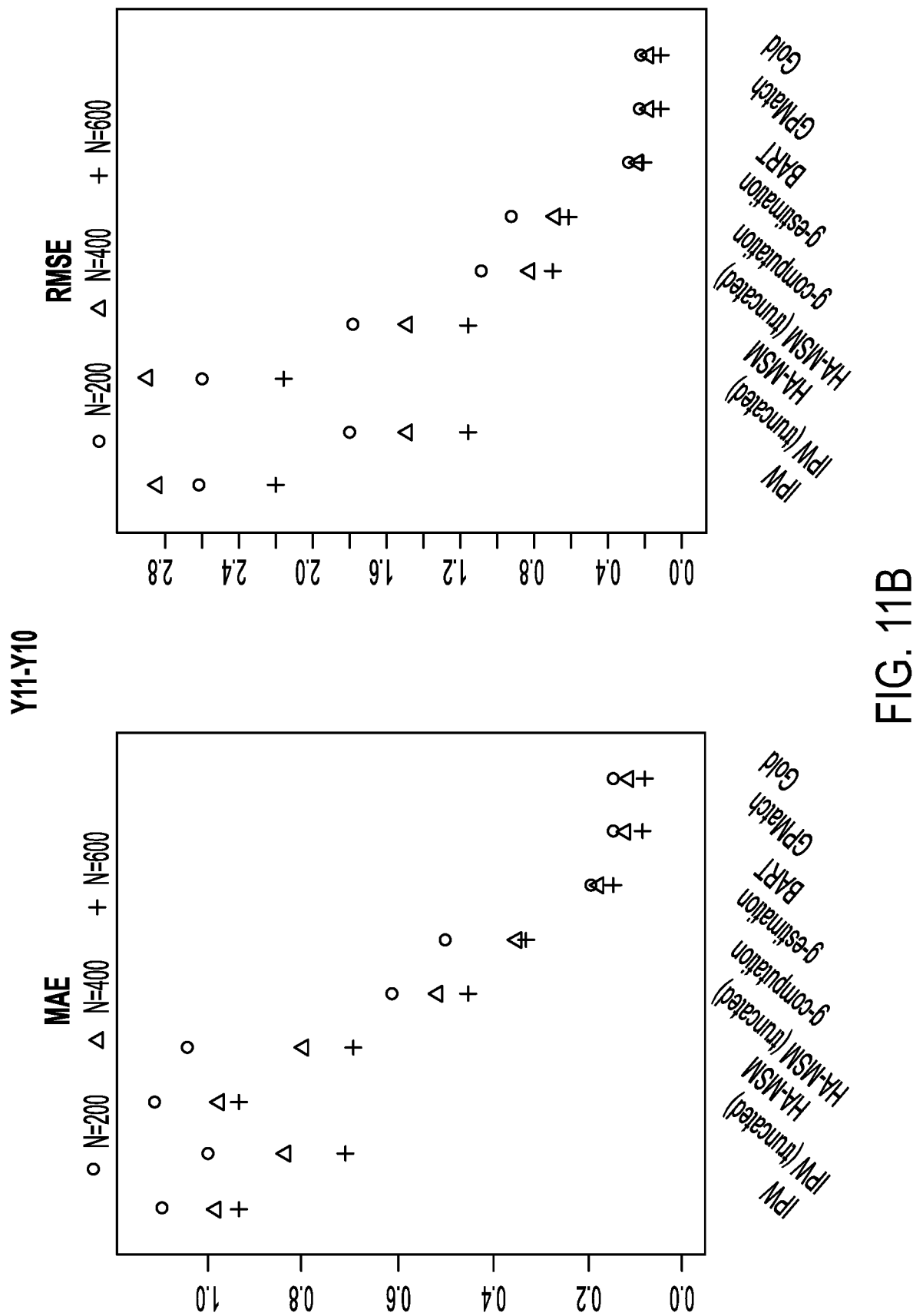

FIG. 11 shows RMSE and MAE of ATE estimates using different methods under an observational study adaptive treatment subgroup treatment effect setting. This simulation implemented a modified simulation design setting used in Schulte's et. al. (2014).43 It considered a 3-level categorical baseline covariates X=-5,0,5, with multinomial distribution, X~Multinomial (⅓, ⅓, ⅓). The causal treatment effect at both stages varied by the baseline covariates.

$$A_0 \sim Bernoulli(expit(0.3 - 0.05X))$$

$$L_1(a_0) \sim N(0.75X - 0.75 a_0 - 0.25 a_0 X, 1)$$

$$L_1 = A_0 L_1(1) + (1 - A_0)/A(0)$$

$$A_1 \sim Bernoulli(expit(0.05X + 0.2 A_0 - 0.05 L_1 - 0.1 L_1 {}^* A_0 - 0.01 L_1^2))$$

$$Y(a_0, a_1) | L_1(a_0) \sim N(3 + 0.5 a_0 + 0.4 a_0 X - L_1(a_0) - L_1 (a_0)^2 + 2 a_1 - a_0 a_1 + a_1 L_1(a_0), 1)$$

The simulation compared the two-stage BART and GPMatch against existing causal inference methods including a history-adjust structural nested model, G-computation formula and G-estimation. The simulation results are summarized for each of the seven causal treatment effects of ATS in both the first and second stages. All simulation results are summarized over 200 replicates. The root mean square error (RMSE) and median absolute error (MAE) are summarized over all replicates. For GPMath and BART, the histogram of the posterior estimates are plotted. The simulation results suggested BART and GPMatch perform consistently better than other ATS methods, and the GPMatch performed better than BART under the nonlinear model setting.

JIA Case Studies

Data from juvenile idiopathic arthritis (JIA) patients was utilized in three case studies to evaluate the performance of GPMatch as compared to other commonly used methods for causal inference. The first two case studies evaluate performance in the binary treatment and continuous outcome setting (also referred to as "one-stage") while the last case studies utilizes an adaptive treatment strategy (ATS) setting (also referred to as "two-stage").

Figure 17:
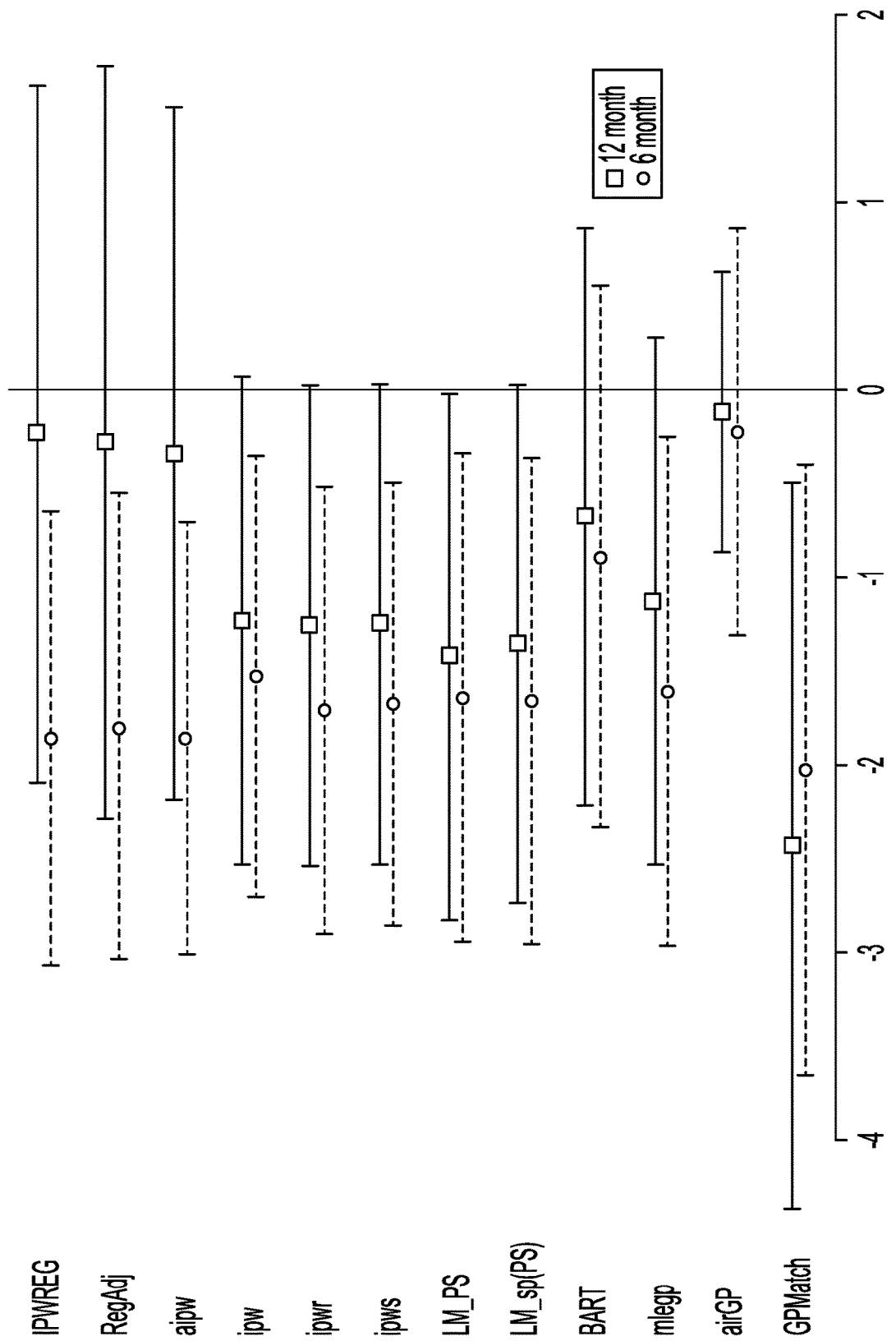
FIG. 17. Forest plot of estimated averaged causal treatment effect as estimated using 11 different methods using real world data from a JIA case study.

The results demonstrate that given a sufficiently large patient sample size, GPMatch generally outperforms other methods. FIG. 17 (JIA Case Study 2) summarizes the performance of GPMatch in the "one-stage" treatment setting as compared to 11 other commonly used methods. Only GPMatch demonstrated the expected behavior based on the data. In contrast, the other methods show unexpected behaviors and fail to conclude effectiveness of the treatment. In the "two-stage" setting GPMatch was less vulnerable to model misspecification.

JIA is one of the most common autoimmune diseases in children. The incidence rate of JIA is about 10.0 per 100,000 for girls and 5.7 per 100,000 for boys. JIA is a heterogeneous group of diseases. Systemic JIA presents distinct features and requires more distinctive treatment approaches than other types of JIA. Non-systemic JIA includes polyarthritis, oligoarthritis, psoriatic arthritis enthesitis-related arthritis, and undifferentiated arthritis, which are collectively referred to as polyarticular course of JIA (pcJIA). pcJIA patients are often refractory to treatment, and their courses alternate between relapse and remission.

Figure 12A:
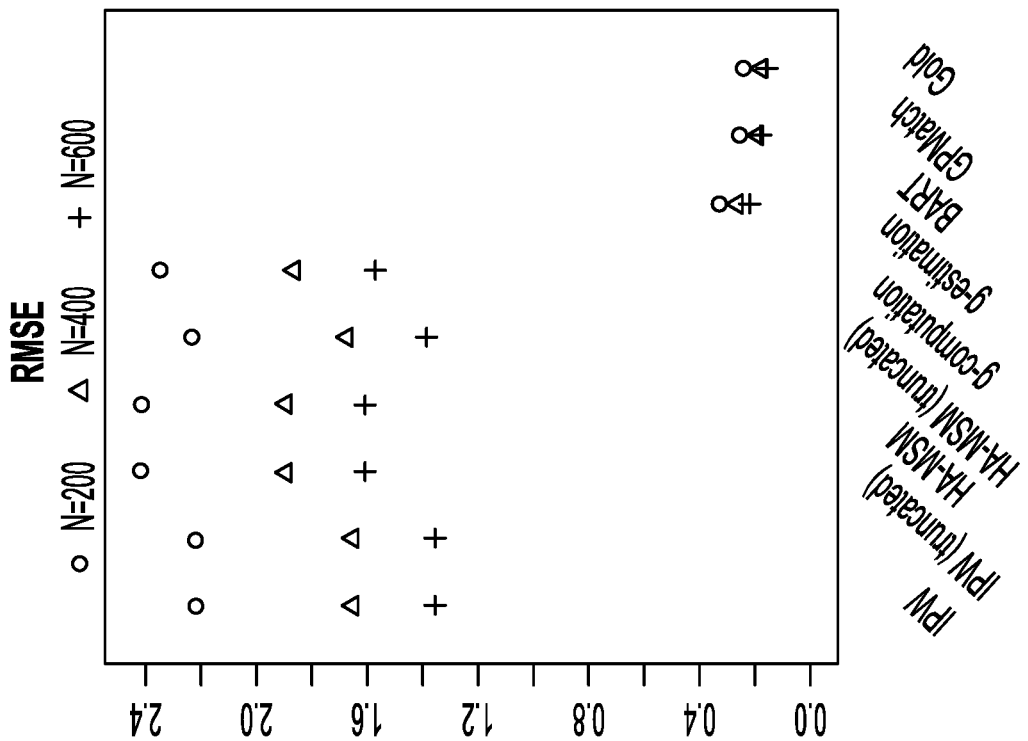
FIG. 12A-B. MAE (left panel) and RMSE (right panel) of ATE estimates using different methods under an observational study adaptive treatment subgroup treatment effect setting for potential outcomes Y01-Y00 (A) and Y11-Y10 (B).
Figure 12A:
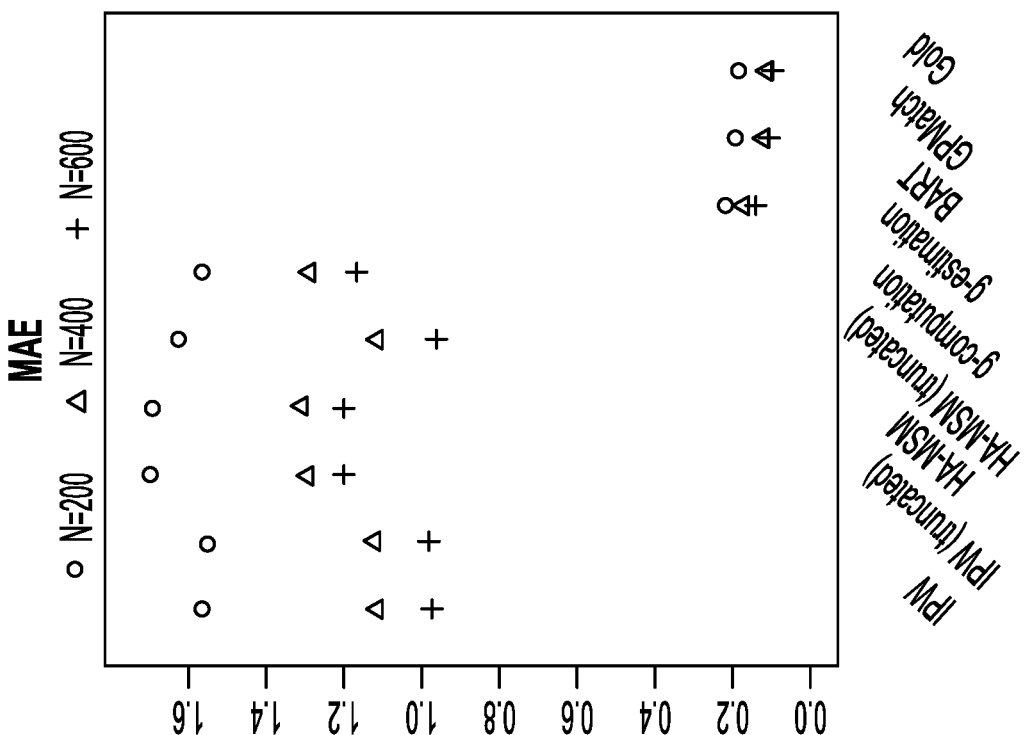
Figure 12B:
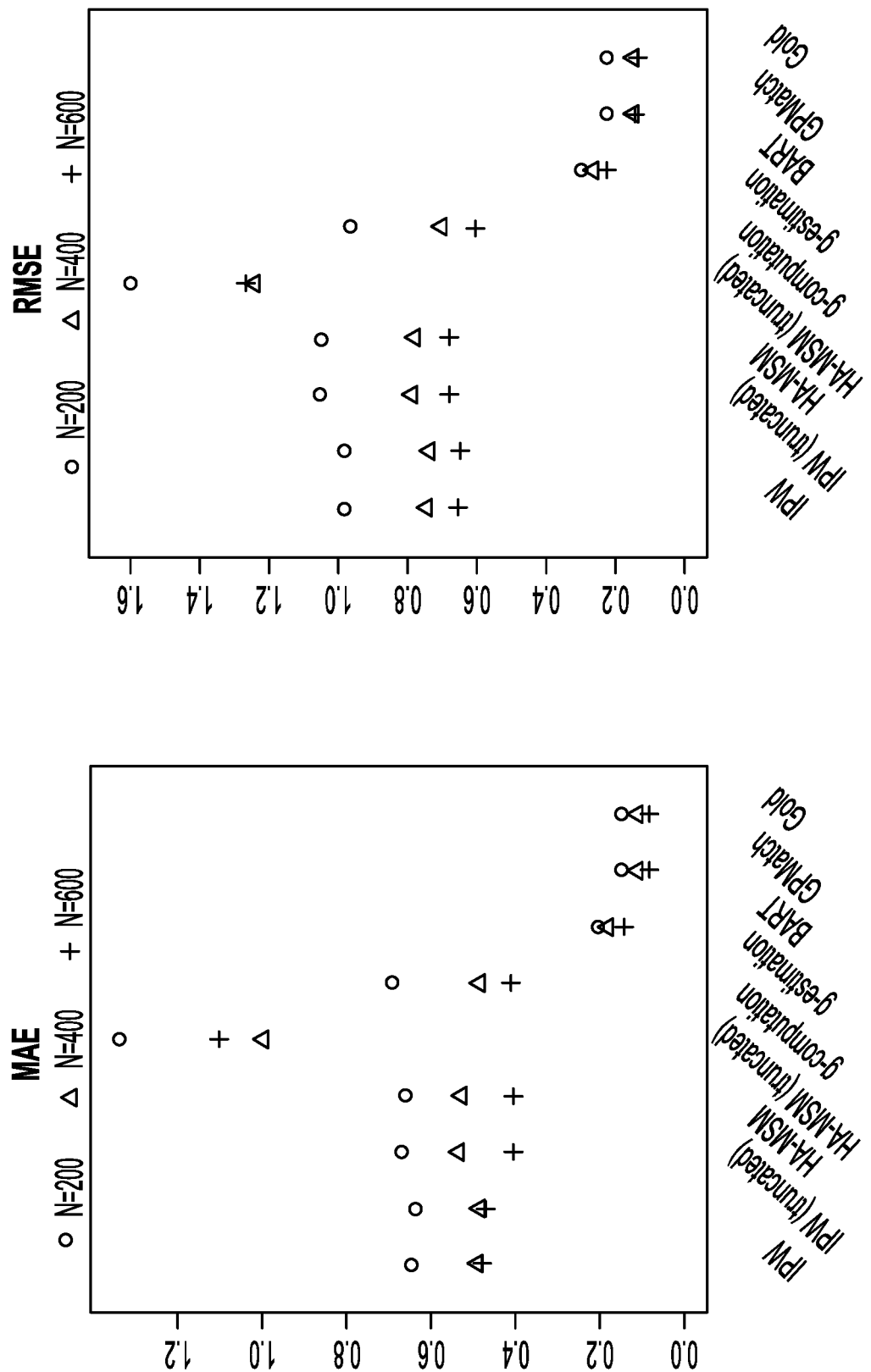
Figure 13:
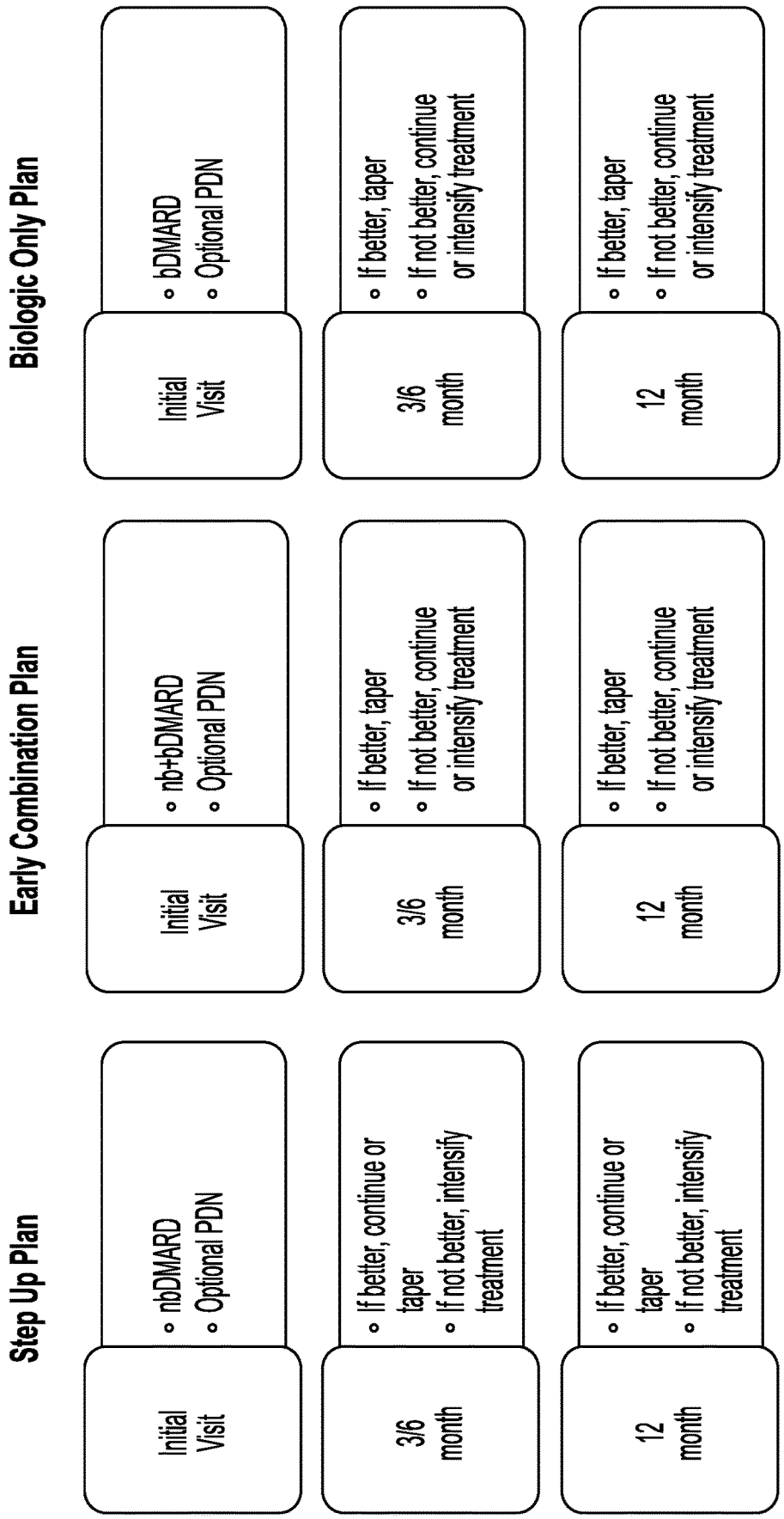
FIG. 13. The three consensus treatment plans for pcJIA patients, "step-up", "early combination", and "biologic only".

Various treatment options have been made available for JIA in the past two decades. The advent of biologic ("b") disease modifying antirheumatic drugs (bDMARD) and non-biologic or conventional synthetic ("nb" or "cs") disease modifying anti-rheumatic drugs (nbDMARD) have revolutionized treatment, making it possible to set inactive disease as the treatment target. However, it is unknown at the time of initial treatment which treatment strategy will be the most effective to induce remission for a given individual. Additionally, for a patient who does not respond to previous treatment, the next best option is often unknown. Such poorly guided treatment strategies produce inferior treatment outcomes. Despite advanced medical treatment, half of patients experience suboptimal health-related quality of life (HRQoL). As the first step towards informing better medical decision making to help optimize patient outcomes, a panel of JIA experts developed three consensus treatment plans (FIG. 12): step-up, early combination, and biological DMARDs only for patients who were newly diagnosed with pcJIA. The step-up plan starts with conventional synthetic DMARDs (csDMARDs), then steps-up to more aggressive approaches for non-responders. The early combination treatment plan starts with a combination of conventional synthetic and biologic DMARDS (cs+bDMARDs) first, followed by less aggressive treatment for responders. The biologic only plan begins treatment with biologic DMARDS (bDMARD).

1. JIA Case Study 1: Binary Treatment and Continuous Outcome Setting with JADAS as Primary Outcome Some studies have suggested that early initiation of biologic DMARDs may provide a window of opportunity in preventing joint damage and disability, or in achieving clinical remission off medication. However, real-world evidence demonstrating efficacy of is lacking.

This initial example describes the use of GPMatch to evaluate whether therapy using early aggressive combination of non-biologic and biologic DMARDs ("early combination therapy") is more effective than the more commonly adopted non-biologic DMARDs monotherapy ("monotherapy") in treating children with recently (<6 months) diagnosed polyarticular course of JIA. Due to the 6 month end point, this study did not compare the "step up" therapy with "early combination" therapy. Those alternatives are addressed in the example below.

The source data was collected from a completed prospectively followed up inception cohort research study. In addition, a retrospective chart review collected medication prescription records of the study participants captured in the electronic health record system. The sample set included 75 patients total. At baseline, 52 patients were receiving monotherapy and 23 were receiving the combination therapy.

The primary outcome used was the Juvenile Arthritis Disease Activity Score (JADAS) after 6 months of treatment. The JADAS is a disease severity score calculated as the sum of four core clinical measures: physician's global assessment of disease activity (0-10), patient's self-assessment of overall wellbeing (0-10), erythrocyte sedimentation rate (ESR, standardized to 0-10), and number of active joint counts (AJC, truncated to 0-10). The JADAS ranges from 0 to 40, with 0 indicating no disease activity. JADAS as a disease activity measure has been validated and widely adopted as the clinical outcome measures in JIA. The JADAS measures accrual disease activity at a single point in time and allows comparison of disease activity between patients.

The patients with more severe disease are more likely to receive the combination therapy. Disease severity is determined by longer disease duration, positive rheumatoid factor (RF) presence, higher pain visual analog scale (VAS), lower baseline functional ability as measured by the childhood health assessment questionnaire (CHAQ), higher lost range of motion (LROM), and JADAS score.

The propensity of treatment assignment score was derived using the CBPS method applied to the pre-determined important baseline confounders. The derived propensity scores were able to achieve a desired covariate balance within the 0.2 absolute standardized mean difference and comparable distributions in important confounders. The GPMatch model included the baseline JADAS, CHAQ, time since diagnosis at baseline, and time interval between baseline and the six month follow-up visit in modelling the covariance function. These four covariates, along with the binary treatment indicator and an indicator of positive test of rheumatoid factor were used in the partially linear mean function part of the GPMatch. Applying the proposed method, GPMatch obtained the average treatment effect of −2.90 with standard error of 1.91, and the 95% credible interval of (−6.65, 0.79).

The results suggest that the early aggressive combination of non-biologic and biologic DMARDs as the first line of treatment is more effective, leading to a nearly 3 point of reduction in JADAS six months after treatment, compared to the non-biologic DMARDs treatment to children with a newly diagnosed disease. The results of ATE estimates by GPMatch, naive two group comparisons, and other causal inference methods are presented in Table 3.

TABLE 3

ATE estimates by GPMatch, naive two group comparisons, and other causal inference methods.

| Method | Estimate | SD | LL | UL |
|---|---|---|---|---|
| Naïve | −0.338 | 1.973 | −4.205 | 3.529 |
| QNT_PS | −0.265 | 0.792 | −1.817 | 1.286 |
| AI PTVV | −0.639 | 2.784 | −6.094 | 4.817 |
| LM | −2.550 | 1.981 | −6.432 | 1.332 |
| L M_PS | −2.844 | 2.002 | −6.767 | 1.079 |
| LM_sp(PS) | −1.664 | 2.159 | −5.896 | 2.568 |
| BART | −2.092 | 1.629 | −5.282 | 1.155 |
| GPMatch | −2.902 | 1.912 | −6.650 | 0.789 |

SD = standard deviation;
LL = lower limit;
UL = upper limit;
Naïve: Student-T two group comparisons;
QNT_PS: Propensity score sub-classification by quintiles.
AIPTVV: augmented inversed probability of treatment weighting;
LM: linear regression modeling Y ~ X;
LM_PS: linear regression modeling with propensity score adjustment.
LM_sp(PS): linear regression modeling with spline fit propensitys core adjustment;
BART: Bayesian additive regression tree;
GPMatch: Bayesian structural model with Gaussian process prior.

The LM, LM_PS, LM_sp(PS) and AIPTW include the same five covariates in the model along with the treatment indicator. BART used the treatment indicator and those covariates. While all results suggested effectiveness of an early aggressive use of biological DMARD, the naive, PS sub-classification by quintiles, and AIPTW suggested a much smaller ATE effect. The BART and PS adjusted linear regression produced results that were closer to the GPMatch results suggesting 2 or 3 points reduction in the JADAS score if treated by the early aggressive combination DMARDs therapy. None of the results were statistically significant at the 2-sided 0.05 level due to the small sample size used in this study. Accordingly, we sought to test the model with a larger sample size.

2. JIA Case Study 2: Binary Treatment and Continuous Outcome Setting with c-JADAS as Primary Outcome This example evaluated the effectiveness of the early combination therapy with the more conservative strategy of treating with bDMARDs only later, following an initial treatment with montherapy ("step up therapy"), for children with newly diagnosed polyarticular course JIA (pcJIA). The primary outcome was reduction in disease activity and improved quality of life as measured by the Juvenile Arthritis Disease Activity Score (cJADAS) at 6 and 12 months. Higher cJADAS indicates higher disease activity. The cJADAS was calculated for all 0, 6, and 12 months visits using observations from clinical encounters fall within the 1-month time window. If more than one clinical encounter occurred within the window, then an averaged value of the specific core measures was used. The secondary outcome was health-related quality of life assessed by the Pediatric Quality of Life Inventory (PedsQL) generic module.

Study design and patient population: Data were extracted from the electronic medical record (EMR) system for 2,082 JIA patients seen at a large U.S. Midwest pediatric rheumatology clinic from Jan. 1, 2009 to Dec. 31, 2018. Eligible patients were 1-19 years old, DMARD-naïve, and newly-diagnosed pcJIA including sub-types of polyarthritis, oligoarthritis, psoriatic arthritis, enteritis related arthritis, and undifferentiated arthritis according to the International League of Associations for Rheumatology. Patient must be diagnosed with pcJIA in at least two distinct visits by pediatric rheumatologists and had a rheumatology clinic visit within 6 months after the diagnosis. Patients with the comorbid conditions of inflammatory bowel disease ("IBD"), celiac disease, and trisomy 21 were excluded.

Figure 14:
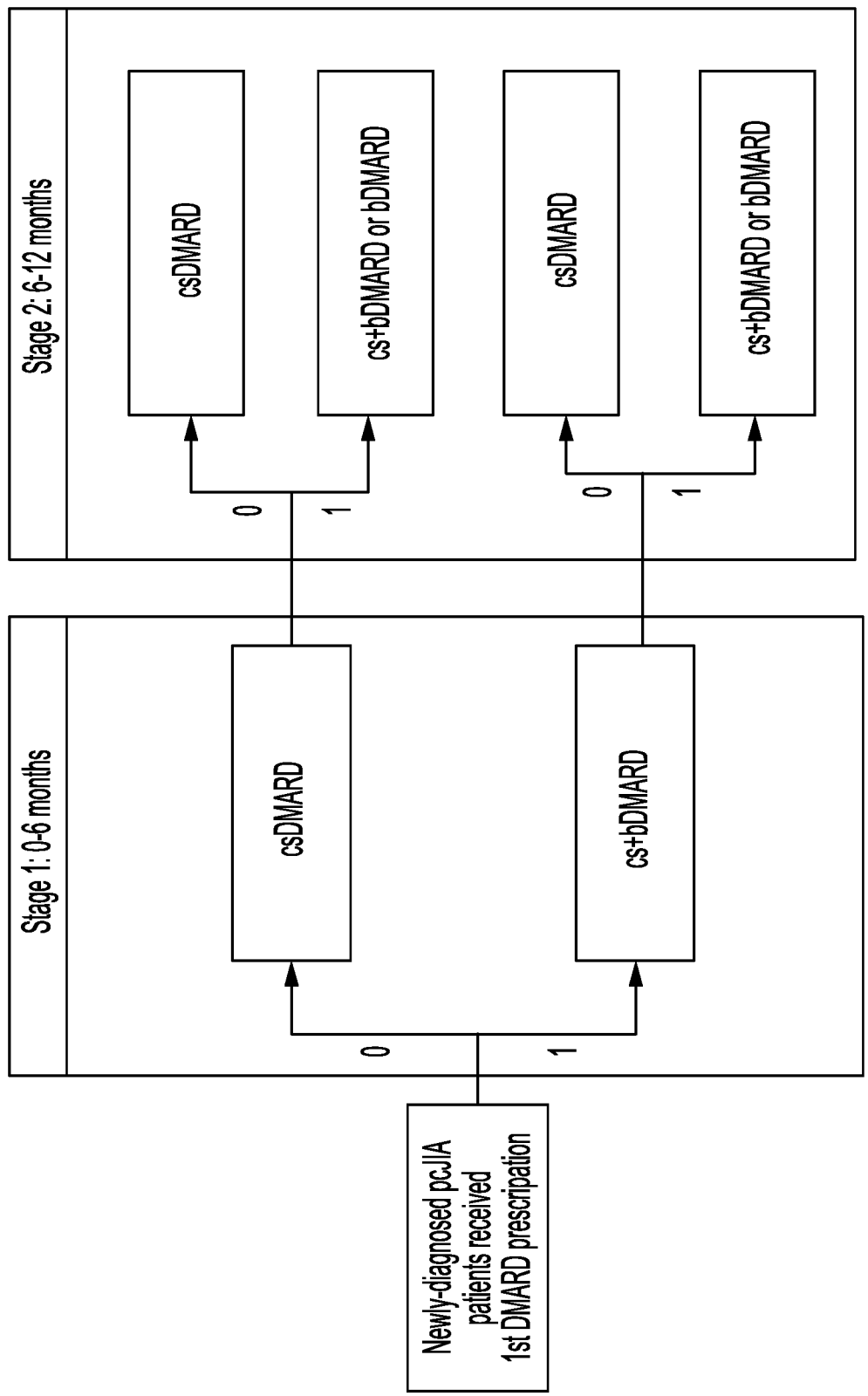
FIG. 14. Adaptive treatment strategies for disease modifying anti-rheumatic drug prescriptions at stage 1 and stage 2. 0 indicates conservative treatment approach and 1 indicates aggressive treatment approach; pcJIA, polyarticular course juvenile idiopathic arthritis; DMARD, disease modifying antirheumatic drug; csDMARD, conventional synthetic disease modifying antirheumatic drug; bDMARD, biologic disease modifying anti-rheumatic drug; cs+bD- MARD, combination of conventional synthetic and biologic disease modifying antirheumatic drug.

Treatment: The adaptive treatments (FIG. 14) were determined based on the concurrent medication prescriptions recorded in the EMR at all clinical encounters. Patients assigned to early aggressive treatment strategy group were those received both bDMARD and csDMARD prescriptions within 2 months. Patients on the conservative comparator group were those initiated on csDMARDs and did not receive any bDMARD in at least 3 months. The time when patients received their first DMARD prescription was the baseline (0 month). The follow-up visits at 3, 6 and 12 months were identified based on patients' subsequent clinical visits and changes in DMARDs prescriptions. Any changes in medication prescriptions were recorded and compared to the previous prescription. Based on the prescription changes, patients were further allocated into the second-stage adaptive groups based on initiation or dropping of bDMARDs by 6-months of follow-up.

Outcomes: The primary outcomes were the clinical Juvenile Arthritis Disease Activity Score (cJADAS) at the 6 and 12-months follow-up visits. The cJADAS10 ranges 0-30, summarizing the physician global assessment of disease activity (range 0-10), patient/parent global assessment of well-being (range 0-10), and active joint count truncated at 10. Higher cJADAS indicates higher disease activity. The cJADAS was calculated for all 0, 6, and 12 months visits using observations from clinical encounters fall within the 1-month time window. If more than one clinical encounter occurred within the window, then an averaged value of the specific core measures was used. The secondary outcome was health-related quality of life assessed by the Pediatric Quality of Life Inventory (PedsQL) generic module. The PedsQL generic total score ranges between 0 to 100, with a higher score indicating a better quality of life. Since patients were only asked to fill out the PedsQL questionnaire on an annual basis, the observed score was assigned to the nearest visit date for each patient within a 3 months window. Patients who had less than 12-months follow-up were excluded when analyzing the PedsQL outcome at 12 months.

Covariates: Demographic variables included age, race, gender, and insurance type. Disease characteristics included JIA subtype, age of diagnosis, year of diagnosis, disease duration at the baseline, and age at the initiation of DMARDs. Biological variables included rheumatoid factor, antinuclear antibodies, and erythrocyte sedimentation rate. Other than the three core measures used in the calculation of cJADAS, patient-reported pain, duration of morning stiffness, and physician assessment of total number of joints with limited range of motion were also collected. All these covariates were considered in the statistics causal inference analyses in order to correct for the confounding-by-indication bias. Over the course of the treatment, the clinical measures such as the biological variables, patient reported data (pain and stiffness), cJADAS components, and active joint counts may change over time. These measures, along with the duration of follow-up, were considered as time-varying covariates in the analyses.

Statistical Analyses: At the baseline, the patient demographic, insurance, and disease characteristics were compared between the two groups using chi-square test or t-test. Using clinical observational data, unlike the RCTs, treatments were assigned deliberately by patients' disease status. Therefore, sicker patients tend to receive more aggressive treatment. Bayesian causal inference with gaussian process (GP) prior has been used to address such confounding-by-indication bias. Here, we evaluated the performance of GPMatch compared to 11 other methods for estimating causal treatment effect.

The propensity score (PS) method is the most widely used method for comparative effectiveness. Accordingly, we incorporated six different propensity score methods which are offered in the SAS/STAT® 15.1 CAUSALTRT package (2018). These are designated ipwreg, regadj, aipw, ipw, ipwr, and ipws. We also included two linear regression models, LM_PS and LM_sp(PS). Each includes the function of estimated propensity score in the modeling of cJADAS outcomes. LM_PS includes linear form of PS and LM_sp (PS) include a spline fit function. In all eight propensity score based methods, the propensity scores are generated using the same logistic regression model, fitting the logit-probability of baseline treatment assignment by the following baseline covariates—baseline cJADAS score, JIA subtype, MD global assessment of disease status, active joint count, patient gender, insurance type (private vs. public), time since diagnosis of JIA, baseline age, and the calendar year of patient's baseline visit. Different propensity score with including additional baseline covariates are also performed. The ipwreg, regadj, aimpw, LM_PS and LM_sp(PS) are methods that also involve linear regression modeling of outcome model. In all of these outcome models, the same set of covariates were included. These were JIA subtype, baseline cJADAS, private insurance, gender, active joint counts, MD global assessment of disease activity, morning stiffness, time duration between the baseline and the outcome measure, and the calendar year of the baseline. Third order interactions were also considered among the JIA subtype, baseline cJADAS, and private insurance; and second order interactions between JIA subtype and the time duration from the baseline to the outcome measure were also included in the mean function of the model.

The last four methods, with the exception of mleGP, are Bayesian flexible regression methods. The Bayesian additive regression tree (BART) is currently considered the best Bayesian method for causal inference, and thus is included as a comparator for GPMatch. The additive-interactive regression GP ("airGP") method has recently been proposed as a Bayesian causal inference method utilizing a GP prior. The mleGP is a maximum likelihood estimation method for GP regression modeling. GPMatch differs from the airGP and mleGP methods in that it utilizes the GP prior as a matching tool. In each of these Bayesian flexible regression models, the same set of covariates was used, including the same covariates noted above for the non-Bayesian methods.

Figure 15:
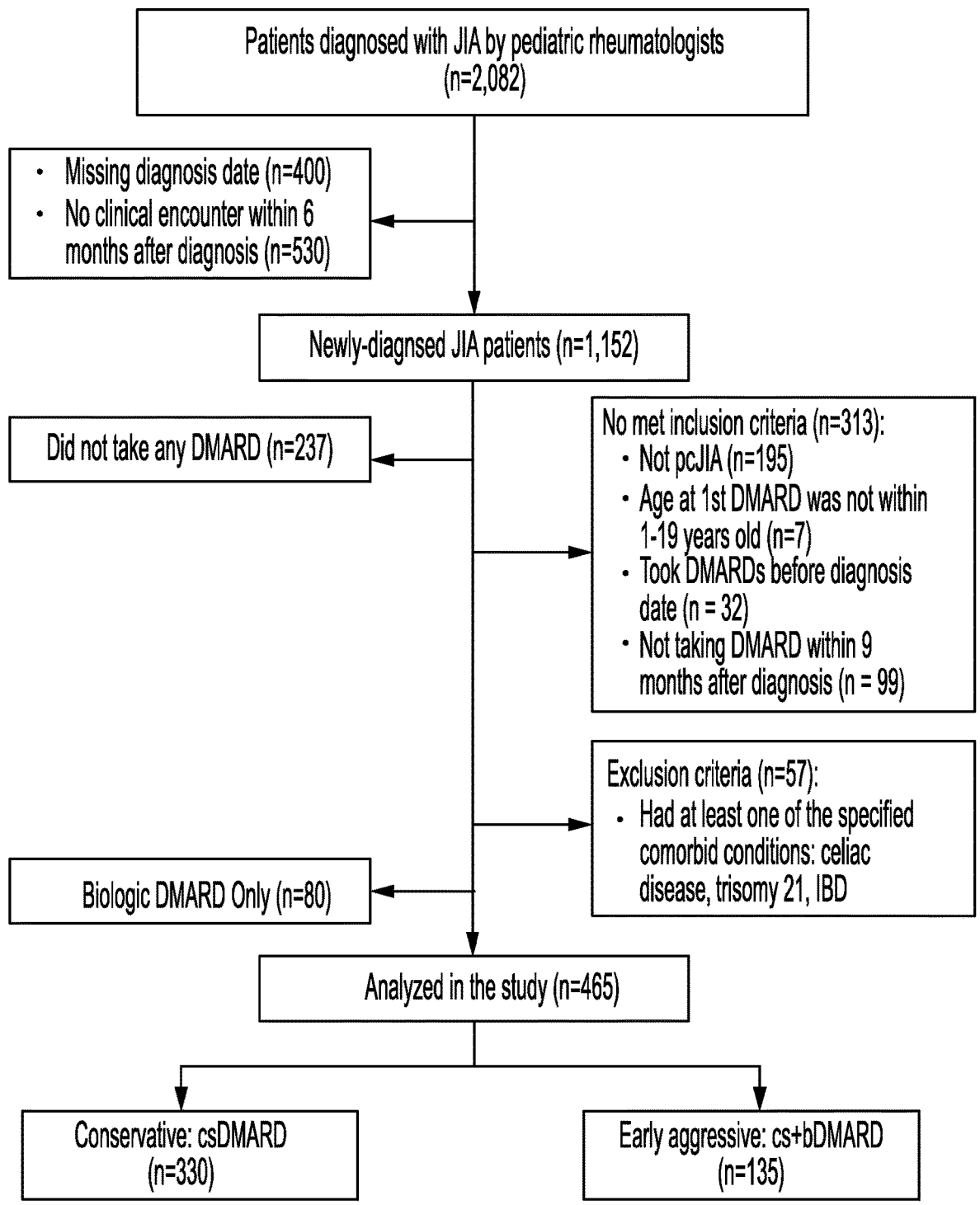
FIG. 15. Flow chart of study eligibility screening. JIA, juvenile idiopathic arthritis; pcJIA, polyarticular course juvenile idiopathic arthritis; IBD, inflammatory bowel disease; DMARD, disease modifying antirheumatic drug; csDMARD, conventional synthetic disease modifying antirheumatic drug; bDMARD, biologic disease modifying antirheumatic drug; cs+bDMARD, combination of conventional synthetic and biologic disease modifying antirheumatic drug.

Patient Characteristics: Out of 545 eligible patients, 330 were treated on conservative strategy, and 135 were treated in early aggressive strategy. Since we only compared early aggressive vs. conservative approach, patients with bDMARD only (n=80) were not included in this study. Detailed patient eligibility screening is summarized in FIG. 15. Table 4 presents the baseline characteristics of patients by treatment group. The average time from date of diagnosis to baseline visit were 0.10 year (standard deviation (SD)=0.16), similar in both groups (p=0.36). Confounding-by-indication was clearly evident. Patients on early aggressive had significantly more active disease at baseline (e.g. mean+/−SD of cJADAS 16.08+/−7.14 vs. 12.39+/−5.91; p<0.0001). The mean and standard deviation of follow-up duration were 0.50+/−0.06 year and 1.00+/−0.06 year at the 6 and 12 months.

TABLE 4

| Baseline characteristics of patients by treatment group | | | | | |
|---|---|---|---|---|---|
| | Conservative: csDMARD (N = 330) | | Early aggressive: cs+bDMARD (N = 135) | | |
| Baseline Variable | N | Mean ± SD | N | Mean ± SD | P-value[‡] |
| Age (years) | 330 | 9.81 ± 5.08 | 135 | 10.24 ± 4.74 | 0.40 |
| Age of Diagnosis (years) | 330 | 9.70 ± 5.11 | 135 | 10.14 ± 4.78 | 0.39 |
| Year of Diagnosis | 330 | 2013.57 ± 3.14 | 135 | 2013.12 ± 2.88 | 0.15 |
| Onset Age (years) | 265 | 8.18 ± 4.86 | 110 | 8.77 ± 5.04 | 0.29 |
| Disease Duration at Diagnosis (years) | 266 | 1.40 ± 2.24 | 109 | 1.66 ± 2.97 | 0.35 |
| Time Since Diagnosis (years) | 330 | 0.11 ± 0.16 | 135 | 0.09 ± 0.16 | 0.36 |
| cJADAS10 (0-30) | 203 | 12.39 ± 5.91 | 92 | 16.08 ± 7.14 | <.0001 |
| Active Joint Count (0-71) | 296 | 7.53 ± 8.87 | 127 | 11.97 ± 11.77 | <.0001 |
| Patient/parent Global Assessment of Well-being (0-10) | 294 | 3.39 ± 2.46 | 122 | 4.54 ± 2.69 | <.0001 |
| Physician Global Assessment (0-10) | 221 | 4.14 ± 2.45 | 98 | 5.08 ± 2.68 | 0.002 |
| Limited Range of Motion (0-71) | 296 | 5.51 ± 7.27 | 127 | 9.33 ± 11.30 | <.0001 |
| Erythrocyte Sedimentation Rate (mm/hr) | 175 | 19.79 ± 19.54 | 85 | 32.33 ± 29.39 | <.0001 |
| Global Pain NRS (0-10) | 298 | 4.15 ± 2.71 | 124 | 5.12 ± 2.65 | 0.0008 |
| PedsQL Generic Total | 165 | 67.58 ± 17.53 | 67 | 61.35 ± 19.24 | 0.018 |

| | N | % | N | % | P-value |
|---|---|---|---|---|---|
| Female | 236 | 71.5 | 98 | 72.6 | 0.81 |
| Race | | | | | 0.81 |
| White or Caucasian | 293 | 88.8 | 117 | 86.7 | |
| Black or African American | 21 | 6.4 | 9 | 6.7 | |
| Other | 12 | 3.6 | 7 | 5.2 | |
| Unknown | 4 | 1.2 | 2 | 1.5 | |
| JIA Subtype | | | | | 0.03 |
| Poly RF− | 118 | 35.8 | 61 | 45.2 | |
| Poly RF+ | 26 | 7.9 | 15 | 11.1 | |
| Oligo | 105 | 31.8 | 26 | 19.3 | |
| Other | 81 | 24.5 | 33 | 24.4 | |
| Insurance | | | | | 0.83 |
| Public | 82 | 24.8 | 33 | 24.4 | |
| Private | 222 | 67.3 | 89 | 65.9 | |
| Other | 26 | 7.9 | 13 | 9.6 | |
| Morning Stiffness | | | | | 0.002 |
| None | 65 | 19.7 | 16 | 11.9 | |
| 15 Minutes | 35 | 10.6 | 12 | 8.9 | |
| >15 Minutes | 116 | 35.2 | 73 | 54.1 | |
| Unknown | 114 | 34.5 | 34 | 25.2 | |
| Uveitis Ever | | | | | 0.96 |
| No | 143 | 43.3 | 57 | 42.2 | |
| Yes | 10 | 3.0 | 4 | 3.0 | |
| Unknown | 177 | 53.6 | 74 | 54.8 | |
| Elevated C-reactive Protein | 43 | 13.0 | 38 | 28.1 | <.0001 |
| Rheumatoid Factor-Positive | 18 | 5.5 | 18 | 13.3 | 0.004 |
| Antinuclear Antibodies-Positive | 33 | 10.0 | 21 | 15.6 | 0.09 |
| HLA-B27-Present | 13 | 3.9 | 10 | 7.4 | 0.12 |
| Previous Treatment with NSAID | 252 | 76.4 | 79 | 58.5 | 0.0001 |
| Previous Treatment with Prednisone | 20 | 6.1 | 13 | 9.6 | 0.17 |

[‡]P values of Chi-square for categorical variables and student t-test for continuous variables.
cJADAS, clinical Juvenile Arthritis Disease Activity Score;
NRS, numeric rating scale;
NSAID, non-steroidal anti-inflammatory drug;
csDMARD, conventional synthetic disease-modifying antirheumatic drug;
cs+bDMARDs, combination of conventional and biologic disease-modifying antirheumatic drug;
SD, standard deviation Treatment Patterns: Of the 330 patients initiated on csD-MARD, the majority (n=319, 96.67%) were prescribed methotrexate. Fifteen patients had less than 3-months follow-up, and additional 10 patients had less than 6-months follow-up. At the 3-months follow-up, of the 315 followed up patients, 285 (90.5%) patients remained on the same DMARDs, 24 (7.6%) stopped DMARDs. One patient switched from methotrexate to sulfasalazine. At the 6-months follow-up, of the 300 followed up patients, 133 (44%) started on bDMARD, 149 (50%) stayed on the same initial prescription and 18 (6%) patients were off DMARDs.

Of the 135 patients received early combination prescription, 81 (60%) were on methotrexate and etanercept, and 36 (26.7%) were on the methotrexate and adalimumab combination. All 135 patients had 3-month follow-up visit, majority (112, 85.5%) stayed on the same prescription. At the 6-month visit, of 129 followed up patients, 109 (84.5%) continued on the same prescription and 20 (15.5%) discontinued from bDMARD.

Results

Figure 16B:
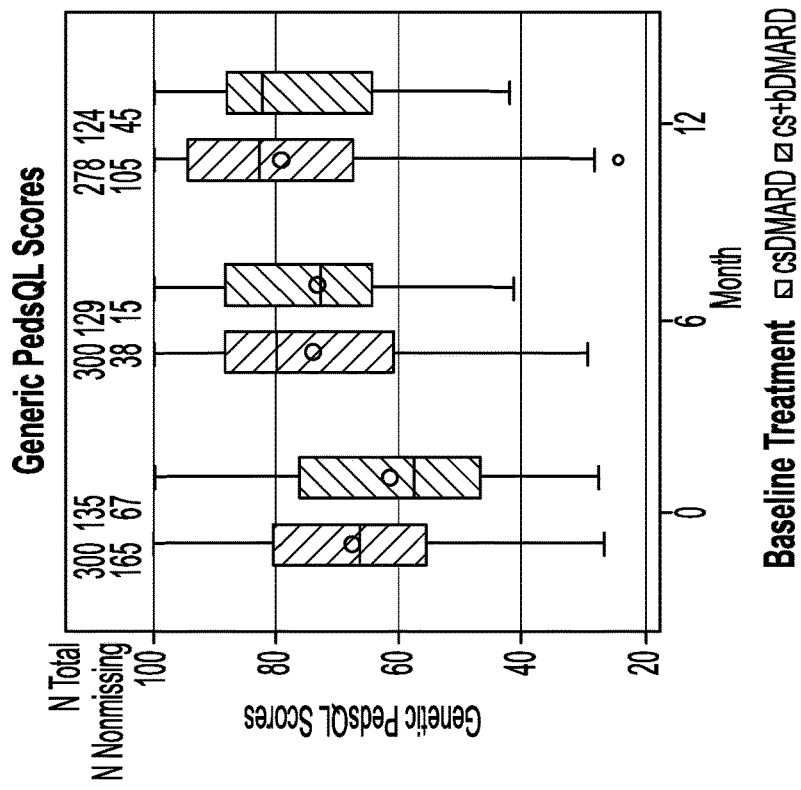
FIG. 16A-B. Box plots for cJADAS and PedsQL scores by treatment group at baseline, 6 months, and 12 months. cJADAS, clinical Juvenile Arthritis Disease Activity Score; PedsQL, Pediatric Quality of Life Inventory; csDMARD, conventional synthetic disease-modifying antirheumatic drug; cs+bDMARDs, combination of conventional synthetic and biologic disease-modifying antirheumatic drug.
Figure 16A:
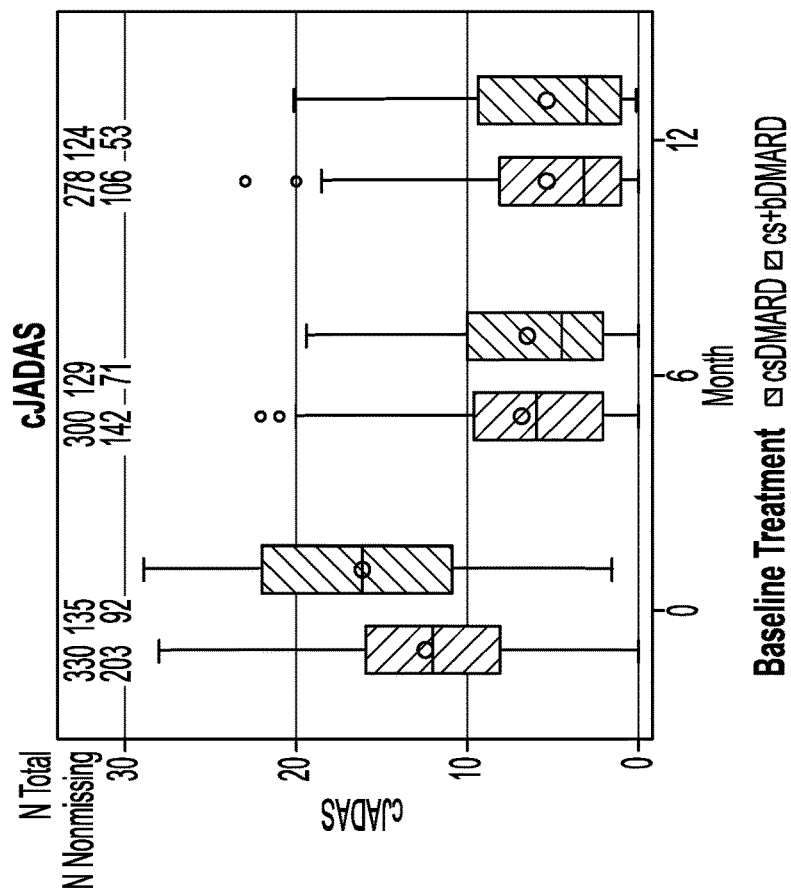

The raw data of the distributions of cJADAS at the 6 and 12 month follow up are summarized in the Box-Whisker plots of cJADAS and PedsQL score over time grouped by initial prescription and presented in FIG. 16A and FIG. 16B, respectively. As evidenced by the figure, patients who were assigned into the early aggressive treatment presented with more active disease at baseline, while presenting with similar disease activities after 6 and 12 months of treatment, compared to the conventional treatment approach. Thus, we expect to see better improvement in patients treated on the early aggressive therapy. Due to missing data, there is a larger sample size for the model of 6-month cJADAS (N=213) than the 12-month cJADAS (N=159). Thus, we also expect to see a wider interval width for the 12-month outcome compared to the 6-month outcome.

FIG. 17 displays the estimated averaged causal treatment effect from each of the different methods for the 6- and 12-month cJADAS time points. For the 6-month time point a dot marks the mean, and the dashed line represents the 95% confidence interval. For the 12-month time point, a black square marks the mean, and the black line represents the 95% confidence interval. Comparing GPMatch with the other 11 methods presented in FIG. 17, it can be seen that GPMatch is the only method that demonstrates the expected behavior. GPMatch presents consistent effectiveness of the early aggressive therapy at both the 6 and 12 month time points, and the interval estimate is wider for the 12 month than for the 6 month time point. In contrast, the other methods show unexpected behaviors and fail to conclude effectiveness of the treatment. For the PS based methods, performances hinges on correct modeling of PS. For the Bayesian approaches that rely on the flexible outcome modeling feature of GP, or parameter rich approaches such as BART, the model can behave erroneously due to treatment selection confounding. Notice that the airGP method displays a surprising behavior of producing shorter interval and smaller effect size for the 12 month outcome than the 6 month outcome. The BART method underestimates the treatment effect for both the 6 and 12 month outcomes.

The following discusses in more detail the outcomes as determined by GPMatch.

Primary Outcome: cJADAS at the 6-months and 12-months. Although patients on the early aggressive combination presented higher disease activities at the baseline, the two groups were no longer statistically different at the follow-up visits. Respectively, the cJADAS (mean±SD) changed from the 16.08±7.14 and 12.39±5.91 at the baseline, to 6.47±5.68 and 6.91±5.68 at the 6-month; and 5.45±5.64 and 5.25±5.32 at the 12-month follow-up. At 6 months of follow-up visit, the estimated mean cJADAS was 4.78 (95% CI 3.27 to 6.31) corresponds to the reduction (4) from the baseline cJADAS by a mean+/−SD of 8.87+/−0.80 if all treated on cs+bDMARD, vs. 6.95 (95% CI 5.84 to 8.03; $\Delta$=6.70+/−0.58) if they were treated on the csDMARD. The early aggressive treatment, on average, expected to reduce cJADAS by additional −2.17 (95% CI−3.77 to −0.56) at 6 months.

After 6 months of treatment, the initial treatment was adjusted by prescribing on or withdraw bDMARDs from the initial prescription. Following the initial csDMARD treatment, the expected mean cJADAS was 5.04 (Y(01), 95% CI 3.27 to 6.87; $\Delta$=8.61+/−0.92) if introducing bDMARDs vs. 5.43 (Y(00), 95% CI 3.19 to 7.78; $\Delta$=8.22+/−1.18) if continuing on csDMARD. The average treatment benefit was only −0.39 (Y(01)−Y(00), 95% CI−2.75 to 1.97). Similarly, adjustment made following the initial cs+bDMARD led to nearly identical cJADAS outcome with the estimated mean cJADAS being 2.50 (Y(11)=continue on bDMARD, 95% CI 0.66 to 4.45; $\Delta$=11.15+/−0.97) and 2.76 (Y(10)=withdraw bDMARD, 95% CI−0.48 to 5.58; $\Delta$=10.89+/−1.53). Additional analyses suggested that the odds for the early use of bDMARD (Y(10)) to be more effective than the later use (Y(01)) is 8.25; and the odds to be at least one point more effective in cJADAS is 3.15. The analyses did not identify heterogeneous treatment effect by JIA subtypes or baseline cJADAS.

Secondary Outcome: PedsQL™ generic total score at 12 months. Similarly to the cJADAS results, the early aggressive group presented worse quality of life at the baseline, but similar scores at the 6 and 12-months follow-up, with PedsQL scores (mean+/−SD): 61.35+/−19.24 vs. 67.58+/−17.53 at baseline; 73.40+/−17.42 vs. 74.34+/−19.38 at 6-months; and 76.32+/−16.47 vs. 78.52+/−18.63 at 12-months. Patients were asked to complete the PedsQL generic module on an annual basis, thus the causal inference analyses could only evaluate the effectiveness for the 12-months outcome. The results reported estimated PedsQL scores of 76.26+/−4.80 and 82.61+/−6.09 after 12 months treated on the csDMARDs and cs+bDMARDs respectively, showing 6.35 (95% CI−5.89 to 18.58) points improvement for cs+bDMARDs vs. csDMARDs. Both presented clinically meaningful improvement from the baseline, $\Delta$=15.17+/−6.10 and $\Delta$=8.82+/−4.81 improvement in cs+bDMARDs and csDMARDs respectively.

Discussion: This study offers real-world evidence supporting the effectiveness of early aggressive treatment and demonstrates the superiority of GPMatch as a causal inference method compared to other commonly used methods. To the best of our knowledge, this is the first study that provides real-world evidence of effective early initiation of bDMARDs treatment. In routine clinical care, treatment often is adjusted based on patients' disease progress. Within an established EMR system, such interactions can be tracked from the first date of diagnosis throughout the course of disease progression and treatment, particularly for patients with chronic conditions. Therefore, it is an invaluable data source for evaluating the effectiveness of different timing of treatment initiation or treatment withdraw, as well as understanding potential treatment heterogeneity. This study demonstrates, with careful data management and data quality assurance, that the EMR data can be used for a better understanding of treatment effectiveness. (Detailed steps for ensuring data quality from EMR are discussed above and infra).

3. JIA Case Study 3: Adaptive Treatment Strategies

During routine clinical care, treatments are adaptive to patients' responses to previous treatment assignments. Adaptive treatment strategies (ATS) are ubiquitous in clinical practice, particularly in treating patients with prolonged or chronic disease. Despite this, clinical decisions are predominantly based on evidence provided by parallel arm randomized clinical trials, which do not account for the adaptive nature of treatment. Similarly, methods for assessing comparative effectiveness of therapies based on observational data are predominately designed for non-adaptive treatments. Indeed, most methods are designed to evaluate causal treatment effects from single time-point treatment assignments, as in the first two examples above.

This example evaluates the comparative effectiveness of patient-centered adaptive treatment strategies at the initiation of the treatment and over the course of disease progression. polyarticular course juvenile idiopathic arthritis (pcJIA) is again taken as the case study because despite many medication options, it is often refractory and there is a need for better adaptive treatment strategies (ATS).

The following demonstrates the evaluation of a set of time-varying adaptive consensus treatment plans (CTPs) recommended for children with juvenile idiopathic arthritis (JIA). Both GPMatch and BART methods were extended for ATS and applied to electronic medical records data to compare the early combination with step-up consensus treatment plan (CTP). The primary endpoints were Clinical Juvenile Arthritis Disease Activity Score (cJADAS) at 6 and 12 months, and the secondary endpoint was the Pediatric Quality of Life Inventory™ (PedsQL) score at 12 months. The results indicate that by 6-months, patients in the early combination plan on average reduced 2.0 points (95% CL 0.4, 3.6) more than the step-up plan in cJADAS. By 12 months, the early combination plan remains more effective in reducing cJADAS despite the $2^{nd}$ line treatment: average improvement in cJADAS was 2.6 (95% CL 0.6, 4.6) if the 1st line treatment was continued or reduced and 2.2 (95% CL 0.3, 4.14) if treatment was escalated. Both CTPs were effective in improving PedsQL score by 12 months, reporting 74.8±2.0 and 80.4±3.7 for step-up and early combination CTPs, respectively. If treated on early combination plan, patients were expected to achieve an average of 5.61 (95% CL−3.89, 15.12) more points on the PedsQL than patients treated on the step-up plan.

Study Design

In order to evaluate the effectiveness of the early aggressive vs. step-up consensus treatment plan (CTP), we design this observational study as an inception cohort new DMARD user study. Patient 1-19 years of age, newly (<6 months) diagnosed with polyarticular course of JIA (pcJIA) following the CARRA operational definition based on the ILAR (International League of Associations for Rheumatology code, receiving prescription of either early combination disease modifying antirheumatic drugs (DMARD) or none biologic DMARD monotherapy as the first line treatment within 9 months of diagnosis are eligible for the study. Patients with the following comorbid conditions of inflammatory bowel disease (IBD), celiac disease, and trisomy 2 are excluded, as DMARD may be used for treating comorbid conditions. No other exclusion criteria is imposed.

Data Sources Data Management and Quality Assurance

The electronic medical records (EMR) captured in the institutional Epic system of the Cincinnati Children's Hospital Medical Center (CCHMS) served as the primary data source for the study. A subset of the patients (N=215) captured in the Epic system were also participants of a completed NIH study. The NIH study prospectively followed up a cohort of JIA patients cared for at the CCHMC pediatric rheumatology clinic (referred as "the QoL study" hereafter). The data were collected from in-person interviews and manual chart review during each patient's clinical visit. The clinical and demographics data elements collected from the QoL study overlap with data extracted from the Epic system. Where the data in the QoL and the data extracted from the EMR were from the same patient, that identity of records could be established by medical record number. Therefore, the QoL study served as a second data source for quality control. In addition, the QoL study contained enriched quality of life measures not captured in the EMR dataset.

To check data quality, the values of the same data fields were compared between the EMR data extracted from Epic and the data from the QoL study. The EMR data were flagged if any discrepancy were identified. A manual chart review was then conducted on the flagged records, identifying: 1) if the data was collected in the EMR; 2) where it was recorded in the EMR; and 3) whether the same information were recorded at multiple locations within the EMR. Based on these findings data extraction algorithms were revised and the data re-evacuated. The process was iterated until the results yielded minor or no discrepancies between the EMR data and the QoL data. The data elements to be extracted from the EMR and the corresponding clinical research forms were chosen based on the existing literature.

Patient Selection

All rheumatology clinical encounters for children diagnosed with pcJIA were extracted from the Epic EMR system between Jan. 1, 2009 and Dec. 31, 2017. Patients who were diagnosed with pcJIA in at least two distinct visits by the pediatric rheumatologists were identified as pcJIA patients. To select the inception cohort, we first identified for all pcJIA patients their first clinical encounter captured in the EMR. If their first clinical encounter was within 6 months after the first date of diagnosis with pcJIA, then the patient was considered for addition to the inception cohort. Out of the inception cohort, new DMARD users were identify next. For all inception cohort patients, the date of their first DMARD prescription was set as the index visit. If the index visit was less than 9 months after the date of diagnosis, then the patient was identified as a new DMARD user. Finally, eligible patients were identified by applying the following inclusion and exclusion criteria: 1-19 years of age, no comorbidity of IBD, celiac disease or trisomy 21, and have been on their first DMARDs prescription for at least one month.

First Line and Second Line Treatment

All concurrent medication prescriptions recorded in the Epic EMR system for the eligible patients during the course of the study were extracted for each patient clinical encounter. All medication prescriptions were classified into one of the following categories: biological DMARDs, non-biological DMARDs, non-steroid anti-inflammatory drug (NSAID), or other non-DMARD medication. The start and end dates of the DMARDs at any given encounter were recorded. The type and duration of first line and second line DMARD prescriptions were derived as follows. Where the patient received both a biological and non-biological DMARD within two months of initiation of the first DMARDs, then the patient was assigned to the early combination CTP arm. If a patient initiated on a non-biologic DMARD and had not taken a biologic DMARD for at least three months after, then the patient was assigned to the step-up CTP arm. The second line of treatment was determined relative to each patient's first line of treatment, depending on whether the treatment was adjusted from the previous treatment assignment.

Index and Follow-Up Visits

For both groups of patients, a patient's first DMARD assignment was considered as the index visit. The follow-up visits are determined relative to the index visit. The follow-up visits are identified from the clinical encounters that fall within a specified time. The timing of the 3 month follow up visit may vary by patients, determined according to the ending date of the first treatment course. If the first medication course ended within a 1-5 month window after the index visit, then it was identified as the 3 month visit for the given patient. If the end date was longer than five months, the nearest clinical encounter next to 3 months following the index visit was identified as the 3-month visit. If no clinical encounter occurred during the 1-5 months window after the index visit, then we considered the patient has having missed their 3 month follow up visit. Similarly, the 6 month follow-up visits were determined using the 1-5 month window after the 3 month visit date, or using a 5-8 month window after the index visit if the 3 month follow-up visit did not occur. The 9 and 12 month follow up visits were determined similarly. The time duration after the index visit was calculated for each patient. An asymmetric −1 and +2 month window was used to accommodate the possible delay in the patient taking the medication after having been given a prescription, as well as potential lagged treatment effects.

Outcomes

The primary outcome was the clinical Juvenile Arthritis Disease Activity Score (cJADAS) at the 6 and 12 month follow-up visits. cJADAS is a validated disease activity measure that has been widely adopted as the clinical outcome measure in the JIA research field. The cJADAS is a summary score derived from physician global assessment of disease activity (ranges 0-10), patient global assessment of well-being (ranges 0-10), and active joint count truncated at "10". These three core measures reflect different aspects of disease progression that are evaluated routinely during the clinical encounters.

The secondary endpoint was the patient's health related quality of life as assessed by the PedsQL general module total score. Patients or their parent fill out the PedsQL generic module on an annual basis at CCHMC.

Both the cJADAS and PedsQL scores are bounded scores. cJADAS is bounded between 0 and 30, with higher score indicating more disease severity. PedsQL scores are bounded between 0 and 100, with higher score indicating better quality of life. The cJADAS was calculated for all visits using the three core measures extracted from the Epic EMS data that is within +/−1 month window around the identified follow up visit time point. If more than one clinical encounter occurred within the +/−1 month window, then the average value of the specific core measure was used. The PedsQL generic scores were calculated for all visits following the user's manual. Since patients are only required to fill out the PedsQL on an annual basis, the observed score was assigned to the nearest visit date for each patient within a 3-month window.

Covariates

Basic demographics, age, race, gender, and insurance type, of each patient were included as covariates. Also included were the disease characteristics of disease subtype, age of diagnosis, disease duration (i.e. difference between diagnosis and symptom onset), and age at the initiation of DMARDs. Also included were the biological variables of rheumatoid factor (RF; positive/negative), antinuclear antibodies (ANA; positive/negative), and erythrocyte sedimentation rate (ESR; normal range 0-10 mm/hour). Other than the three core measures used in the calculation of cJADAS score, patient reported global pain, duration of morning stiffness (none, <15 mins, >=15 mins) and MD assessment of total number of joints with limited range of motion (LROM) were also collected. All of these covariates were considered in the statistical causal inference process in order to correct for treatment-by-indication bias.

Over the course of the study, clinical measures such as the biological, cJADAS, and other joint measure may change. These measures along with the duration of follow-up at each visit were considered time-varying covariates in the analyses of adaptive CTP treatment.

Statistical Analyses

The baseline patient's demographic, insurance, and disease characteristics were compared between the two treatment arms. The propensity score was derived using the covariate balancing propensity score (CBPS) method to ensure sufficient balance on the identified clinically important covariates between the two treatment arms at the index visit. The clinically important covariates were age, gender, race, JIA subtype, insurance status, age at diagnose of disease, duration of disease at the time of diagnosis, MD global assessment, pain VAS, patient well being, morning stiffness, ANA, RF, ESR, active number of joints, number of joints with lost range of motion, and baseline cJADAS score. The covariate balance plot presented the standardized absolute mean difference between the two treatment groups before and after CBPS weighting. The balance is considered satisfactory if the absolute standardized difference is <=0.2. The empirical distributions of the covariates were compared between the two treatment groups before and after weighted by the CBPS.

For comparing effectiveness of the first line treatment, we considered some widely adopted causal inference methods, including propensity score (PS) sub-classification matching, linear regression with PS adjustment, linear regression with spline fit PS adjustment, augment inverse probability of treatment weighting (AIPTW), Bayesian additive regression tree (BART) and the method described by the present invention, which we refer to as "GPMatch".

As discussed above, GPMatch is a Bayesian nonparametric casual inference method using Gaussian process priors as the matching tool. The GP prior is formulated in such a way that, for each individual patient in the sample, the GP prior will allocate a different weight to information obtained from other individual patients, based on the confounding variables specified in GP prior. As such patients who are similar (dissimilar) to the given patient are contributing more (or less) information in estimating the expected outcomes for the patient if treated under different treatment option. By implementing matching and flexible modeling in the same step, the GPMatch offers protection against potential model misspecifications and produce accurate treatment effect estimates for real world CER setting. Further, it offers a natural solution to evaluate comparative effectiveness of time-varying adaptive treatment. We also extended the BART for the two-staged time-varying adaptive treatment. Both GPMatch and the extended two-staged BART were used for evaluating the adaptive CTP, both first and second line, at the 12 month endpoint.

For all methods, the same set of covariates, along with the duration of follow-up visit after the baseline were used in the outcome models. For the regression model including spline fit PS, the B-spline of estimated CBPS was used. Since the cJADAS is a bounded summary score, Tobit regression (Chib S. Bayes inference in the Tobit censored regression model. J. Econometrics. 1992 Jan. 1; 51(1-2):79-99) was used in all regression type analyses except BART. The comparative effectiveness of early-combination CTP compared to the step-up CTP was reported for the 6 month and 12 month outcomes.

Missing data are expected in a study analyzing existing data. Analyzing existing EMR data, the missing data may be due to two primary reasons. First, the EMR may fail to capture the data for some patient encounters. Second, a patient may not interact with the health care system, resulting in missing data for follow-up time points. For the first case, best efforts were given to discover existing data records within the EMR system. The second case is more difficult since there are many potential reasons as to when and how frequent a patient may interact with their health provider. To handle missing data at baseline, we applied a Bayesian multivariate missing data imputation technique, hierarchically coupled mixture model with local dependence (HCMM-LD) structure method. HCMM-LD is a Bayesian nonparametric missing data imputation technique, specifically designed to model the joint distribution of the multivariate data. By jointly modeling the multivariate data, this method avoids the issue of non-congeniality that occurs in many widely used missing imputation methods, including the multivariate imputation chained equation (MICE). The diagnosis of missing data imputation is presented by presenting kernel fit of the distributions of variables before and after imputation. For sensitive analyses, missing data may also be imputed using MICE.

The outcome models included time duration in the baseline to adjust for different follow-up times. Finally, the causal treatment effect at 6 and 12 months were derived by estimating the averaged treatment effect over all five simulation sets. The final results from each of the five sets of multiple missing data imputation were combined using Rubin's rule.

It is possible that patients with different disease subtypes and disease activities at the baseline, and duration of treatment may have different treatment effect. The heterogeneous treatment effects (HTE) is evaluated using the GPMatch approach. The potential non-linear treatment effect at different levels of baseline cJADAS is considered by including the corresponding its interactions with treatment. The model fitting is evaluated using B ayes Factor (BF). Only when the model including heterogeneous treatment effect offers strong evidence (BF>3) of better model fit did we consider the HTE.

Statistical causal inference methods require no presence of unmeasured confounders. To evaluate the sensitivity of estimates of causal treatment effect to potential unmeasured confounders, analyses were repeated by including additional baseline covariates. Specifically, patient reported health related quality of life at the baseline was not included in the primary analyses due to concern over the large percentage of missing data (>50%) at baseline. The sensitivity analyses included PedsQL measures available at the baseline into the multiple imputation of the missing baseline covariates, then applied the same analyses procedures. The estimated causal treatment effects are also reported for the 6 and 12 month outcomes.

Descriptive Statistics of Study Sample

Figure 18:
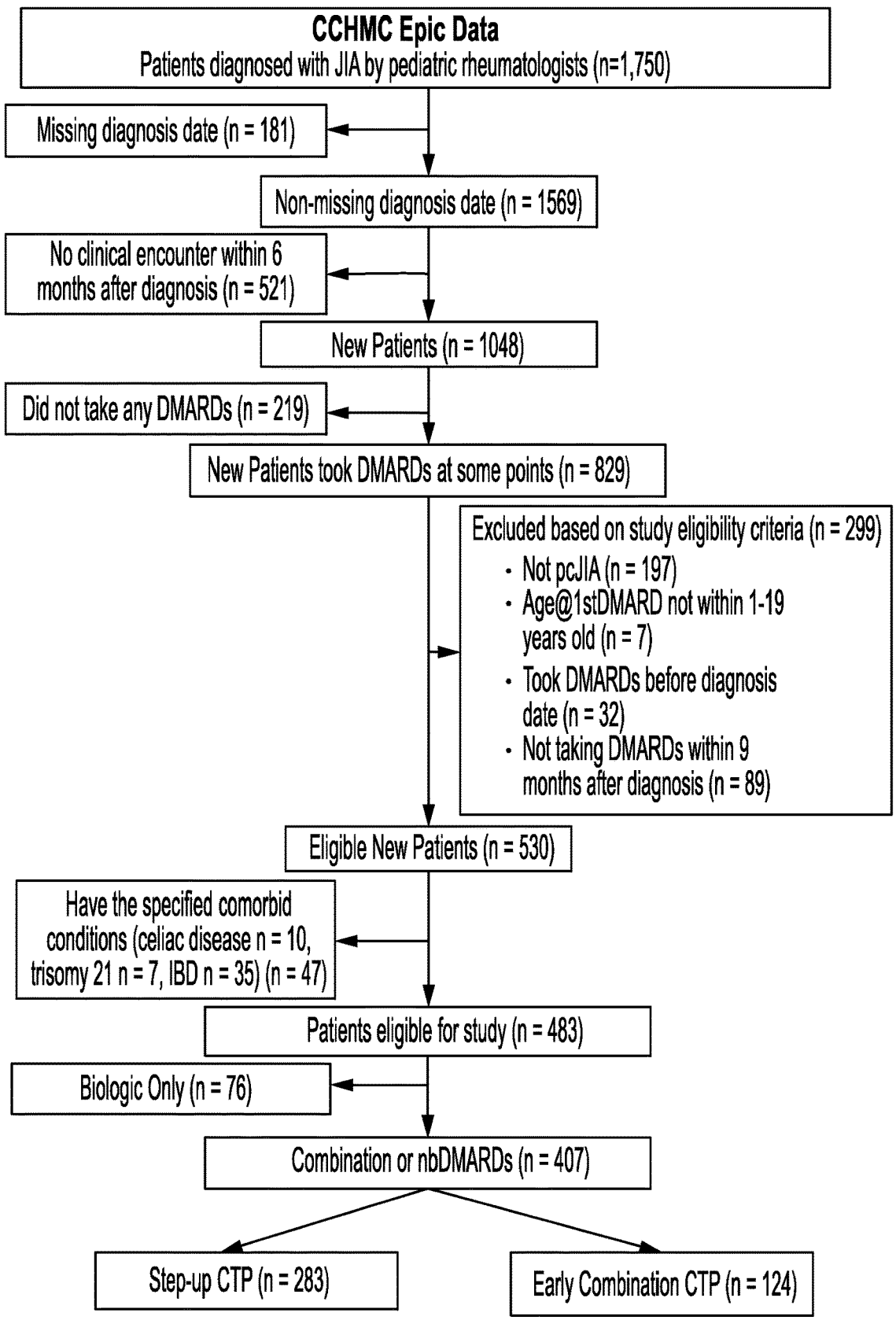
FIG. 18. Study flowchart for JIA Case Study 3: Adaptive Treatment Strategies.

Out of 1,750 JIA patients enrolled in registry and captured in the Epic electronic medical records system during the period of Jan. 1, 2008 to Dec. 31, 2017, date of diagnosis could not be found for 181 patients. Of the remaining 1,569, 1,048 (67%) patients were captured in the Epic EMR system as new patients, of whom 219 (21%) patients had not taken any DMARDs at any time. Of the 829 (79%) new patients who had taken DMARDs at some point, 197 (24%) did not meet the operational definition of pcJIA, 7 (0.8%) fell outside the inclusion criteria for age (1<age<=19) at the time of receiving the first DMARD prescription, 32 (4%) initiated DMARDs prior to diagnosis of pcJIA, and 89 (11%) initiated DMARDs later than 9 months post diagnosis. Out of 530 eligible new patients, 47 of were excluded due to comorbid conditions (IBD, celiac, and trisomy 21). 76 patients initiated on biological DMARDs monotherapy and were not considered into this analyses. A total of 407 patients received either combination or non-biological DMARDs, with 283 (70%) initiated on the non-biological DMARD monotherapy; and 124 (30%) on early combination. The study flowchart is presented in the FIG. 18.

Table 5 provides the baseline characteristics of patients by treatment group for the first line treatment. The index visit ranges from 0 to 5.9 month (median 0.3, Q1-Q3 0-1.5) after diagnosis, with mean±SD of 0.12±0.16 in the nbDMARD and 0.10±0.17 in the nb+bDMARD group (P=0.56). The treatment by indication bias is clearly evident, showing patients on early combination had significantly more active disease presentation at the index visit, with mean±SD of MD global 5.11±2.70 vs. 4.18±2.48 (Student-T P=0.0031), patient wellbeing 4.48±2.70 vs. 3.45±2.49 (Student-T P=0.0005), active joint count 12.03±12.25 vs. 7.24±8.58 (Student-T P<0.0001), and cJADAS 16.08±7.10 vs. 12.43□6.03 (Student-T P<0.0001). Patients on early combination are more likely to be RF positive (13.7% vs. 4.9%, Chi-square P=0.002), reporting more than 15 minutes morning stiffness (72% vs. 56%, Chi-square P=0.03). Also presented in the table are the follow up time points for all patients at the 6 and 12 month of visit.

TABLE 5

| Baseline Patient Characteristics by First Line Treatment | | | | | |
|---|---|---|---|---|---|
| | nbDMARD (N = 283) | | nb+bDMARD (N = 124) | | |
| Baseline Variable | N | Mean ± SD | N | Mean ± SD | P-value |
| Age (year) | 283 | 9.61 ± 5.14 | 124 | 10.19 ± 4.74 | 0.2824 |
| Age of Diagnosis (year) | 283 | 9.49 ± 5.16 | 124 | 10.09 ± 4.78 | 0.2726 |
| Onset Age (year) | 234 | 8.17 ± 4.93 | 101 | 8.69 ± 5.07 | 0.3782 |
| Disease Duration at Diagnosis (year) | 235 | 1.41 ± 2.30 | 100 | 1.76 ± 3.08 | 0.2629 |
| Time Since Diagnosis (year) | 283 | 0.12 ± 0.16 | 124 | 0.10 ± 0.17 | 0.5601 |
| Six month Visit (in year after Baseline) | 266 | 0.50 ± 0.06 | 117 | 0.49 ± 0.06 | 0.2524 |
| Twelve month Visit (in year after Baseline) | 245 | 1.00 ± 0.06 | 110 | 0.99 ± 0.07 | 0.1988 |

TABLE 5-continued

Baseline Patient Characteristics by First Line Treatment

| Baseline Variable | nbDMARD (N = 283) | | nb+bDMARD (N = 124) | | P-value |
|---|---|---|---|---|---|
| | N | Mean ± SD | N | Mean ± SD | |
| CJADAS10** (0-30) | 194 | 12.43 ± 6.03 | 91 | 16.08 ± 7.10 | <.0001 |
| Active Joint Count** (0-71) | 259 | 7.24 ± 8.58 | 116 | 12.03 ± 12.25 | <.0001 |
| Well Being** (0-10) | 250 | 3.45 ± 2.49 | 111 | 4.48 ± 2.70 | 0.0005 |
| MD Global** (0-10) | 213 | 4.18 ± 2.48 | 98 | 5.11 ± 2.70 | 0.0031 |
| Limited Range of Motion** (0-71) | 259 | 5.38 ± 6.90 | 116 | 9.67 ± 11.69 | <.0001 |
| Erythrocyte Sedimentation Rate (mm/hr)** | 151 | 20.58 ± 20.46 | 76 | 30.45 ± 28.30 | 0.0030 |
| Global Pain VAS** (0-10) | 254 | 4.16 ± 2.72 | 113 | 5.00 ± 2.72 | 0.0071 |
| | N | Row % | N | Row % | |
| Female | 204 | 72.1 | 91 | 73.4 | 0.7866 |
| Race | | | | | 0.8600 |
| White or Caucasian | 250 | 88.3 | 109 | 87.9 | |
| Black or African American | 17 | 6.0 | 8 | 6.5 | |
| Other | 11 | 3.9 | 6 | 4.8 | |
| Unknown | 5 | 1.8 | 1 | 0.8 | |
| JIA Subtype+ | | | | | 0.0513 |
| Poly RF− | 99 | 35.0 | 56 | 45.2 | |
| Poly RF+ | 21 | 7.4 | 14 | 11.3 | |
| Oligo | 90 | 31.8 | 26 | 21.0 | |
| Other | 73 | 25.8 | 28 | 22.6 | |
| Insurance-Private | 186 | 67.1 | 84 | 67.7 | 0.4550 |
| Rheumatoid Factor-Positive** | 14 | 4.9 | 17 | 13.7 | 0.0022 |
| Antinuclear Antibodies-Positive | 22 | 7.8 | 16 | 12.9 | 0.1016 |
| Elevated C-reactive Protein** | 35 | 23.8 | 34 | 43.0 | 0.0028 |
| HLA-B27-Present+ | 10 | 3.5 | 10 | 8.1 | 0.0516 |
| Morning Stiffness* | | | | | 0.0262 |
| None | 51 | 27.1 | 15 | 16.0 | |
| 15 Minutes | 32 | 17.0 | 11 | 11.7 | |
| >15 Minutes | 105 | 55.9 | 68 | 72.3 | |
| Uveitis Ever | 10 | 6.6 | 4 | 6.5 | 0.9727 |
| Previous Treatment with NSAID** | 221 | 78.1 | 75 | 60.5 | 0.0002 |
| Previous Treatment with Prednisone | 18 | 6.4 | 13 | 10.5 | 0.1489 |

Note:
**indicating P value <.01;
*indication P value <.05.
+indicating P value <.10.

Descriptive of Treatment Patterns

Of the 283 patients initiated on the nbDMARDs, majority (N=271, 95%) were prescribed on methotrexate. Nine patients had not yet had their 3 month follow up visit. Of the remaining 274 patients, 252 (92%) remained on the same prescription assignment, 21 (7.7%) were taken off of DMARDs, and only 1 patient changed the DMARD prescription from MTX to Sulfasaline. At 6 months, an additional 8 patients had not yet had their 6 month follow up. Of the remaining 266 patients, 86 (32%) stepped-up in the sense that they changed their initial nbDMARD prescription or added bDMARDs. The majority 160 (60%) stayed on the same initial prescription; and 10 (3.7%) patients were taken off DMARDS.

Of the 124 patients initiated on b+nbDMARDs, 75 (61%) are prescribed a MTX and Etenercept combination, and 32 (26%) were prescribed on the MTX and adalimumab combination. Only 1 patient had not yet been followed up with at 3 months. Of the remaining 123 patients, at the 3 month follow up visit, nearly all patients (103, 84%) stayed on the same prescription from the baseline. At six months, an additional 6 patients had not yet had their 6 month followup. Of the remaining 117 patients, a majority (91, 78%) continued on the same initial prescription, 11(9.4%) and 15(12.8%) patients either adjusted up (changed or added a new medication) or adjusted down (dropped previous mediation).

Given these treatment patterns, the baseline medication was allocated as the first line treatment, and the medication at the 6 month follow up was allocated as the $2^{nd}$ line treatment.

Descriptive of Outcome Measures

Figure 19B:
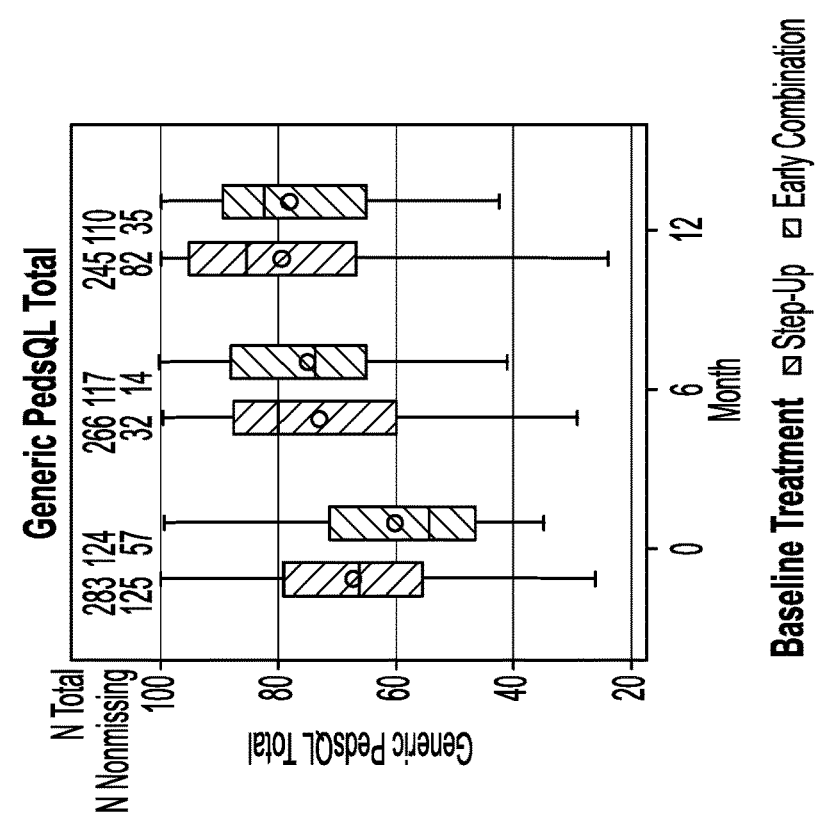
FIG. 19A-B. Box-whisker plot of cJADAS sore (A) and PedsQL (B) by study arm in JIA Case Study 3.
Figure 19A:
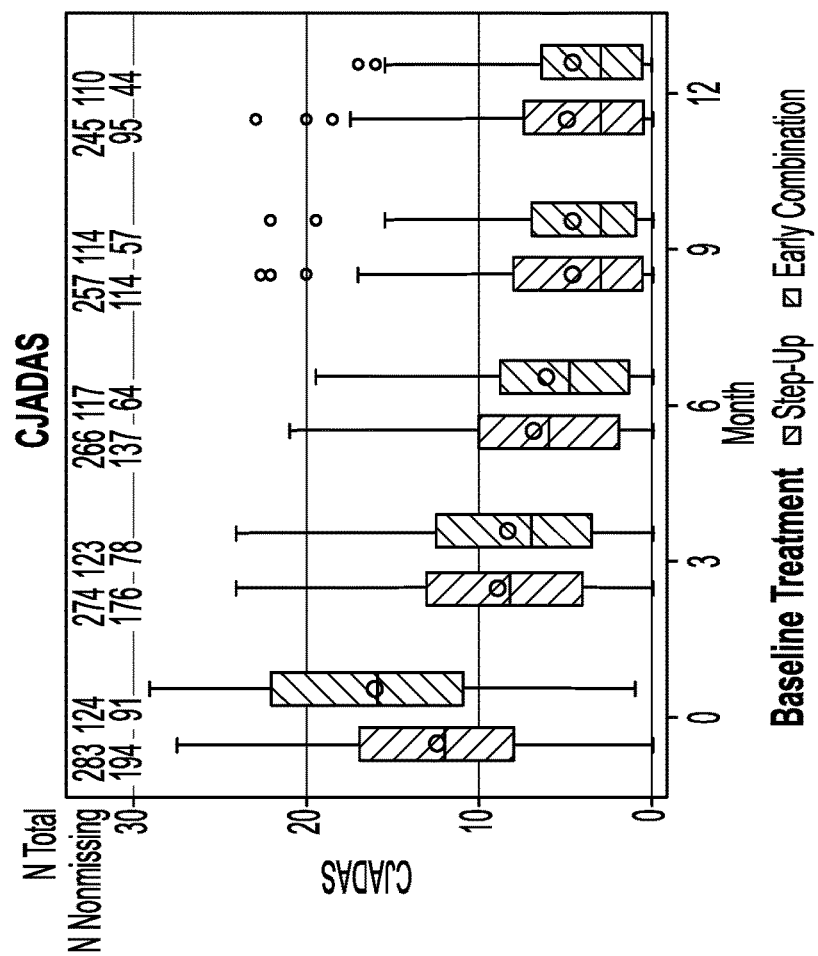
Figure 20A:
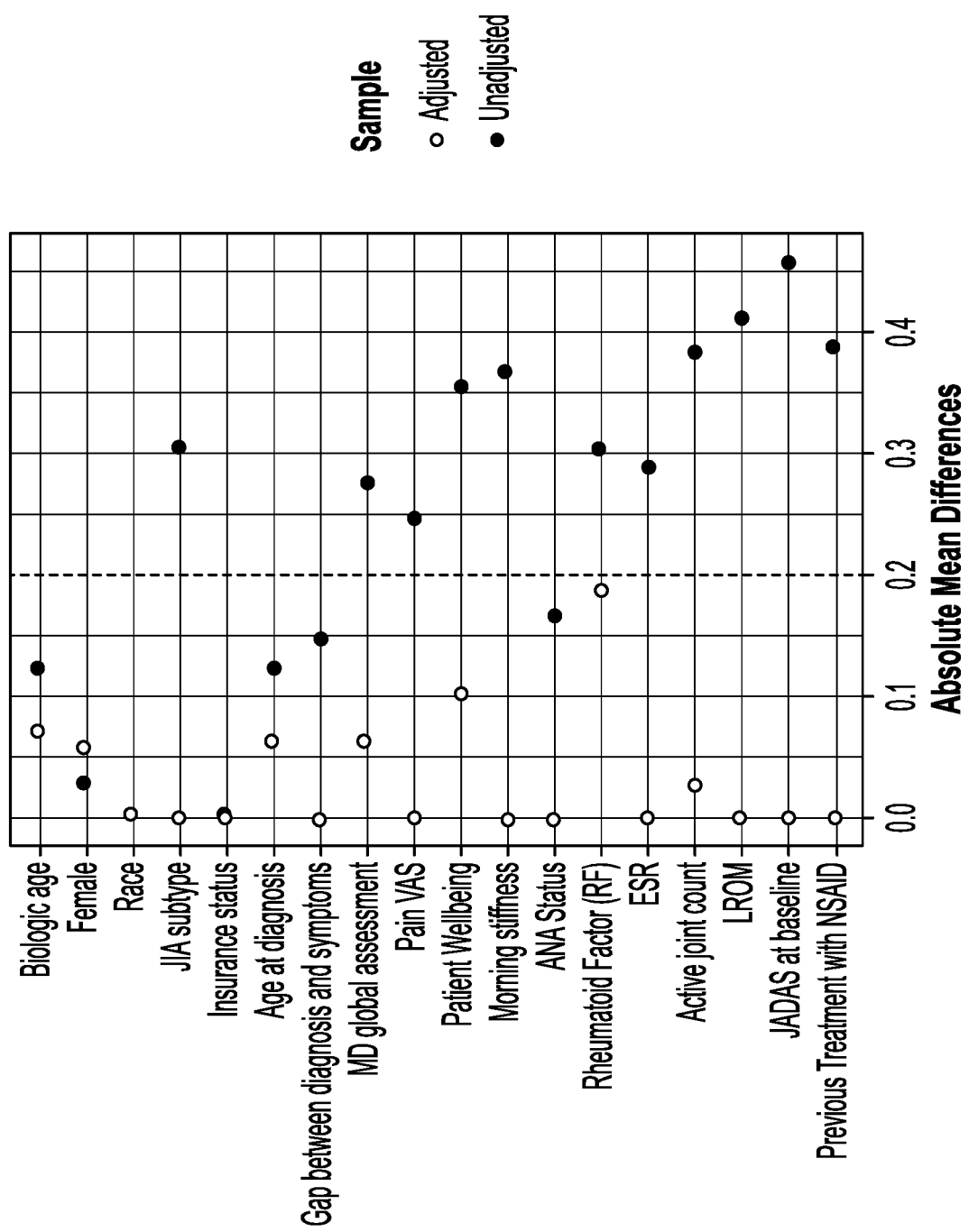
FIG. 20A-E. Balance check of the propensity scores for each of the five sets of imputed data used to fill in missing values in the dataset (multiple imputation technique).
Figure 20B:
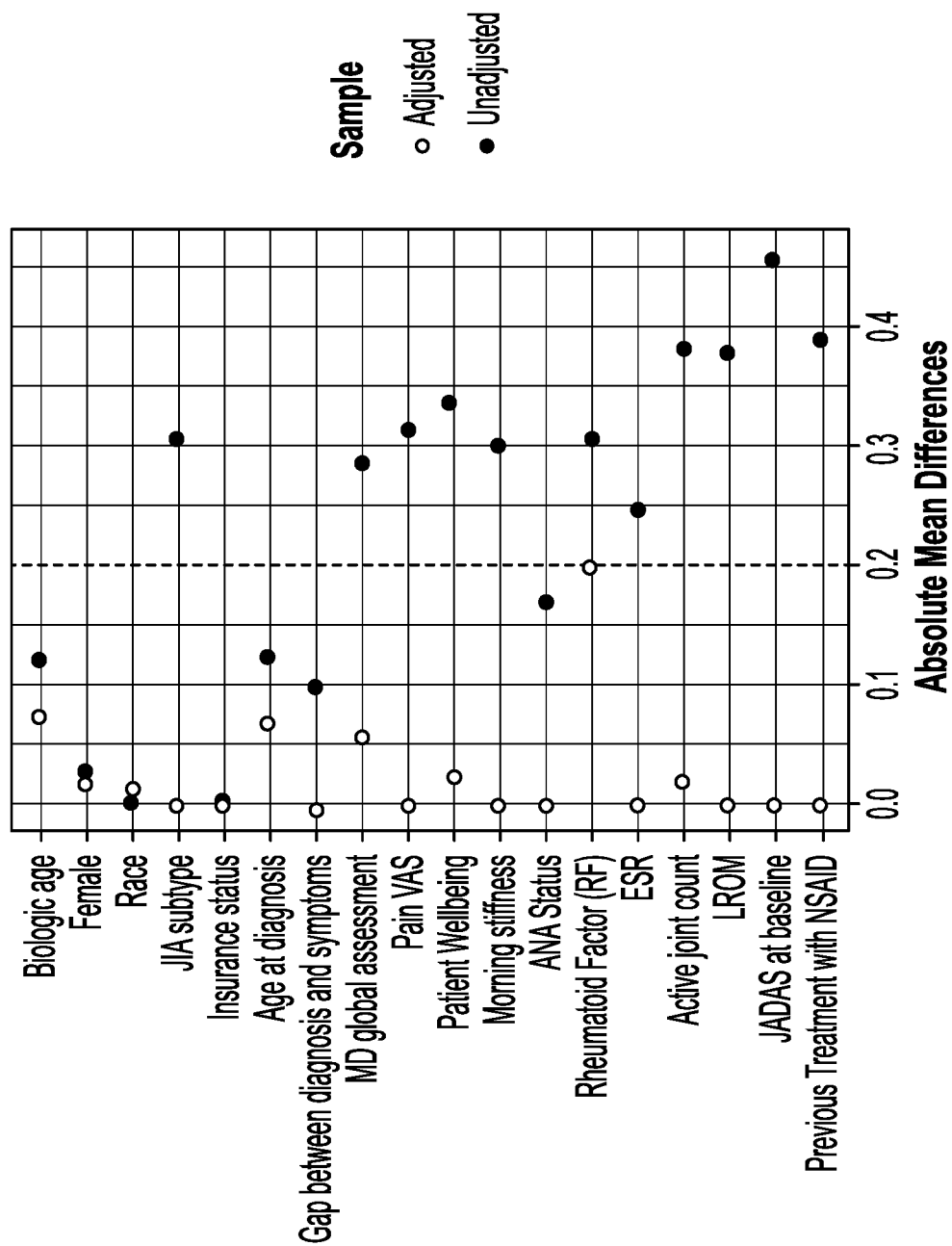
Figure 20C:
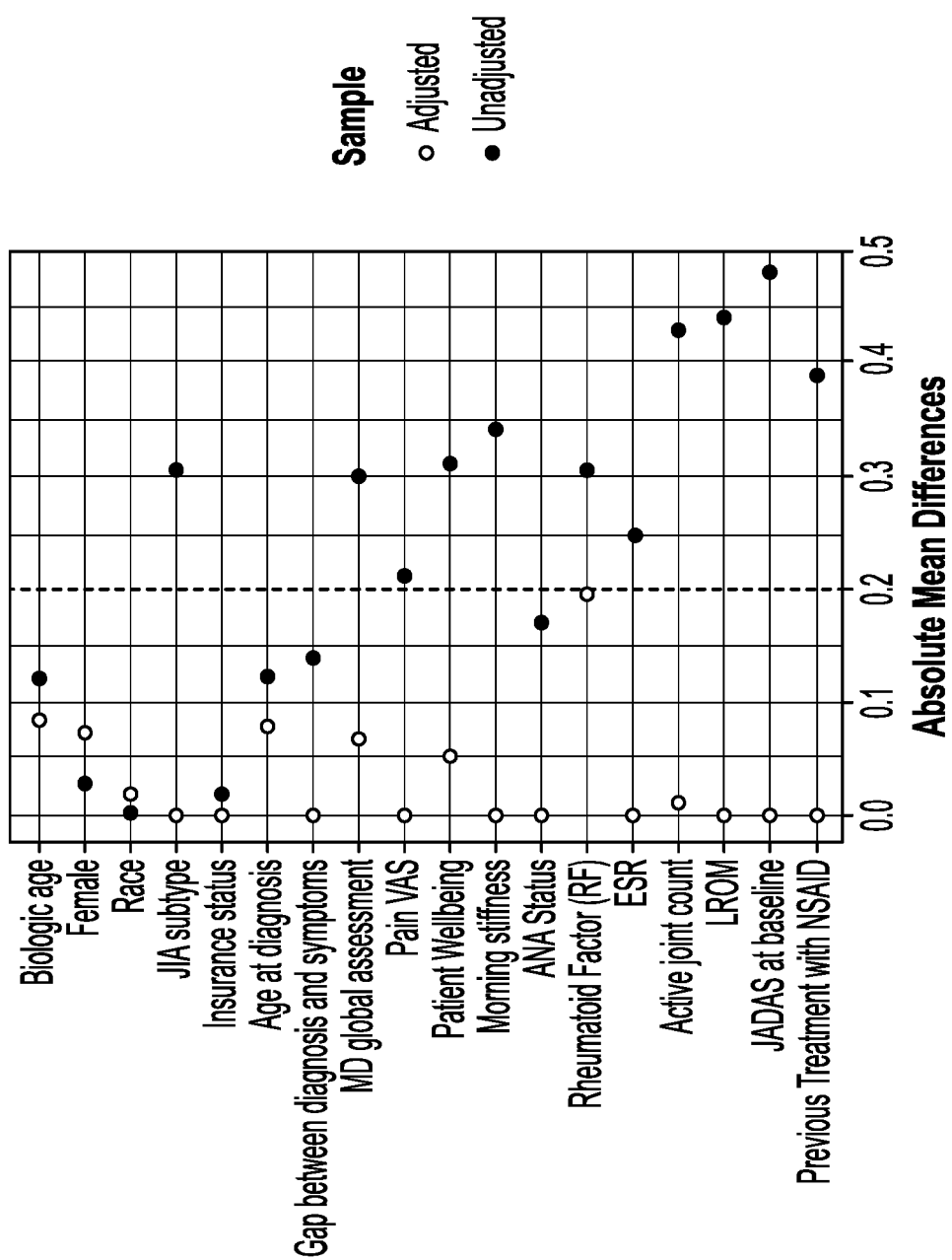
Figure 20D:
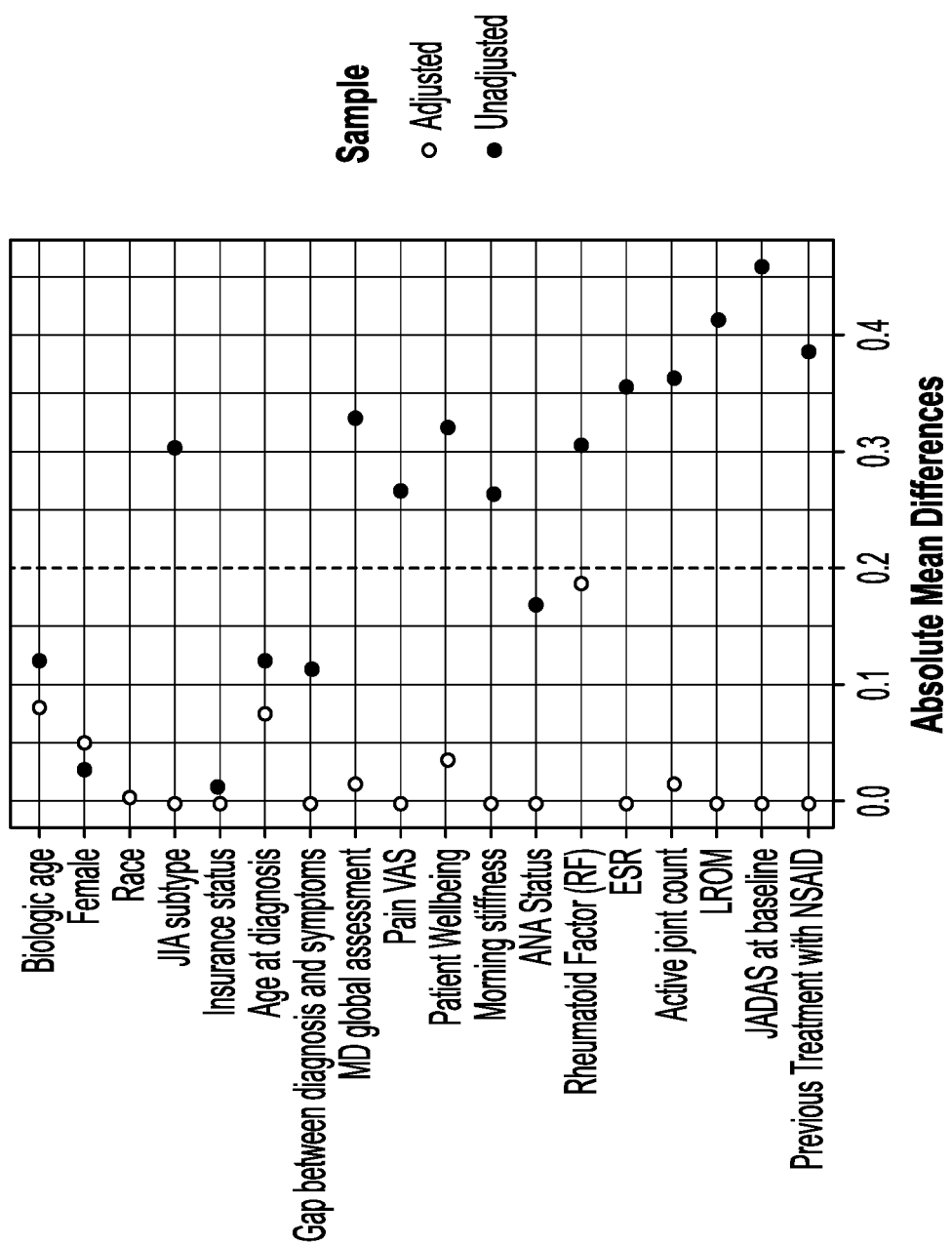
Figure 20E:
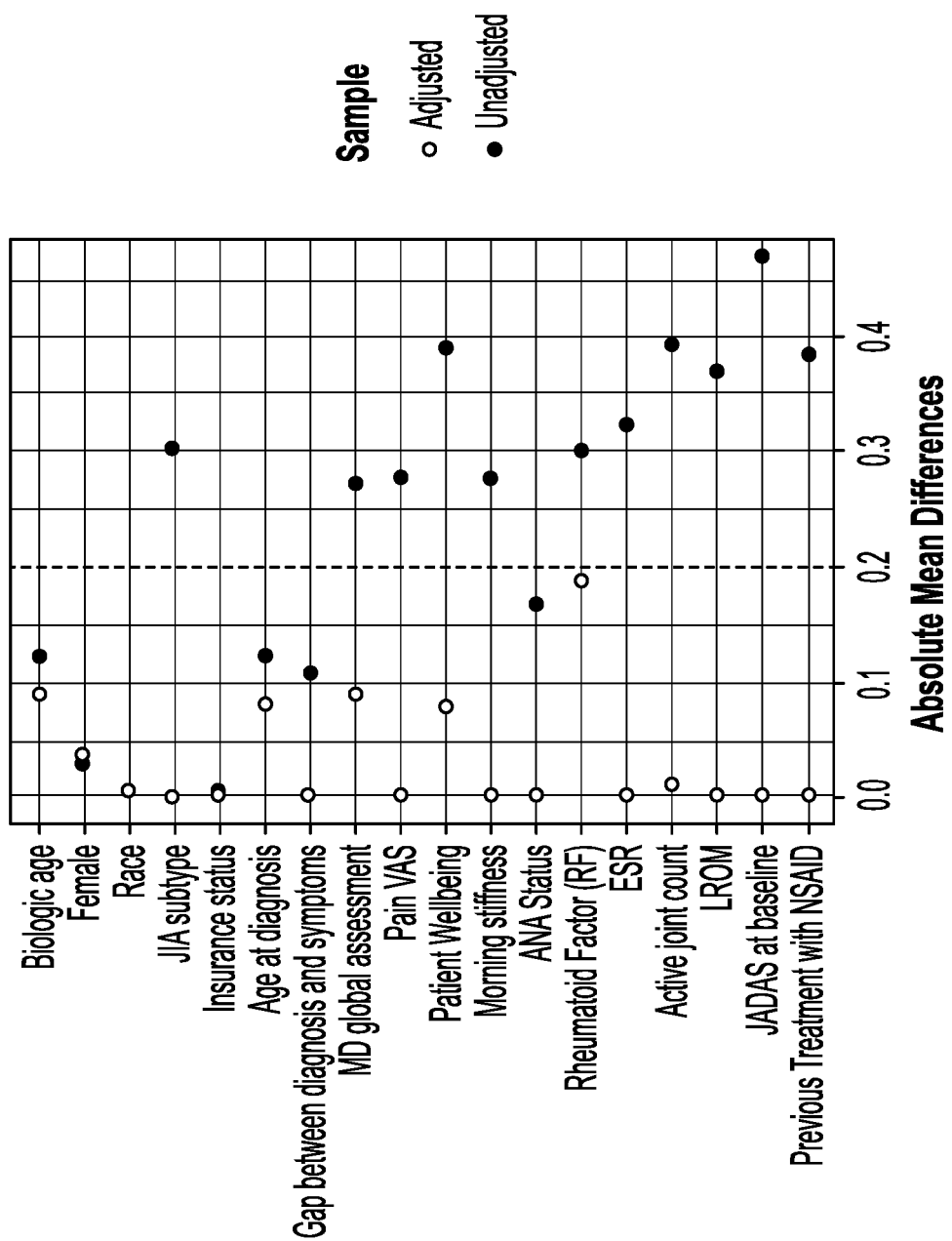

FIG. 19A-B shows the box-whisker plot of cJADAS score (A) and PedsQL generic total score (B) by study arm. The figure shows that disease activity and patient quality of life improved in both arms. Although patients prescribed the early combination presented with much more severe disease activities at baseline, they were no longer statistically different at the 6 and 12 month time points. The median (25%-tile, 75%-tile) of cJADAS scores in patients initiated on the early combination and step-up treatments were: 16.0 (11.0, 22.0) vs. 12.0 (8.0, 17.0) (KW rank-sum test P<0.0001) at the baseline; 4.75 (1.5, 8.75) vs. 6.0 (1.0, 10.0) (KW rank-sum test P=0.29) at 6 month; and 3.0 (0.5, 6.5) vs. 3.0 (0.5, 7.5) (KW rank-sum test P=0.87) at 12 month. Due to missing data, only 194, 137 and 95 of step-up patients and 91, 64 and 44 of early combination patients have non-missing cJADAS score at the baseline, 6 and 12 months respectively. Similarly, patients prescribed the early combination presented much worse quality of life at baseline compared to the nbDMARD patients, but they exhibited similar distributions at the 6 and 12 month follow ups. The median (25%-tile, 75%-tile) of PedsQL generic scores in patients initiated on the early combination and step-up treatment were: 54.3 (46.7, 71.3) vs. 66.3 (55.4, 79.3) (KW rank-sum test P=0.005) at the baseline; 73.9 (65.2, 88.0) vs. 80.0 (60.3, 87.5) (KW rank-sum test P=0.97) at 6 month; and 82.6 (65.2, 89.1) vs. 85.8 (66.7, 95.) (KW rank-sum test P=0.39) at 12 month. Only 46 (32 in step-up, 14 in early combination) and 117 (82 in step-up, 35 in early combination) patients had at PedsQL score at 6 and 12 month respectively.

Missing Data Imputation

The distributions (kernel fit to continues and bar plot of the categorical variables) of five imputed datasets using HCMM_LD overlaid with the observed data before imputation exhibited nearly identical distributions before and after imputation.

Propensity Score Estimation and Balance Checking

The propensity scores were derived using the CBPS method applied to the pre-determined important baseline confounders, for each simulated dataset. The CBPS are able to achieve desired covariate balance within the 0.2 absolute standardized mean difference, and comparable distributions in all pre-defined important confounders for each of the five imputed datasets (FIG. 20A-E).

The propensity score methods were used for estimating the effectiveness of the $1^{st}$ line treatment approach in children newly diagnosed with pcJIA, for each one of the five simulated datasets. The CER results from PS methods are summarized over all five simulation sets, which are reported in the sections below.

Comparative Effectiveness of the Primary Endpoint

After 6 months of treatment, compared to the step-up treatment plan, patients initiated on early combination are expected to gain more reduction in disease activity (see Table 6). The GPMatch result suggested both CTP are effective in improving data activities, predicting 6.7±0.48 and 4.7±0.66 expected mean cJADAS score by 6 months if treated on the step-up and early combination respectively. Early combination CTP led to a significant −1.98 more reduction in cJADAS with 95% CI estimate of (−3.55, −0.40).

TABLE 6

Average Treatment Effect of Early Combination vs. Step-up CTP on cJADAS at 6 Months

|  | Est | SD | 95% LL | 95% UL |
| --- | --- | --- | --- | --- |
| Direct Modeling | −1.472 | 0.685 | −2.815 | −0.129 |
| Regression by PS quintile stratification | −1.450 | 0.771 | −2.961 | 0.060 |
| Regression with PS | −1.573 | 0.716 | −2.976 | −0.171 |
| Regression Adjustment with spline fit PS | −1.642 | 0.720 | −3.052 | −0.232 |
| PS weighted regression | −1.760 | 0.504 | −2.749 | −0.771 |
| AIPTW | −1.379 | 1.199 | −3.730 | 0.972 |
| Propensity score quintile sub classification | −1.331 | 0.712 | −2.726 | 0.065 |
| IPTW | −1.299 | 0.658 | −2.589 | −0.009 |
| BART | −0.990 | 0.856 | −2.668 | 0.688 |
| GPMatch | −1.975 | 0.805 | −3.552 | −0.398 |

Note:
Negative estimate indicating early aggressive treatment result in lower cJADAS score The propensity score methods, including PS quantile matching IPTW and AIPTW method led to similar but statistically non-significant results. Regression with PS adjustment, linear and spline fit of PS, AIPTW methods reported approximate −1.5 points statistically significant improvements in cJADAS. Interestingly, the BART method gave results showing the lowest effect size −0.70 (95% CI−2.67, 0.69). The potential heterogeneous treatment effect was considered in the BART and GPMatch models by including potential treatment by JIA subtype and baseline JADAS score interactions. The Bayesian factor (BF) of 1.04, suggests no strong evidence to support subgroup treatment effect by baseline cJADAS score.

Figure 22:
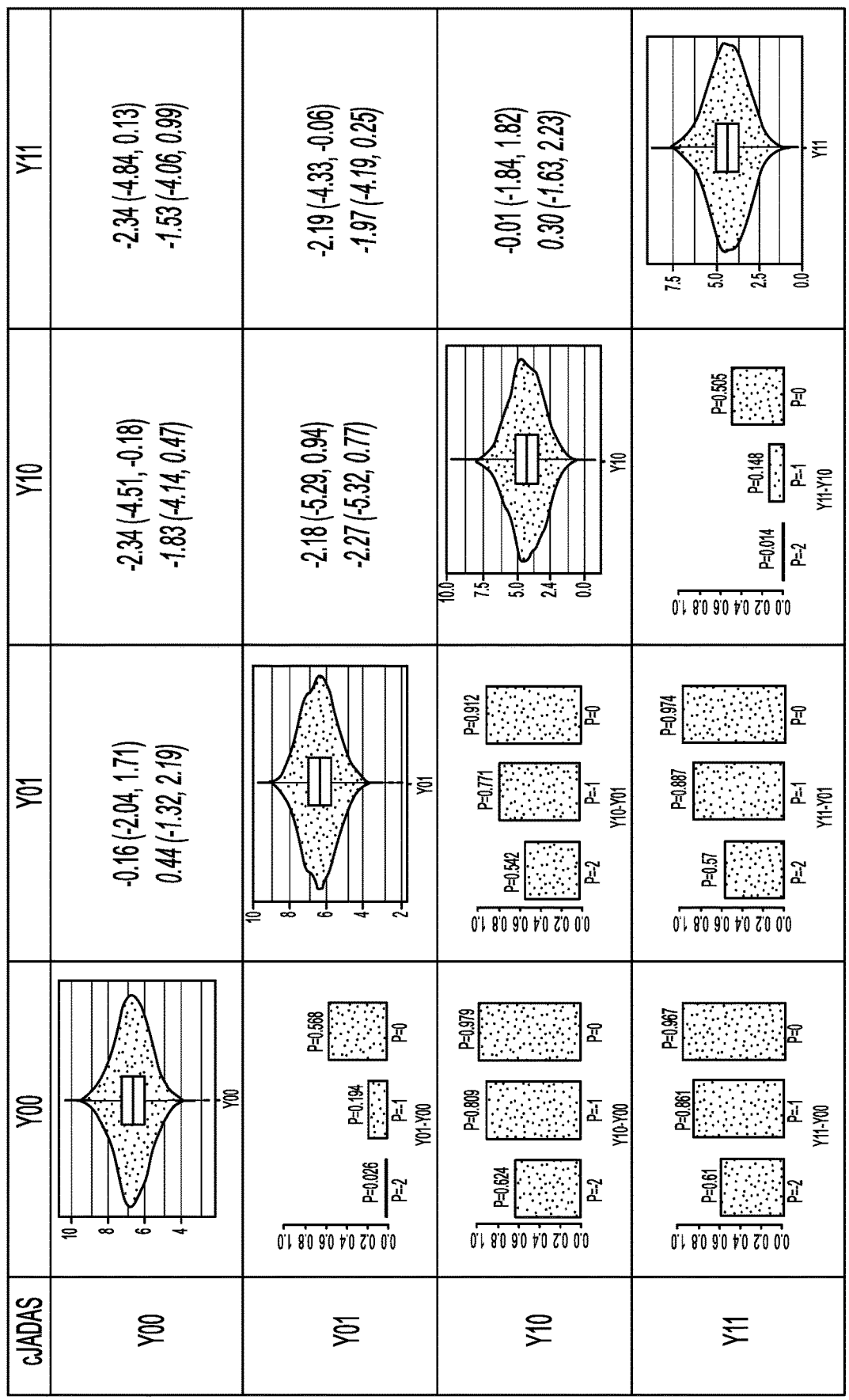
FIG. 22. GPMatch and BART comparative effectiveness first and second line treatment among the non-responders. Negative treatment effect indicating the column potential outcome is better than the row potential outcome in reducing cJADAS value. Results of two-staged BART are reported in gray fonts. All other reported estimates are due to the GPMatch method.

Depending on disease progression at the end of first line treatment, medication is adjusted and the cJADAS outcome was measured at the end of the second line treatment. For patients initiated on nbDMARD, since the initial nbDMARD medication may be escalated by changing to a different nbDMARD or adding bDMARD medication, we label their treatment by (01); alternatively such patients may remain on the same prescription or be removed from DMARD, in which case their treatment was denoted by (00). For the early combination patient, patients may remain on the same aggressive treatment, remain on the combination or change one of either bDMARD or nbDMARD prescription, denoted by (11); or they may be removed from bDMARD and/or nbDMARD (10). The GPMatch method estimates the posterior distribution of cJADAS outcome, had the patient gone through each one of the four possible two-staged adaptive treatments, for each patient. The predicted mean±SD potential outcomes are: Y00=4.6±0.77, Y01=4.9±0.79, Y10=2.1±1.11, & Y11=2.7±0.93. On the diagonal of the FIG. 21A-B, the violin plots of the estimated potential outcomes are presented under each of the four possible $1^{st}$ and $2^{nd}$ line treatment courses. The upper triangle of FIG. 21 and FIG. 22 presents the mean (95% CL) of the averaged treatment effect contrasted between each pair of the potential outcomes. The lower triangle presents the probability of achieving at least 0, 1 and 2 points improvement contrasting the two alternative potential outcomes. The averaged treatment effects were also calculated using the extended two-staged BART and are presented in the upper triangle of FIG. 21 and FIG. 22 in gray fonts. The results are summarized over all subtypes of pcJIA. No heterogeneous treatment effect was identified for any subtypes of pcJIA. The results are further estimated in the subset of patients who are considered non-responders to the $1^{st}$ line treatment as determined by MD global assess >2 after six months of treatment (see FIG. 22).

Sensitivity Analyses

A major concern with causal inference is the possibility of unmeasured confounders. In the present case study, we assumed that important factors were considered in the physician's medication prescription decision and therefore are fully captured in the EMR data. While this may be a reasonable assumption, patient specific determinants may also confound the medication prescription decision. To take into account potential unmeasured confounders due to patient's quality of life, we conducted sensitivity analyses by including PedsQL, both generic and rheumatology disease specific modules, into the analyses.

Figure 23:
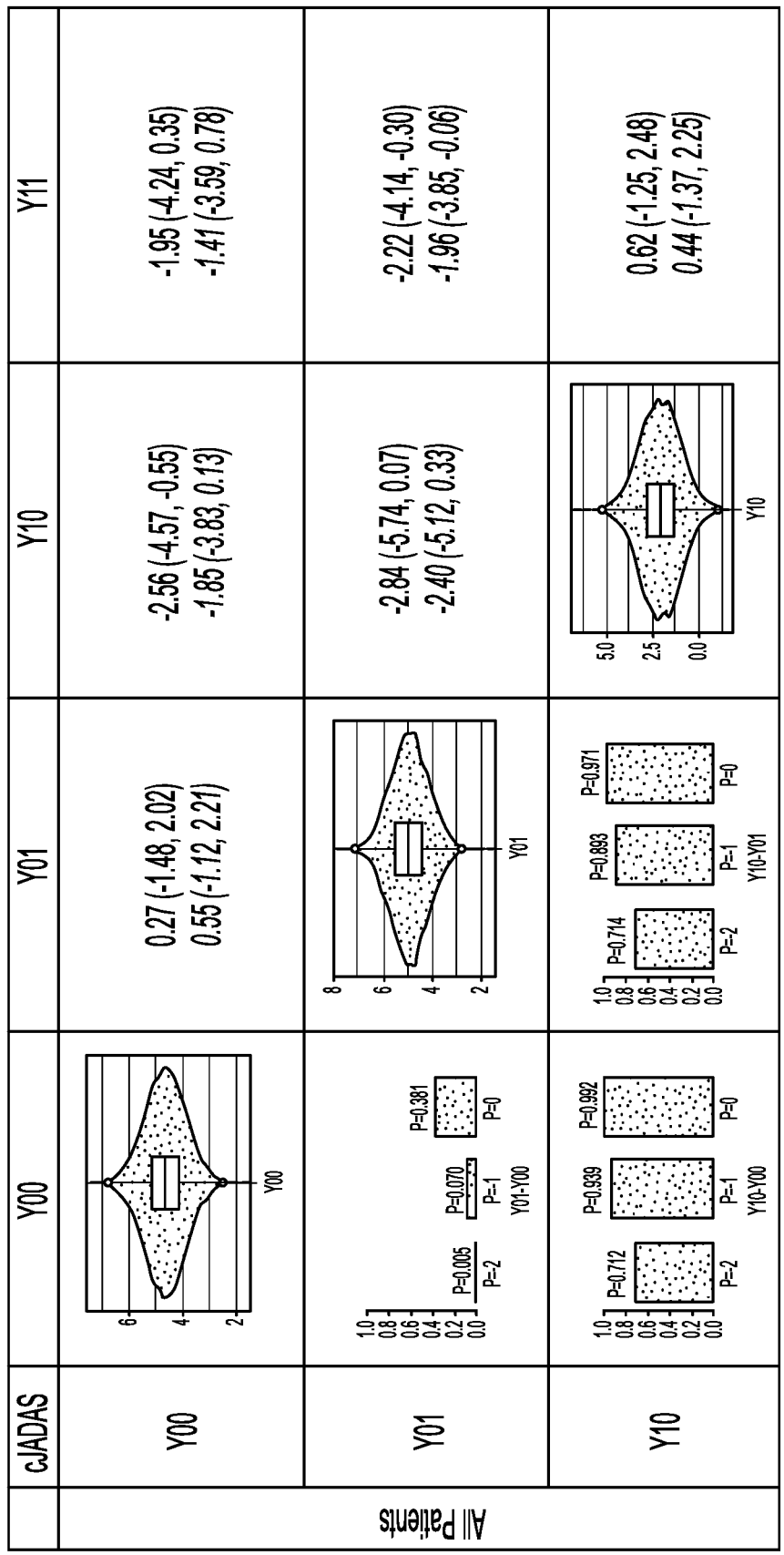
FIG. 23. Sensitivity analyses of GPMatch and BART comparative effectiveness results. Negative treatment effect indicating the column potential outcome is better than the row potential outcome in reducing cJADAS value. Results of two-staged BART are reported in gray fonts. All other reported estimates are due to the GPMatch method.

The PedsQL forms are filled out by patients on an annual basis for generic score and semi-annually for the Rheumatology module. As a result, a missing PedsQL measure could be an issue. Less than half (182, 45%) of patients had completed a PedsQL form at baseline. Therefore, the sensitivity analyses first imputed missing PedsQL scores at baseline, using all available demographic, clinical and patient reported measures at the baseline. Then, analyses were repeated. The comparative effectiveness results were nearly identical to primary analyses (see FIG. 23).

Comparative Effectiveness of the Secondary Endpoint

There were 182 patients who had PedsQL scores at the baseline, 46 and 117 patients at the 6 and 12 month follow-up. Since patients were asked to complete PedsQL generic module on an annual basis for generic module, only 9 patients had both baseline and six month scores. Given the large number of missingdata, comparative effectiveness analyses could only be performed for the 12 month PedsQL outcome on $1^{st}$ line of treatment. The GPMatch result suggested both CTP were effective in improving PedsQL score, reporting 74.8±2.0 and 80.4±3.7 by 12 months if treated on the step-up and early combination respectively. The results of averaged treatment effect comparing the early combination vs. step-up CTP are reported in Table 7 below are summarized over the five simulated datasets. The estimated treatment effect size ranges from 1.8 to 7.7 points improvement in PedsQL generic scores, but with small sample size, none of the estimate are statistically significant.

TABLE 7

Averaged Treatment Effectiveness of Early Combination vs. Step-up CTP

| | PedsQL Generic Total Score at 12 month | | | |
|---|---|---|---|---|
| | Est | SD | 95% LL | 95% UL |
| Direct Modeling | 3.530 | 3.643 | −3.611 | 10.670 |
| Regression by PS stratification | 1.979 | 4.595 | −7.030 | 10.988 |
| Regression with PS | 4.021 | 3.729 | −3.287 | 11.329 |
| Regression Adjustment with spline fit PS | 3.382 | 3.761 | −3.989 | 10.754 |
| PS weighted regression | 1.764 | 2.436 | −3.011 | 6.540 |
| AIPTW | 4.171 | 3.145 | −1.994 | 10.336 |
| Propensity score based stratification method | 2.289 | 4.374 | −6.286 | 10.864 |
| IPTW | 7.670 | 5.650 | −3.409 | 18.749 |
| BART | 3.822 | 3.645 | −3.323 | 10.968 |
| GPMatch | 5.612 | 4.849 | −3.892 | 15.117 |

To facilitate interpretation of the study results, we conducted additional analyses evaluating the improvement needed for achieving a minimum clinically important difference (MCID) in PedsQL. Previous studies have established the MCID of 4.4 in PedsQL generic score. We evaluated MCID in cJADAS scores utilizing all existing data on cJADAS and PedsQL measures. The results indicate a linear relationship between the cJADAS and PedQL generic total scores. For every one unit decrease in cJADAS, we expect to see 0.99 increase in PedsQL generic score. Therefore, to achieve a MCID of 4.4 point increase in PedsQL, the treatment must achieve a 4.5 point decrease in cJADAS.

Key Results

In this study, we evaluated the comparative effectiveness of the early combination treatment plan in children with newly diagnosed pcJIA, compared to the more conventional approach of step-up plan, on the clinical and quality of life outcomes at the 6 and 12 months of treatment. To the best of our knowledge, this is the first study that applies causal inference methods to evaluate comparative effectiveness of early combination vs. step-up CTP using EMR data.

The results suggest both CTP are effective in improving disease activities, reporting expected mean cJADAS score of 6.7 and 4.7 by 6 months and 4.8 and 2.4 by 12 months if treated on the step-up and early combination respectively. Early combination treatment on average produce a significant 2 points more reduction with averaged treatment effect of −1.98, 95% CL of (−3.55, −0.40) in cJADAS score by 6 months, which sustained up to 12 months. Due to the limited data available for the PedsQL generic scores recorded in the Epic database, the averaged treatment effect of 5.6 is associated with large variance, with 95% CL of (−3.9, 15.1). The study estimated expected potential outcomes of 74.8 and 80.4 by the end of 12 months, if treated on the step-up and early combination respectively.

We also estimated MCID of 4.5 points decrease in cJADAS is required for meaningful improvement in PedsQL. Taking it together with the estimated potential outcomes and the averaged treatment effect, these results suggest both early combination and step-up CTP achieve meaningful improvement by 6 months of treatment, with early combination achieving statistically significantly more improvement compared to the step-up treatment.

The study was carefully designed to emulate a randomized trial following CTP. The TREAT study is the only randomized trial evaluating early aggressive treatment vs. step-up approach, and that study found that early aggressive treatment worked better than the step-up treatment in reducing disease activities. There are some differences in study design worth noting comparing to the TREAT study. Here, we imposed a stronger requirement on the new patient definition. Only patients diagnosed with JIA for <=6 month were considered as new patients in the present study. In contrast, the TREAT study included patients within 12 months of diagnosis. Following the CTP, we excluded patients with the comorbid conditions of IBD, celiac, and trisomy 21. In contrast, the TREAT study only excluded patients with uveitis. In addition, TREAT allowed patients to be treated with methotrexate before enrollment, while we required participants be naïve to DMARDs before the baseline. Despite these differences, both studies were consistent in confirming the clinical effectiveness of the early combination treatment.

Different causal inference methods may report somewhat different effect sizes and with different levels of accuracy. Here we conducted extensive studies comparing different methods under the most realistic settings, that is when neither of the propensity score or the outcome modeling are correctly specified. Our investigations confirm the concerns raised by others over some widely used causal inference methods under dual miss-specified model. In addition, we show that GPMatch demonstrates superior performance compared to the most widely used methods.

Missing data remains an important challenge. Here, we took multiple missing data imputation approaches for missing baseline covariates, under the assumption of missing at random. The assumption is reasonable as the missing baseline covariates are most likely due to reasons that are unrelated to the patients' outcomes. The missing outcome, however, is likely related to the patients' disease activities/progression. It is possible that patients who are unsatisfied with their disease activity/progression are more likely to come back to see the doctor; while those who are making good progress may not come back as frequently. Thus, the timing of follow up visits and missing responses at six month is likely related to the treatment and the outcomes. For dealing with this issue, the GPMatch model and other regression type models included the time of follow up in the analyses. Conditional on the baseline covariates and the treatment assignment, the modeling approach acknowledged that the patients' responses will vary over the time of treatment. The missing responses at the six month follow-up were modeled based on the functional relationship between the time of treatment and the responses utilizing the data obtained from patients with the six month follow-up data. In contrast, the AIPTW and PS sub classification approaches did not consider modeling treatment effect as a function of time, which may have contributed to the lower treatment effects estimated by those methods. We took the Bayesian HCMM-LD approach for multiple imputation of the missing baseline covariates, for preserving the joint distributions among all covariates. As a sensitivity analyses, MICE is also used, and the results are nearly identical.

The cJADAS is a bounded summary score. The BART method does not account for this, and for that reason may under estimate the treatment effect. In addition, BART considers outcome modeling only. It does not include regularization or prior knowledge to account for the treatment by indication selection bias. Therefore, it is vulnerable to model misspecification, and suffers when there is a lack of overlapping in covariate space, which may also contribute to the different results obtained with BART. GPMatch and other regression type approaches consider the bounded outcome by Tobit regression. In addition to specifically addressing baseline confounding by formulating GP prior as a matching tool, GPMatch is able to address lack of overlapping in covariate space by down weighting those data points presenting little or no similarity. For the CER of adaptive 2-staged CTP, BART and GPMatch reported similar results, with BART showing somewhat weaker estimate of effect sizes and bigger variance estimates.

EQUIVALENTS

Those skilled in the art will recognize or be able to ascertain using no more than routine experimentation, many equivalents to the specific embodiments of the invention described herein. Such equivalents are intended to be encompassed by the following claims.

All references cited herein are incorporated herein by reference in their entirety and for all purposes to the same extent as if each individual publication or patent or patent application was specifically and individually indicated to be incorporated by reference in its entirety for all purposes.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims.

What is claimed is:

1. A method for treating juvenile idiopathic arthritis (JIA) in a subject in need thereof, the method comprising
   implementing a Bayesian nonparametric causal inference method for determining the more effective treatment among two alternative JIA treatments administered to a plurality of JIA patients by a non-transitory machine readable storage medium storing at least one program that when executed by at least one processor, causes the at least one processor to implement the Bayesian nonparametric causal inference method, the method comprising generating a marginal structural model and performing a single step of Bayesian regression on patient data of the plurality of patients, wherein the method incorporates matching, weighting, and estimation processes into the single regression step and wherein the matching process is performed using a Gaussian process ("GP") prior covariance function; and
   administering to the subject the JIA treatment determined by the Bayesian nonparametric causal inference method to be more effective, wherein the JIA treatment is either a combination of biologic disease modifying antirheumatic drugs (bDMARDs) and conventional synthetic disease modifying antirheumatic drugs (csDMARDs) or csDMARDs alone, without administration of bDMARDs, wherein the csDMARDs comprise methotrexate and the bDMARDs comprise adalimumab or etanercept.

2. The method of claim 1, wherein the matching process is performed in the absence of a known matching structure.

3. The method of claim 2, wherein the GP prior covariance function is a squared exponential ("SE") function.

4. The method of claim 3, wherein potential outcomes are modeled nonparametrically and missing potential outcomes are estimated by a weighted sum of observed data.

5. The method of claim 4, wherein the method comprises generating a model by initializing a treatment effect parameter and a GP covariance matrix in which, for each individual patient (i-th) in the patient data, the GP prior allocates different weights to information obtained from other individual (j-th) patients, based on confounding variables specified in GP prior.

6. The method of claim 4, further comprising fitting the model using Bayesian Markov chain Monte Carlo (MCMC) sampling of posterior distributions.

7. The method of claim 4, further comprising performing the matching process by determining for each patient in the plurality a similarity to every other patient in the plurality and assigning a matching weight to each patient.

8. The method of claim 7, wherein the matching process comprises calculating weighted average covariates after weighting and before weighting and determining a balance for all covariates across their distributions by treatment group.

9. The method of claim 7, wherein the balance is determined by the mean absolute difference and median absolute deviance.

10. The method of claim 7, wherein if the covariates are unbalanced, repeating the step of fitting the model using Bayesian MCMC, thereby generating a weighted sum of observed data.

11. The method of claim 4, wherein the weighted sum of the observed data is used to estimate missing potential outcomes for each patient utilizing data from other 'matched' patients who are sufficiently similar.

12. The method of claim 1, wherein the method further comprises deriving a propensity score using the covariate balancing propensity score (CBPS) method to ensure balance on identified clinically important covariates.

* * * * *